(12) United States Patent
Shirai

(10) Patent No.: US 10,345,551 B2
(45) Date of Patent: Jul. 9, 2019

(54) EXCHANGEABLE LENS

(71) Applicant: NIKON CORPORATION, Tokyo (JP)

(72) Inventor: Natsuki Shirai, Tokyo (JP)

(73) Assignee: NIKON CORPORATION, Tokyo (JP)

(*) Notice: Subject to any disclaimer, the term of this patent is extended or adjusted under 35 U.S.C. 154(b) by 0 days.

(21) Appl. No.: 16/235,572

(22) Filed: Dec. 28, 2018

(65) Prior Publication Data

US 2019/0137727 A1     May 9, 2019

Related U.S. Application Data

(63) Continuation of application No. 15/523,027, filed as application No. PCT/JP2015/081328 on Nov. 6, 2015.

(30) Foreign Application Priority Data

Nov. 7, 2014    (JP) .................................. 2014-227464

(51) Int. Cl.
    *H04N 5/232*      (2006.01)
    *H04N 9/04*       (2006.01)
    (Continued)

(52) U.S. Cl.
    CPC .................. *G02B 7/08* (2013.01); *G02B 7/28* (2013.01); *G02B 7/34* (2013.01); *G02B 7/36* (2013.01);
    (Continued)

(58) Field of Classification Search
    CPC ........... H04N 5/23209; H04N 5/23212; H04N 5/23245; H04N 5/3696; H04N 5/357;
    (Continued)

(56) References Cited

U.S. PATENT DOCUMENTS 5,079,582 A    1/1992   Hamada et al.
2007/0147815 A1   6/2007   Tanaka
(Continued)

FOREIGN PATENT DOCUMENTS

CN      103946731 A     7/2014
JP       H09-211648 A     8/1997
(Continued)

OTHER PUBLICATIONS

Nov. 22, 2018 Office Action issued in Chinese Patent Application No. 201580071314.3.
(Continued)

*Primary Examiner* — Marly S Camargo
(74) *Attorney, Agent, or Firm* — Oliff PLC

(57) ABSTRACT

An exchangeable lens mountable on a camera body includes: a selection unit configured to select a first state wherein a movement range of a focusing optical system changing the exchangeable lens' focal position is limited and a second state which is different from the first state, and a transmission unit configured to transmit a first and second value which is equal to or smaller than the first value to the camera body in the second state, the first value indicating a relationship between the focusing optical system's moving amount and an image plane's moving amount at a position wherein the focusing optical system has moved, the second value indicating a relationship between the moving amount of the focusing optical system and the moving amount of the image plane, and transmit a value which changes depending on the focusing optical system's position as the second value in the first state.

2 Claims, 29 Drawing Sheets

(51) Int. Cl.
*H04N 5/357* (2011.01)
*H04N 5/374* (2011.01)
*G03B 13/36* (2006.01)
*G03B 13/18* (2006.01)
*G03B 17/14* (2006.01)
*G02B 7/34* (2006.01)
*G02B 7/36* (2006.01)
*G02B 7/08* (2006.01)
*G02B 7/28* (2006.01)
*H04N 5/225* (2006.01)

(52) U.S. Cl.
CPC ............ *G03B 13/36* (2013.01); *G03B 17/14* (2013.01); *H04N 5/225* (2013.01); *H04N 5/232* (2013.01); *H04N 5/23209* (2013.01); *H04N 5/23245* (2013.01)

(58) Field of Classification Search
CPC ........ H04N 5/374; H04N 9/045; G03B 13/36; G03B 13/18; G03B 17/14; G03B 17/565; G02B 7/34; G02B 7/08; G02B 7/28; G02B 7/38; G02B 7/282; G02B 7/36
USPC ........... 348/345, 360, 355, 346–350; 396/79, 396/121; 359/16, 637
See application file for complete search history.

(56) References Cited

U.S. PATENT DOCUMENTS

| | | |
|---|---|---|
| 2008/0267601 A1 | 10/2008 | Kobayashi |
| 2011/0293256 A1 | 12/2011 | Ishiwata et al. |
| 2012/0274837 A1 | 11/2012 | Yamasaki |
| 2014/0036134 A1 | 2/2014 | Miyatani et al. |
| 2014/0320736 A1 | 10/2014 | Tomita et al. |
| 2015/0316833 A1 | 11/2015 | Watanabe et al. |
| 2017/0184811 A1* | 6/2017 | Tomita .................. G03B 13/36 348/353 |
| 2017/0343768 A1* | 11/2017 | Shirai ................ H04N 5/23209 348/360 |
| 2018/0241933 A1 | 8/2018 | Hamano et al. |

FOREIGN PATENT DOCUMENTS

| | | |
|---|---|---|
| JP | 2006-126330 A | 5/2006 |
| JP | 2008-275890 A | 11/2008 |
| JP | 2010-139666 A | 6/2010 |
| JP | 2011-248161 A | 12/2011 |
| JP | 2013-178387 A | 9/2013 |
| JP | 2014-153615 A | 8/2014 |
| WO | 2013/069795 A1 | 5/2013 |

OTHER PUBLICATIONS

Feb. 9, 2016 International Search Report issued in International Patent Application No. PCT/JP2015/081328.

May 28, 2018 Extended Search Report issued in European Patent Application No. 15856271.0.

Sep. 28, 2018 Notice of Allowance issued in U.S. Appl. No. 15/523,027.

\* cited by examiner

Fig.4
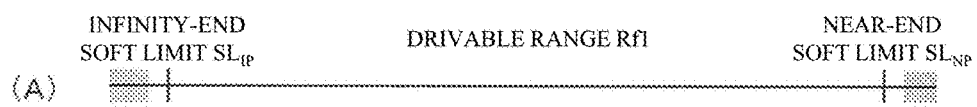
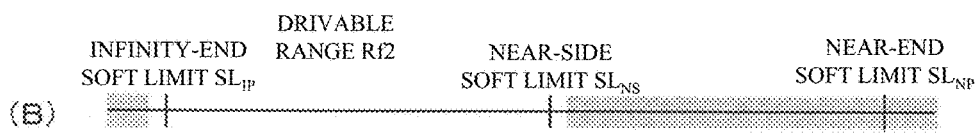
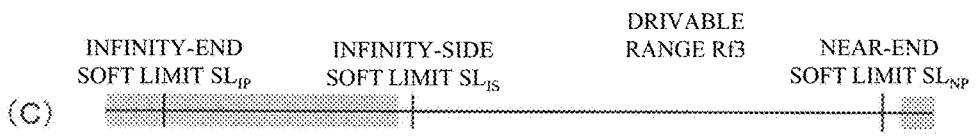

Fig.6

| FOCAL LENGTH \ IMAGING DISTANCE | D1 | D2 | D3 | D4 | D5 | D6 | D7 | D8 | D9 |
|---|---|---|---|---|---|---|---|---|---|
| f1 | K11 | K12 | K13 | K14 | K15 | K16 | K17 | K18 | K19 |
| f2 | K21 | K22 | K23 | K24 | K25 | K26 | K27 | K28 | K29 |
| f3 | K31 | K32 | K33 | K34 | K35 | K36 | K37 | K38 | K39 |
| f4 | K41 | K42 | K43 | K44 | K45 | K46 | K47 | K48 | K49 |
| f5 | K51 | K52 | K53 | K54 | K55 | K56 | K57 | K58 | K59 |
| f6 | K61 | K62 | K63 | K64 | K65 | K66 | K67 | K68 | K69 |
| f7 | K71 | K72 | K73 | K74 | K75 | K76 | K77 | K78 | K79 |
| f8 | K81 | K82 | K83 | K84 | K85 | K86 | K87 | K88 | K89 |
| f9 | K91 | K92 | K93 | K94 | K95 | K96 | K97 | K98 | K99 |

Fig.11
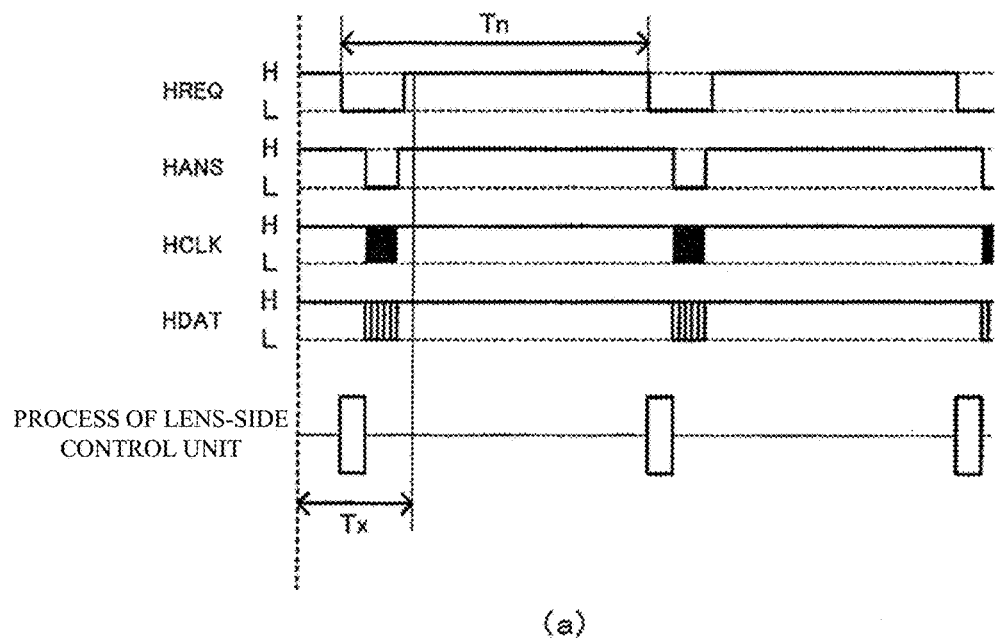
(a)
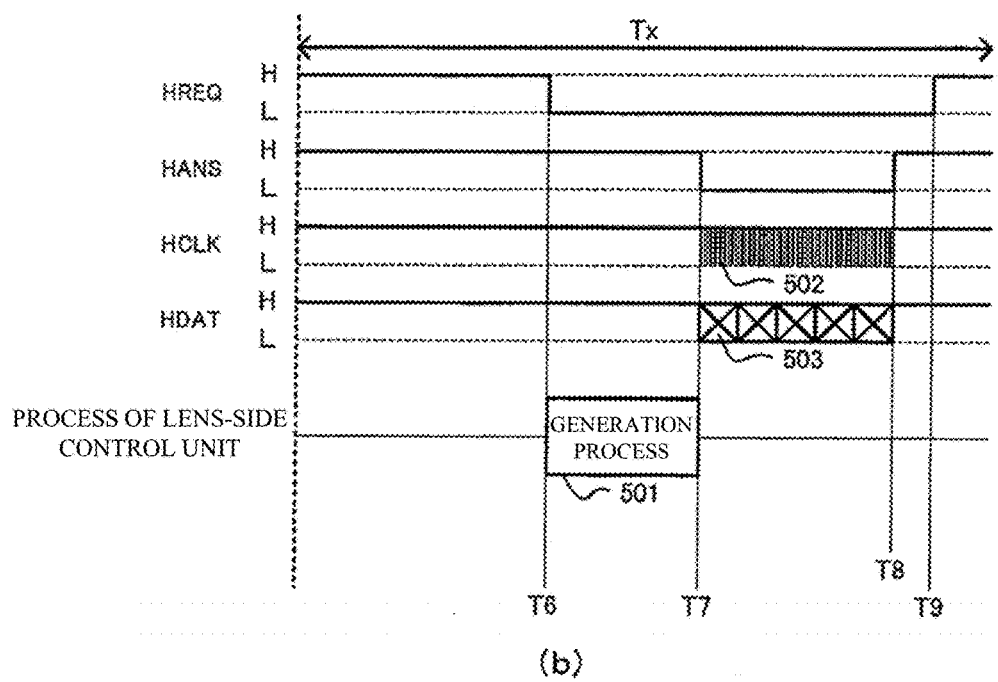
(b)

EXCHANGEABLE LENS

This is a Continuation of application Ser. No. 15/523,027 filed Jun. 12, 2017, which is a National Phase of International Patent Application No. PCT/JP2015/081328 filed Nov. 6, 2015, which claims priority to and the benefit of Japanese Patent Application No. 2014-227464 filed in Japan on Nov. 7, 2014, and for designated countries that are permitted to be incorporated by reference in documents, the content described in the application is incorporated herein by reference and by a portion of described in this specification.

FIELD OF THE INVENTION

The present invention relates to an exchangeable lens.

DESCRIPTION OF THE RELATED ART

In the related art, there is known a technique of detecting a focus state of an optical system by calculating an evaluation value of contrast by an optical system while driving a focus lens at a predetermined driving speed in an optical axis direction (refer to, for example, JP 2010-139666 A).

SUMMARY OF THE INVENTION

An object of the present invention is to provide an exchangeable lens capable of appropriately detecting a focus adjustment state of an optical system.

The present invention solves the above-described problems by the following solution.

According to a first aspect of the present invention, there is provided an exchangeable lens mountable on a camera body, including: a selection unit configured to select a first state in which a movement range of a focusing optical system changing a focal position of the exchangeable lens is limited and a second state which is different from the first state; and a transmission unit configured to transmit a first value and a second value which is equal to or smaller than the first value to the camera body in the second state, the first value indicating a relationship between a moving amount of the focusing optical system and a moving amount of an image plane at a position in which the focusing optical system has moved, the second value indicating a relationship between the moving amount of the focusing optical system and the moving amount of the image plane, and transmit a value which changes depending on the position of the focusing optical system as the second value in the first state.

In the exchangeable lens according to the above aspect, the movement range in the first state is included in the movement range in the second state.

In the exchangeable lens according to the above aspect, the movement range is a range in which the focusing optical system is moved in at least one of focus detection and in-focus operation of contrast AF.

In the exchangeable lens according to the above aspect, the second value is equal to the first value when the focusing optical system is outside the movement range in a case in which the first state is selected.

According to a second aspect of the present invention, there is provided an exchangeable lens mountable on a camera body, including: a selection unit configured to select a first state in which a movement range of a focusing optical system changing a focal position of the exchangeable lens is limited and a second state which is different from the first state; and a transmission unit configured to transmit a first value and a third value which is equal to or larger than the first value to the camera body in the second state, the first value indicating a relationship between a moving amount of the focusing optical system and a moving amount of an image plane at a position where the focusing optical system has moved, the third value indicating a relationship between the moving amount of the focusing optical system and the moving amount of the image plane, and transmit a value which changes depending on the position of the focusing optical system as the third value in the first state.

In the exchangeable lens according to the above aspect, the third value is equal to the first value when the focusing optical system is outside the movement range in a case in which the first state is selected.

According to a third aspect of the present invention, there is provided an exchangeable lens mountable on a camera body, including: a limitation unit configured to limit a movement range of a focusing optical system changing a focal position of the exchangeable lens; and a transmission unit configured to, transmit a first value and a second value which is a minimum value in the movement range of the focusing optical system to the camera body when the focusing optical system is within the movement range limited by the limitation unit, the first value indicating a relationship between a moving amount of the focusing optical system and a moving amount of an image plane, the second value indicating a relationship between the moving amount of the focusing optical system and the moving amount of the image plane, and transmit the first value and the first value as the second value to the camera body when the focusing optical system is outside the movement range limited by the limitation unit.

According to a fourth aspect of the present invention, there is provided an exchangeable lens mountable on a camera body, including: a limitation unit configured to limit a movement range of a focusing optical system changing a focal position of the exchangeable lens; and a transmission unit configured to transmit a first value and a second value which is a maximum value in the movement range of the focusing optical system to the camera body when the focusing optical system is within the movement range limited by the limitation unit, the first value indicating a relationship between a moving amount of the focusing optical system and a moving amount of an image plane, the second value indicating a relationship between the moving amount of the focusing optical system and the moving amount of the image plane, and transmit the first value and the first value as the second value to the camera body when the focusing optical system is outside the movement range limited by the limitation unit.

BRIEF DESCRIPTION OF THE DRAWINGS

FIG. 4 is a diagram illustrating an example of a drivable range of a focus lens.

FIG. 6 is a table listing a relationship between a lens position (focal length) of a zoom lens and a lens position (imaging distance) of a focus lens and an image plane movement coefficient K.

FIG. 11 is a diagram illustrating an example of hot line communication.

DESCRIPTION OF THE PREFERRED EMBODIMENTS

First Embodiment

Figure 1:
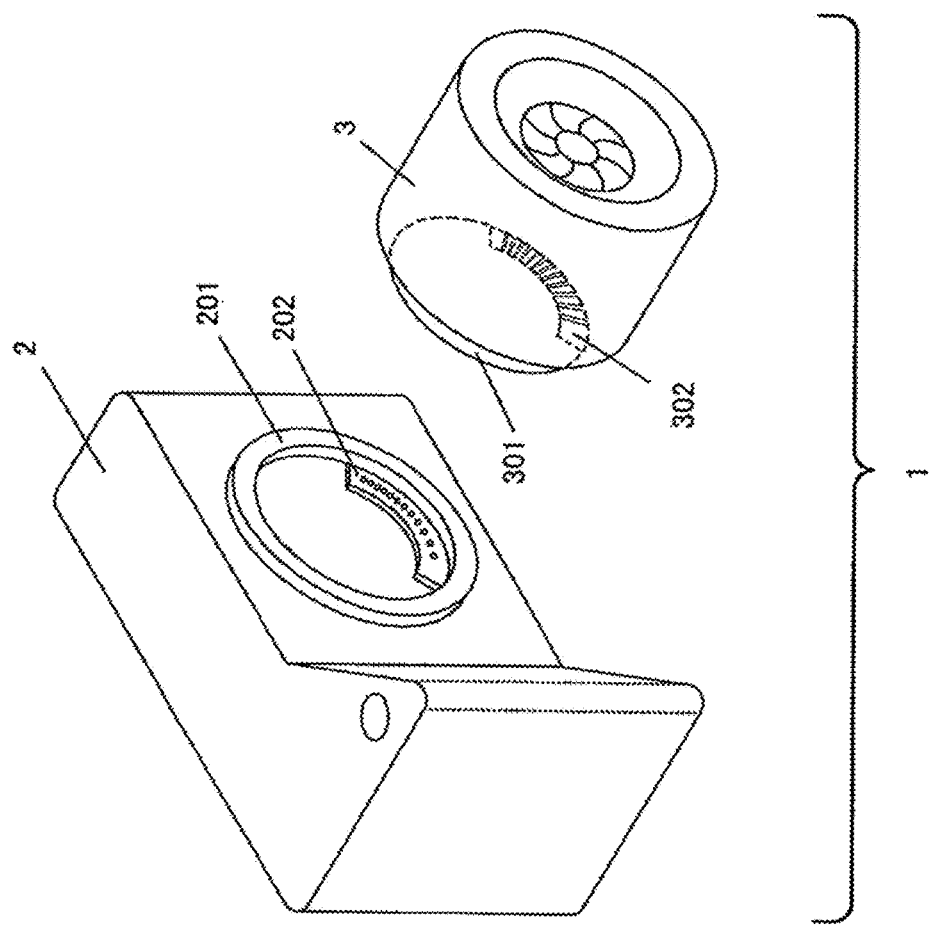
FIG. 1 is a perspective view illustrating a camera according to a first embodiment.
Figure 2:
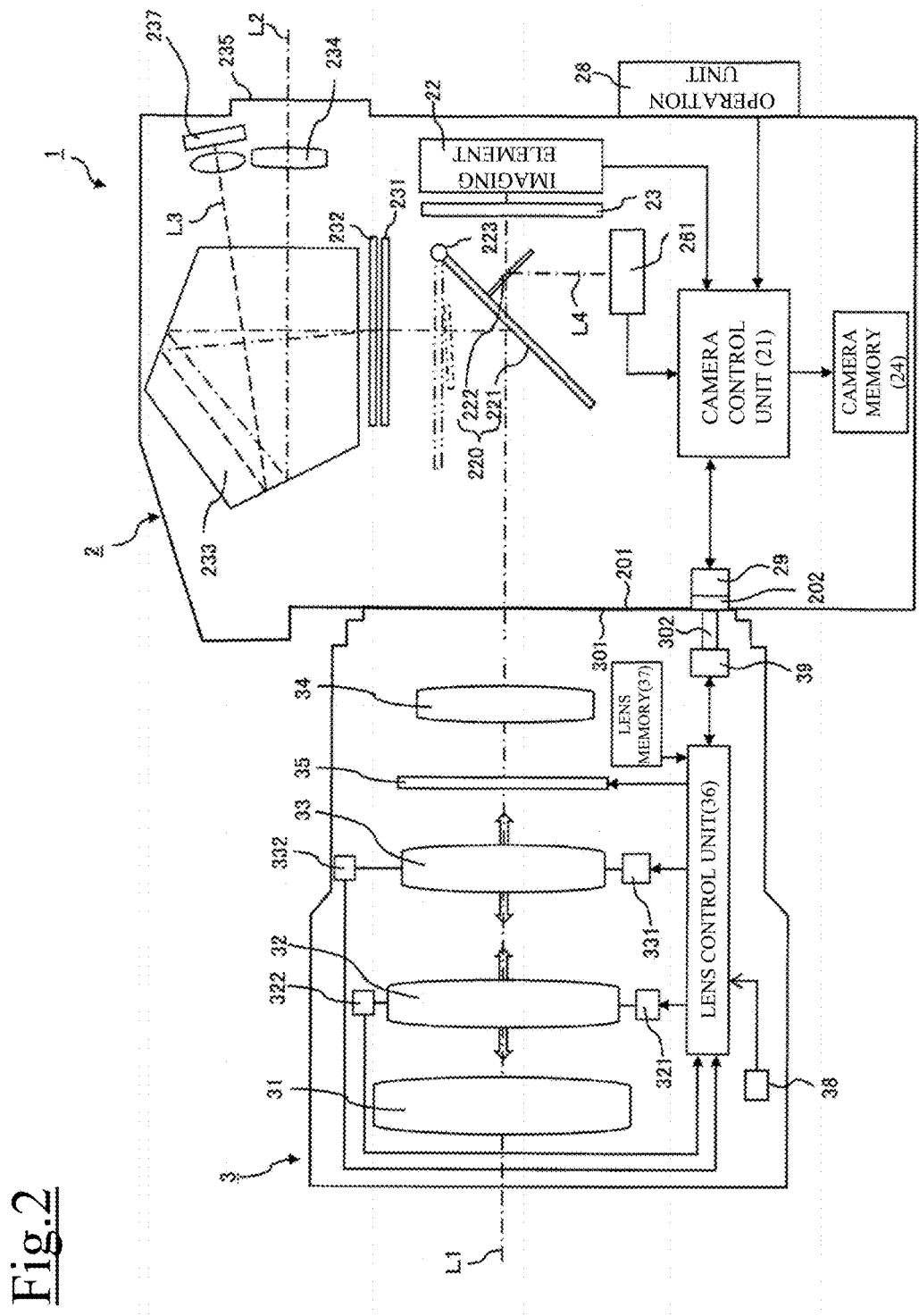
FIG. 2 is a main configuration diagram illustrating the camera according to the first embodiment.

FIG. 1 is a perspective view illustrating a single lens reflex digital camera 1 according to the embodiment. In addition, FIG. 2 is a main configuration diagram illustrating the camera 1 according to the embodiment. The digital camera 1 (hereinafter, simply referred to as a camera 1) according to the embodiment is configured to include a camera body 2 and a lens barrel 3, and the camera body 2 and the lens barrel 3 are detachably coupled.

The lens barrel 3 is an exchangeable lens that is detachably attached to the camera body 2. As illustrated in FIG. 2, the lens barrel 3 incorporates an imaging optical system including lenses 31, 32, 33, and 34 and a diaphragm 35.

The lens 33 is a focus lens, and by moving in the direction of an optical axis L1, the focus state of the imaging optical system can be adjusted. The focus lens 33 is provided movably along the optical axis L1 of the optical system of the lens barrel 3. The position thereof is adjusted by a focus lens driving motor 331 while the position is detected by a focus lens encoder 332.

In addition, the lens 32 is a zoom lens, and by moving in the direction of the optical axis L1, the focal length of the imaging optical system can be adjusted. Similarly to the above-described focus lens 33, the position of the zoom lens 32 is also adjusted by a zoom lens driving motor 321 while the position of the zoom lens 32 is detected by a zoom lens encoder 322. The position of the zoom lens 32 is adjusted by operating a zoom button provided on an operation unit 28 or by operating a zoom ring (not illustrated) provided to the lens barrel 3.

The diaphragm 35 is configured so that the aperture diameter about the optical axis L1 can be adjusted so as to limit an amount of light of a light flux passing through the imaging optical system to an imaging element 22 and to adjust a blur amount. Adjustment of the aperture diameter by the diaphragm 35 is performed, for example, by transmitting an appropriate aperture diameter calculated in an automatic exposure mode from a camera control unit 21 through a lens control unit 36. In addition, the set aperture diameter is input from the camera control unit 21 to the lens control unit 36 by manual operation by the operation unit 28 provided to the camera body 2. The aperture diameter of the diaphragm 35 is detected by a diaphragm aperture sensor (not illustrated), and the current aperture diameter is recognized by the lens control unit 36.

Figure 3:
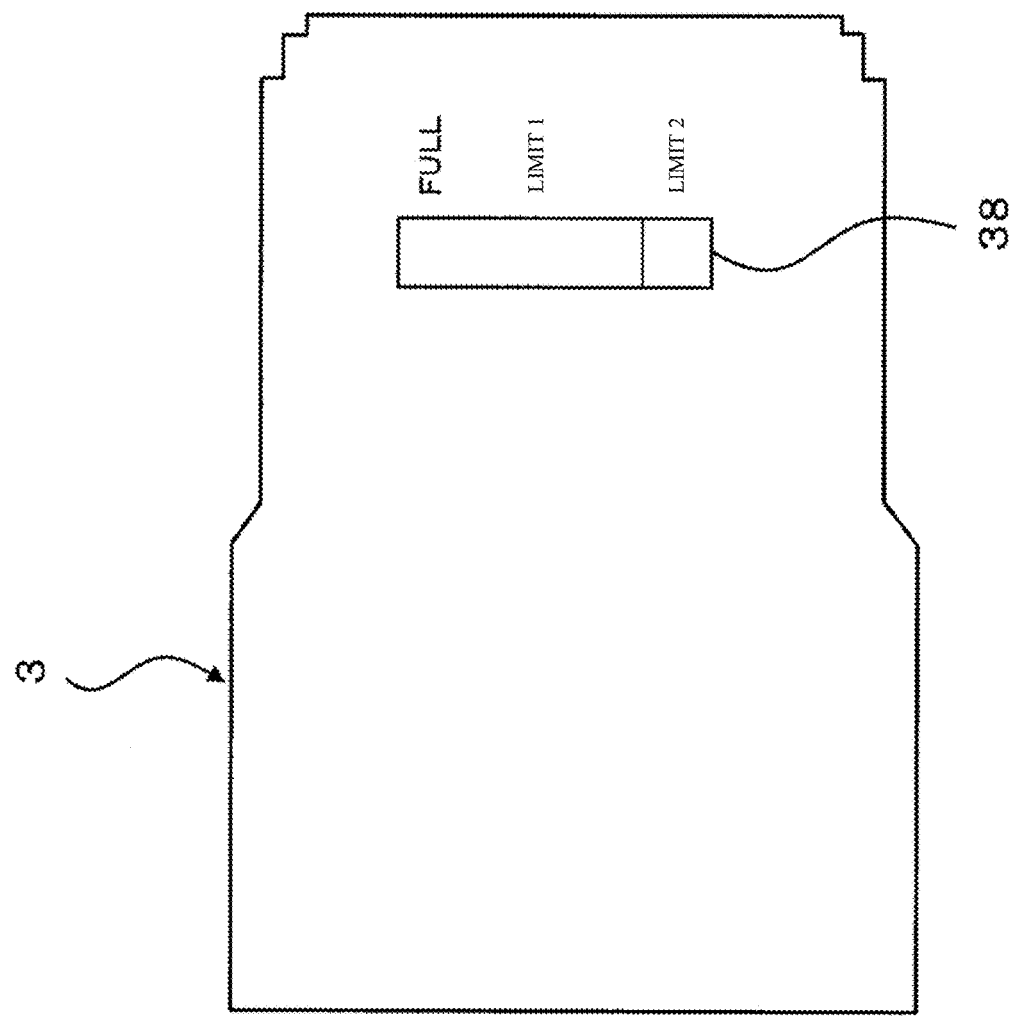
FIG. 3 is an external view of a lens barrel 3 according to the embodiment.

In addition, in the lens barrel 3 according to the embodiment, the drivable range of the focus lens 33 can be set (selected). In the embodiment, as illustrated in FIGS. 2 and 3, the lens barrel 3 is provided with a focus limit switch 38 for setting the drivable range. A user operates the focus limit switch 38 to select the focus limit mode, so that the drivable range of the focus lens 33 can be selected. In addition, FIG. 3 is an external view of the lens barrel 3 according to the embodiment.

FIG. 4 is a diagram illustrating an example of the drivable range that can be set in the embodiment, and a range where the focus lens 33 cannot be driven is indicated in gray. In the embodiment, as illustrated in FIGS. 4(A) to 4(C), three focus limit modes of a "FULL mode", a "rear-side limit mode", and an "infinity-side limit mode" can be set.

The "FULL mode" is a mode for detecting the in-focus position within a range from an infinity-end soft limit $SL_{IP}$ to a near-end soft limit $SL_{NP}$. As illustrated in FIG. 4(A), a drivable range Rf1 is set to a range from the lens position of the infinity-end soft limit $SL_{IP}$ to the lens position of the near-end soft limit $SL_{NP}$. However, in some cases, according to a driving speed, deceleration characteristics, and the like of the focus lens 33, the focus lens may not be stopped at the lens position of the infinity-end soft limit $SL_{IP}$ or the lens position of the near-end soft limit $SL_{NP}$. In this case, as illustrated in FIG. 4(A), the drivable range Rf1 is set to a range from the lens position (the end of the area indicated in gray closer to the infinity-end soft limit $SL_{IP}$ side) closer to the infinity side than the infinity-end soft limit $SL_{IP}$ to the lens position (the end of the area indicated in gray closer to the near-end soft limit $SL_{NP}$ side) closer to the near side than the near-end soft limit $SL_{NP}$.

In addition, the "rear-side limit mode" is a mode for detecting the in-focus position within a range from the infinity-end soft limit $SL_{IP}$ to a near-side soft limit $SL_{NS}$. As illustrated in FIG. 4(B), a drivable range Rf2 is set to a range from the lens position of the infinity-end soft limit $SL_{IP}$ to the lens position of the near-side soft limit $SL_{NS}$. In addition, as illustrated in FIG. 4(B), the drivable range Rf2 may be set to a range from the lens position (the end of the area indicated in gray closer to the infinity-end soft limit $SL_{IP}$ side) closer to the infinity side than the infinity-end soft limit $SL_{IP}$ to the lens position (the end of the area indicated in gray closer to the near-side soft limit $SL_{NS}$ side) closer to the near side than the near-side soft limit $SL_{NS}$.

In addition, the "infinity-side limit mode" is a mode for detecting the in-focus position within a range from the infinity-side soft limit $SL_{IS}$ to the near-end soft limit $SL_{NP}$. As illustrated in FIG. 4(C), a drivable range Rf3 is set to a range from the lens position of the infinity-side soft limit $SL_{IS}$ to the lens position of the near-end soft limit $SL_{NP}$. As illustrated in FIG. 4(C), the drivable range Rf3 may be set to a range from the lens position (the end of the area indicated in gray closer to the infinity-side soft limit $SL_{IS}$ side) closer to the infinity side than the infinity-side soft limit $SL_{IS}$ to the lens position (the end of the area indicated in gray closer to the near-end soft limit $SL_{NP}$ side) closer to the near side than the near-end soft limit $SL_{NP}$.

In the embodiment, the "FULL mode" is set by adjusting the focus limit switch 38 to "FULL" illustrated in FIG. 3, the "rear-side limit mode" is set by adjusting the focus limit switch to "Limit 1" illustrated in FIG. 3, and the "infinity-side limit mode" is set by adjusting the focus limit switch to "Limit 2" illustrated in FIG. 3.

In addition, in a case where one of the focus limit modes is selected by the user, the information of the focus limit mode selected by the user is transmitted from the lens barrel 3 to the camera body 2. The information of the focus limit mode is stored in a lens memory 37 for each focus limit mode. For example, the "FULL mode", the lens position of the infinity-end soft limit $SL_{IP}$ and the lens position of the near-end soft limit $SL_{NP}$ are stored so as to correspond to each other, and the "rear-side limit mode", the lens position of the infinity-end soft limit $SL_{IP}$, and the lens position of the near-side soft limit $SL_{NS}$ are stored so as to correspond to each other, and the "infinity-side limit mode", the lens position of the infinity-side soft limit $SL_{IS}$, and the lens position of the near-end soft limit $SL_{NP}$ are stored so as to correspond to each other.

For example, in a case where the "FULL mode" illustrated in FIG. 4(A) is set by the focus limit switch 38, the lens control unit 36 transmits the infinity-end soft limit $SL_{IP}$ and the near end soft limit $SL_{NP}$ which are references of the limit positions (end portions) of the drivable range Rf1 as the information of the focus limit mode to the camera body 2. In addition, in a case where the "rear-side limit mode" illustrated in FIG. 4(B) is set by the focus limit switch 38, the lens control unit 36 transmits the infinity end soft limit $SL_{IP}$ and the near-side soft limit $SL_{NS}$ which are references of the limit positions of the drivable range Rf2 as the information of the focus limit mode to the camera body 2. Similarly, in a case where the "infinity-side limiting mode" illustrated in FIG. 4(C) is set by the focus limit switch 38, the lens control unit 36 transmits the infinity-side soft limit $SL_{IS}$ and the near-end soft limit $SL_{NP}$ which are references of the limit positions of the drivable range Rf3 as the information of the focus limit mode to the camera body 2.

In addition, in the embodiment, for example, the information indicating whether or not the lens barrel 3 is a lens barrel capable of changing a plurality of drivable ranges and the information of the above-described focus limit modes are stored in the lens memory 37. Then, the lens control unit 36 may periodically transmits the information indicating whether or not the lens barrel 3 is a lens barrel capable of changing a plurality of drivable ranges and the information of the focus limit mode selected by the user (the lens position of the infinity-end soft limit $SL_{IP}$ and the lens position of the near-end soft limit $SL_{NP}$ in the case of the "FULL mode", the lens position of the infinity-end soft limit $SL_{IP}$ and the lens position of the near-side soft limit $SL_{NS}$ in the case of the "rear-side limit mode", and the lens position of the infinity-side soft limit $SL_{IS}$ and the lens position of the near-end soft limit $SL_{NP}$ in the case of "infinity-side limit mode") as focus limit information from the lens barrel 3 to the camera body 2.

Figure 5:
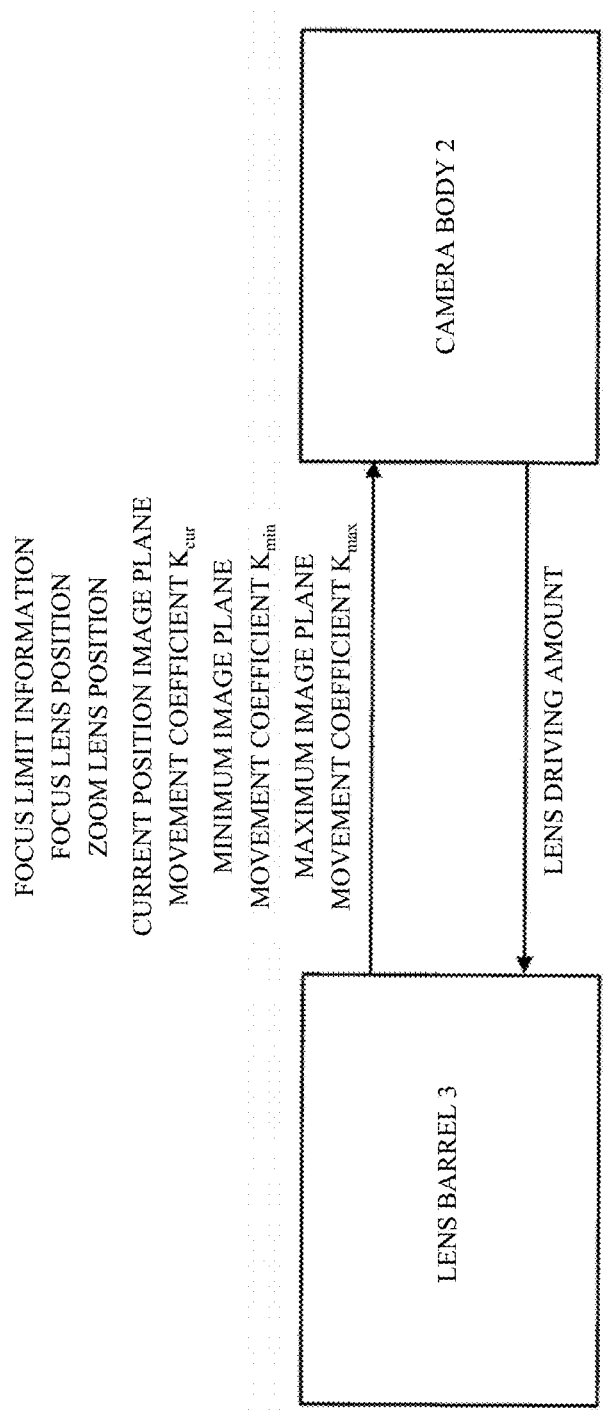
FIG. 5 is a diagram illustrating an example of information exchange between a lens barrel and a camera body.

In addition, as illustrated in FIG. 5, in addition to the focus limit information, the information of the position of the focus lens 33 and the position of the zoom lens 32 is periodically transmitted from the lens barrel 3 to the camera body 2. In addition, in the embodiment, the current position image plane movement coefficient $K_{cur}$, the minimum image plane movement coefficient $K_{min}$, and the maximum image plane movement coefficient $K_{max}$ described later are also transmitted from the lens barrel 3 to the camera body 2. On the other hand, in the camera body 2, the lens driving amount of the focus lens 33 is calculated by using the focus limit information and the position information of the focus lens 33, and the calculated lens driving amount is transmitted to the lens barrel 3. FIG. 5 is a diagram illustrating an example of information exchange between the lens barrel 3 and the camera body 2.

The image plane movement coefficient K is stored in the lens memory 37. The image plane movement coefficient K is a value indicating a correspondence relationship between the driving amount of the focus lens 33 and the moving amount of the image plane (the moving amount of the image plane of the imaging optical system) and is, for example, a ratio of the driving amount of the focus lens 33 and the moving amount of the image plane.

In the embodiment, the image plane movement coefficient is obtained, for example, by the following formula (1). As the image plane movement coefficient K is decreased, the moving amount of the image plane caused by driving the focus lens 33 (the moving amount of the image plane of the imaging optical system when the focus lens 33 is moved by a predetermined distance) is increased.

(Image Plane Movement Coefficient $K$)=(Driving Amount of Focus Lens 33)/(Moving Amount of Image Plane)    (1)

In addition, in the camera 1 according to the embodiment, even in a case where the driving amount of the focus lens 33 is the same, the moving amount of the image plane changes depending on the lens position of the focus lens 33. Similarly, even in a case where the driving amount of the focus lens 33 is the same, the moving amount of the image plane changes depending on the lens position of the zoom lens 32, that is, the focal length. Namely, the image plane movement coefficient K changes depending on the lens position in the optical axis direction of the focus lens 33 and, furthermore, the lens position in the optical axis direction of the zoom lens 32. In the embodiment, the lens control unit 36 stores the image plane movement coefficient K for each lens position of the focus lens 33 and for each lens position of the zoom lens 32.

In addition, the image plane movement coefficient K may also be defined as, for example, (Image Plane Movement Coefficient K)=(Moving Amount of Image Plane)/(Driving Amount of Focus Lens 33). In this case, as the image plane movement coefficient K is increased, the moving amount of the image plane caused by driving the focus lens 33 is increased.

Herein, FIG. 6 illustrates a table listing the relationship between the lens position (focal length) of the zoom lens 32 and the lens position (imaging distance) of the focus lens 33 and the image plane movement coefficient K. In the table illustrated in FIG. 6, the drive area (the lens position of the zoom lens 32; the focal length) of the zoom lens 32 is divided into nine areas "f1" to "f9" in the order from the wide end to the tele end, the drive area (the lens position of the focus lens 33; the imaging distance) of the focus lens 33 is divided into nine areas from "D1" to "D9" in the order from the infinity end to the near end, and the image plane movement coefficients K corresponding to the respective lens positions are stored. For example, in a case where the lens position (focal length) of the zoom lens 32 is in "f1" and the lens position (imaging distance) of the focus lens 33 is in "D1", the image plane movement coefficient K is "K11". In the table illustrated in FIG. 6, although a case where the drive area of each lens is divided into nine areas is exemplified, the number of areas is not particularly limited, but it may be arbitrarily set.

Next, the minimum image plane movement coefficient $K_{min}$ and the maximum image plane movement coefficient $K_{max}$ will be described with reference to FIG. 6.

The minimum image plane movement coefficient $K_{min}$ is a value corresponding to the minimum value of the image plane movement coefficient K. For example, in FIG. 6, in a case where "K11"="100", "K12"="200", "K13"="300", "K14"="400", "K15"="500", "K16"="600", "K17"="700", "K18"="800", and "K19"="900", the minimum value "K11"="100" is the minimum image plane movement coefficient $K_{min}$, and the maximum value "K19"="900" is the maximum image plane movement coefficient $K_{max}$.

The minimum image plane movement coefficient $K_{min}$ usually changes depending on the current lens position of the zoom lens 32. In addition, unless the current lens position of the zoom lens 32 changes, even if the current lens position of the focus lens 33 changes, the minimum image plane movement coefficient $K_{min}$ is a constant value (fixed value). In other words, the minimum image plane movement coefficient $K_{min}$ is usually a fixed value (constant value) determined according to the lens position (focal length) of the zoom lens 32, and does not depend on the lens position (imaging distance) of the focus lens 33.

For example, in FIG. 6, each of "K11", "K21", "K31", "K41", "K52", "K62", "K72", "K82", and "K91" indicated in gray (indicated by coloring) is the minimum image plane movement coefficient $K_{min}$ indicating the minimum value among the image plane movement coefficients K at each lens position (focal length) of the zoom lens 32. Namely, in a case where the lens position (focal length) of the zoom lens 32 is in "f1", "K11" which is the image plane movement coefficient K in a case where the lens position (imaging distance) of the focus lens 33 is in "D1" among "D1" to "D9" is the minimum image plane movement coefficient $K_{min}$ indicating the minimum value. Therefore, "K11" which is the image plane movement coefficient K in a case where the lens position (imaging distance) of the focus lens 33 is in "D1" denotes the smallest value among "K11" to "K19" which are the image plane movement coefficients K in a case where the lens position (imaging distance) of the focus lens 33 is in "D1" to "D9". In addition, similarly, in a case where the lens position (focal length) of the zoom lens 32 is in "f2", "K21" which is the image plane movement coefficient K in a case where the lens position (imaging distance) of the focus lens 33 is in "D1" denotes the smallest value among "K21" to "K29" which are the image plane movement coefficients K in a case where the lens position (imaging distance) of the focus lens 33 is in "D1" to "D9". Namely, "K21" is the minimum image plane movement coefficient $K_{min}$. Hereinafter, similarly, even in a case where the lens positions (focal lengths) of the zoom lens 32 are in "f3" to "f9", "K31", "K41", "K52", "K62", "K72", "K82", and "K91" indicated in gray are the minimum image plane movement coefficients $K_{min}$, respectively.

Similarly, the maximum image plane movement coefficient $K_{max}$ is a value corresponding to the maximum value of the image plane movement coefficient K. The maximum image plane movement coefficient $K_{max}$ usually changes depending on the current lens position of the zoom lens 32. In addition, unless the current lens position of the zoom lens 32 changes, even if the current lens position of the focus lens 33 changes, the maximum image plane movement coefficient $K_{max}$ is usually a constant value (fixed value). For example, in FIG. 6, each of "K19", "K29", "K39", "K49", "K59", "K69", "K79", "K89", and "K99" indicated by hatching is the maximum image plane movement coefficient $K_{max}$ indicating the maximum value among the image plane movement coefficients K at each lens position (focal length) of the zoom lens 32.

In this manner, as illustrated in FIG. 6, the lens memory 37 stores the image plane movement coefficient K corresponding to the lens position (focal length) of the zoom lens 32 and the lens position (imaging distance) of the focus lens 33, the minimum image plane movement coefficient $K_{min}$ indicating the smallest value among the image plane movement coefficients K for each lens position (focal length) of the zoom lens 32, and the maximum image plane movement coefficient $K_{max}$ indicating the largest value among the image plane movement coefficients K for each lens position (focal length) of the zoom lens 32.

In addition, the lens memory 37 may store the minimum image plane movement coefficient $K_{min}'$ which is a value approximate to the minimum image plane movement coefficient $K_{min}$ instead of the minimum image plane movement coefficient $K_{min}$ indicating the smallest value among the image plane movement coefficients K. For example, in a case where the value of the minimum image plane movement coefficient $K_{min}$ is a value having such a large number of digits as 102.345, 100 which is a value approximate to 102.345 may be stored as the minimum image plane movement coefficient $K_{min}'$. In comparison with a case where the lens memory 37 stores 102.345 (minimum image plane movement coefficient $K_{min}$), in a case where the lens memory 37 stores 100 (minimum image plane movement coefficient $K_{min}'$), it is possible to save storage capacity of the memory, and it is possible to suppress an amount of transmission data during the transmission to the camera body 2.

In addition, for example, in a case where the value of the minimum image plane movement coefficient $K_{min}$ is a number of 100, in consideration of stability of control such as backlash filling control, noise-reduction control (clipping operation), and lens speed control described later, 98 approximate to 100 may be stored as the minimum image plane movement coefficient $K_{min}'$. For example, in consideration of control stability, it is preferable to set the minimum image plane movement coefficient $K_{min}'$ within the range of 80% to 120% of the actual value (minimum image plane movement coefficient $K_{min}$).

Figure 7:
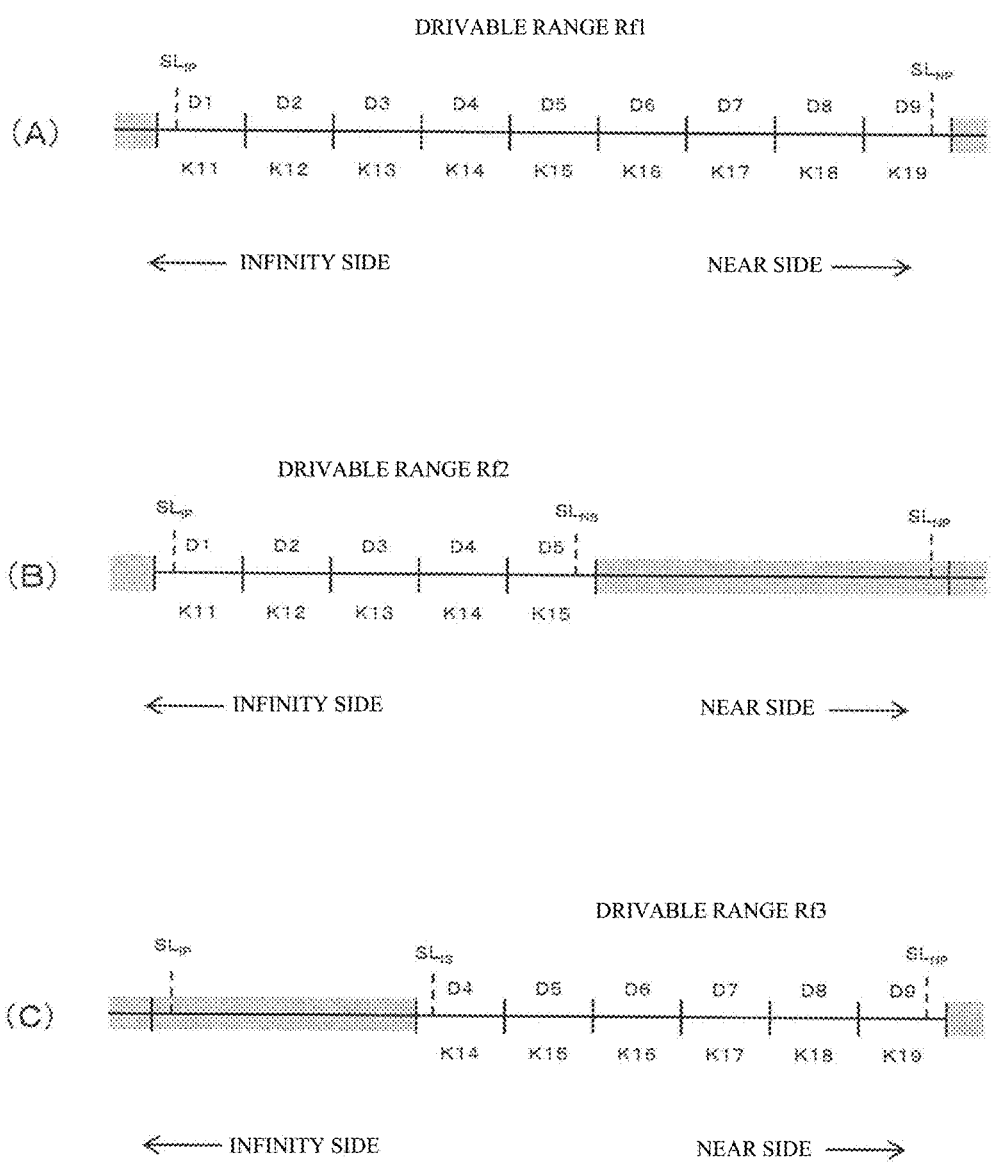
FIG. 7 is a diagram illustrating a minimum image plane movement coefficient $K_{min}$ and a maximum image plane movement coefficient $K_{max}$ corresponding to a drivable range.

In addition, in the embodiment, the lens memory 37 stores the minimum image plane movement coefficient $K_{min}$ and the maximum image plane movement coefficient $K_{max}$ corresponding to the respective drivable ranges. Herein, FIG. 7 is a diagram illustrating the minimum image plane movement coefficient $K_{min}$ and the maximum image plane movement coefficient $K_{max}$ corresponding to the drivable range. In addition, FIG. 7(A) illustrates the image plane movement coefficients at the lens positions of the focus lens 33 within the drivable range Rf1 that is set to a case where the "FULL mode" is selected as illustrated in FIG. 4(A). In addition, FIG. 7(B) illustrates the image plane movement coefficients at the lens positions of the focus lens 33 within the drivable range Rf2 that is set in a case where the "rear-side limit mode" is selected as illustrated in FIG. 4(B). In addition, FIG. 7(C) illustrates 'the image plane movement coefficients at the lens positions of the focus lens 33 within the drivable range Rf3 that is set in a case where the "infinite-side limit mode" is selected as illustrated in FIG. 4(C).

For example, as illustrated in FIG. 7(A), in a case where the "FULL mode" is set, the drivable range Rf1 is a range from the lens position of the infinity-end soft limit $SL_{IP}$ to the lens position of the near-end soft limit $SL_{NP}$. In this case, similarly to the example illustrated in FIG. 6, the drive area of the focus lens 33 can be divided into nine areas "D1" to "D9". For this reason, the lens memory 37 stores the smallest "K11" among "K11" to "K19" as the minimum image plane movement coefficient corresponding to the drivable range Rf1 in a case where the lens position (focal length) of the zoom lens 32 is in "f1" and stores the largest "K19" among "K11" to "K19" as the maximum image plane movement coefficient $K_{max}$ corresponding to the drivable range Rf1.

On the other hand, as illustrated in FIG. 7(B), in a case where the "rear-side limit mode" is selected, the drivable range Rf2 is a range from the lens position of the infinity-end soft limit $SL_{IP}$ to the near-end soft limit $SL_{NS}$. In this case, the drive area of the focus lens 33 can be divided into five areas of "D1" to "D5". For this reason, the lens memory 37 stores the smallest "K11" among the "K11" to "K15" as the minimum image plane movement coefficient $K_{min}$ corresponding to the drivable range Rf2 in a case where the lens position (focal length) of the zoom lens 32 is in "f1" and stores the largest "K15" among "K11" to "K15" as the maximum image plane movement coefficient $K_{max}$ corresponding to the drivable range Rf2.

Similarly, as illustrated in FIG. 7(C), in a case where the "infinity-side limit mode" is selected, the drivable range Rf3 is a range from the lens position of the infinity-side soft limit $SL_{IS}$ to the near-end soft limit $SL_{NP}$. In this case, the drive area of the focus lens 33 can be divided into six areas "D4" to "D9". For this reason, in a case where the lens position (focal length) of the zoom lens 32 is in "f1", the lens memory 37 stores the smallest "K14" among the "K14" to "K19" as the minimum image plane movement coefficient $K_{min}$ corresponding to the drivable range Rf3 and stores the largest "K19" among "K14" to "K19" as the maximum image plane movement coefficient $K_{max}$ corresponding to the drivable range Rf3.

The minimum image plane movement coefficient $K_{min}$ and the maximum image plane movement coefficient $K_{max}$ corresponding to the drivable range are usually fixed values (constant values) determined according to the lens position (focal length) of the zoom lens 32 and are values which do not depend on the lens position (imaging distance) of the focus lens 33.

Next, the camera body 2 will be described with reference to FIG. 2. The camera body 2 is configured with a mirror system 220 for guiding light flux from a subject to an imaging element 22, a finder 235, a photometric sensor 237, and a focus detection module 261. The mirror system 220 is configured to includes a quick return mirror 221 which rotates by a predetermined angle between an observation position of a subject and an imaging position around a rotation axis 223, and a sub mirror 222 that is pivotally supported by the quick return mirror 221 and rotates in accordance with the rotation of the quick return mirror. In FIG. 2, a state where the mirror system 220 is at the observation position of the subject is indicated by a solid line, and a state where the mirror system is at the imaging position of the subject is indicated by a two-dot dashed line.

The mirror system 220 rotates so as to be inserted in an optical path of an optical axis L1 in the state where the mirror system is at the observation position of the subject and so as to be retracted from the optical path of the optical axis L1 in the state where the mirror system is at the imaging position of the subject.

The quick return mirror 221 is configured with a half mirror. In a state where the quick return mirror is at the observation position of the subject, partial light fluxes (optical axes L2 and L3) of a light flux (optical axis L1) from the subject is reflected by the quick return mirror 221 to be guided to the finder 235 and the photometric sensor 237, and a partial light flux (optical axis L4) is allowed to pass through the quick return mirror to be guided to the sub mirror 222. On the other hand, the sub mirror 222 is configured with a total reflection mirror and guides light flux (optical axis L4) passing through the quick return mirror 221 to the focus detection module 261.

Therefore, in a case where the mirror system 220 is at the observation position, the light flux (optical axis L1) from the subject is guided to the finder 235, the photometric sensor 237, and the focus detection module 261, so that the subject is observed by the photographer, and exposure calculation or detection of the focus adjustment state of the focus lens 33 are performed. When the photographer fully pushes the release button, the mirror system 220 rotates to the imaging position, and all the light fluxes (optical axis L1) from the subject are guided to the imaging element 22, and the captured image data is stored in a memory 24.

The light flux (optical axis L2) from the subject reflected by the quick return mirror 221 forms an image on a focusing plate 231 arranged on a plane optically equivalent to the imaging element 22, and the image can be observed through a pentaprism 233 and an eyepiece 234. At this time, a transmissive liquid crystal display 232 displays a focus detection area mark and the like to be superimposed on a subject image on the focusing plate 231 and also displays shooting-related information such as a shutter speed, an aperture value, and the number of captured images in the area outside the subject image. Therefore, in the shooting preparation state, the photographer can observe the subject, the background thereof, the shooting related information, and the like through the finder 235.

The photometric sensor 237 is configured with a two-dimensional color CCD image sensor or the like and outputs a photometric signal corresponding to brightness of each of areas obtained by dividing an imaging screen into a plurality of areas in order to calculate the exposure value at the time of imaging. The signal detected by the photometric sensor 237 is output to the camera control unit 21 and used for automatic exposure control.

The imaging element 22 is provided on an expected focal plane of the imaging optical system including the lenses 31, 32, 33, and 34 on the optical axis L1 of the light flux from the subject of the camera body 2, and the shutter 23 is provided on the front face thereof. The imaging element 22 is configured by two-dimensionally arranging a plurality of photoelectric conversion elements. The imaging element may be configured by using a device such as a two-dimensional CCD image sensor, a CMOS sensor, or a CID. An image signal photoelectrically converted by the imaging element 22 is subjected to an image process by the camera control unit 21 and, after that, the image signal is recorded in the camera memory 24 which is a recording medium. In addition, the camera memory 24 may be configured by using any of a detachable card type memory and a built-in type memory.

In addition, the camera control unit 21 performs detection (hereinafter, appropriately referred to as "contrast AF") of the focus adjustment state of the imaging optical system by using the contrast detection method on the basis of the pixel data read from the imaging element 22). For example, the camera control unit 21 reads the output of the imaging element 22 and calculates the focus evaluation value on the basis of the read output. The focus evaluation value can be obtained, for example, by extracting a high-frequency component of the output from the imaging element 22 by using a high-frequency pass filter. In addition, the focus evaluation value can also be obtained by extracting high frequency components by using two high frequency pass filters having different cutoff frequencies.

Then, the camera control unit 21 transmits a drive signal to the lens control unit 36 to drive the focus lens 33 at a predetermined sampling interval (distance) to obtain a focus evaluation value at each position and performs the focus detection by using the contrast detection method to obtain the position of the focus lens 33 of which the focus evaluation value is the maximum value as the in-focus position. In addition, for example, in a case where the focus evaluation value is calculated while driving the focus lens 33, if the focus evaluation value has been increased twice and then decreased twice, the in-focus position can be obtained by performing an operation such as an interpolation method by using the focus evaluation value.

Figure 8:
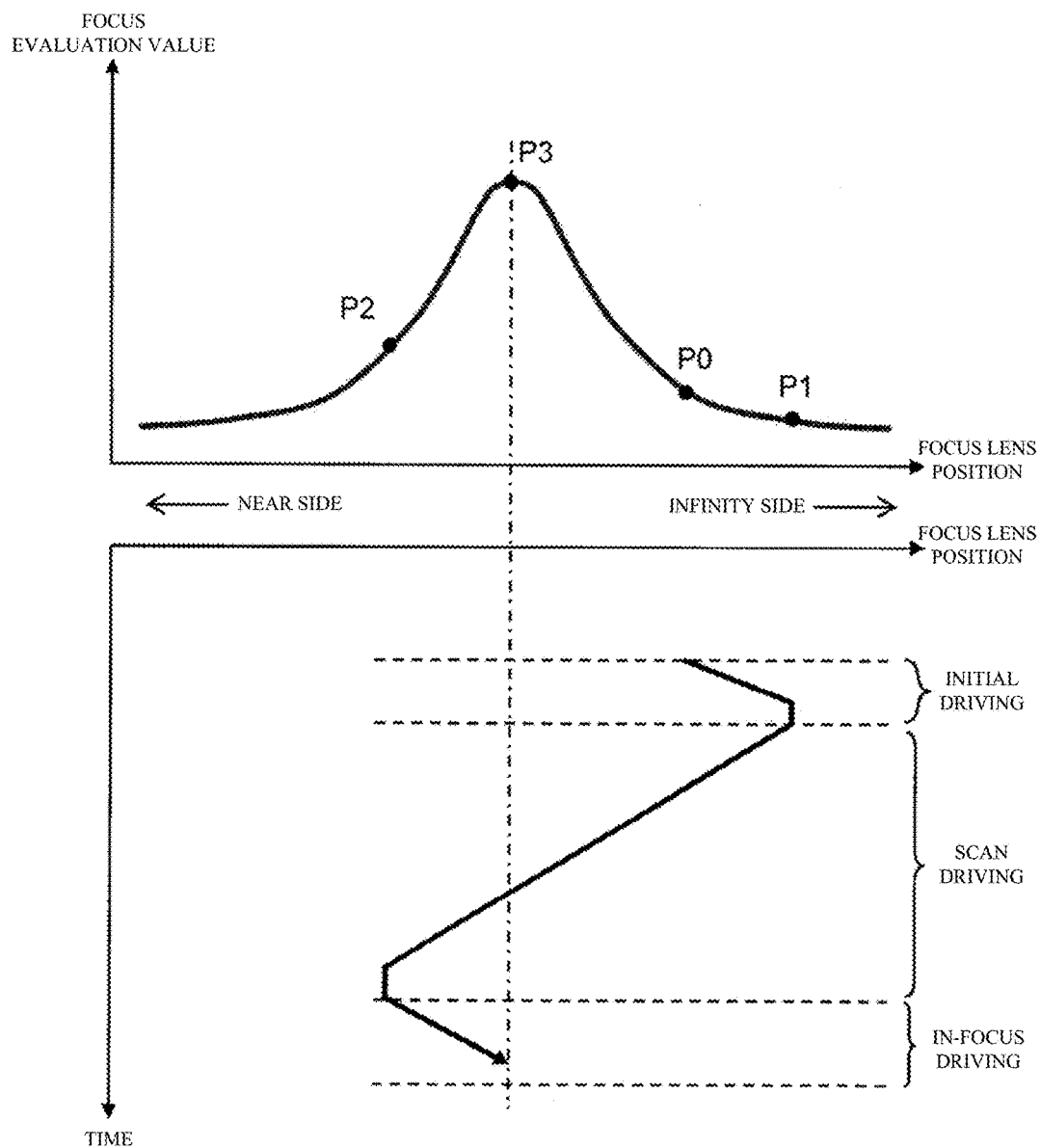
FIG. 8 is a diagram illustrating an example of a focus detection method by using a contrast detection method.

Herein, FIG. 8 is a diagram illustrating an example of the focus detection process by using the contrast detection method. In the example illustrated in FIG. 8, the focus lens 33 is located at P0 illustrated in FIG. 8. First, initial driving is performed so that the focus lens 33 is driven from P0 to a predetermined scan start position (the position P1 in FIG. 8). Then, while the focus lens 33 is driven from the scan start position (the position P1 in FIG. 8) toward from the infinity side to the closest side, scan driving for acquiring the focus evaluation value by using the contrast detection method at predetermined intervals is performed. Then, at the time when the focus lens 33 is moved to the position P2 illustrated in FIG. 8, the peak position (the position P3 in FIG. 8) of the focus evaluation value is detected as the in-focus position, and the in-focus driving for driving the focus lens 33 to the detected in-focus position (the position P3 in FIG. 8) is performed.

In the focus detection by using the contrast detection method, the sampling interval of the focus evaluation value increases as the driving speed of the focus lens 33 increases. In a case where the driving speed of the focus lens 33 exceeds the predetermined speed, the sampling interval of the focus evaluation value becomes too large, and thus, and it is impossible to appropriately detect the in-focus position. This is because, the larger the sampling interval of the focus evaluation value is, the larger the deviation of the in-focus position is, and thus, the in-focus accuracy may decrease. For this reason, the camera control unit 21 drives the focus lens 33 so that the image plane moving speed at the time of driving the focus lens 33 becomes a speed at which the in-focus position can be appropriately detected. For example, in the search control in which the focus lens 33 is driven in order to detect the focus evaluation value, the camera control unit 21 drives the focus lens 33 so as to achieve the largest image plane driving speed among the image plane moving speeds of the sampling intervals at which the in-focus position can be appropriately detected. The search control includes, for example, wobbling, neighbor search (near scan) for searching only the vicinity of a predetermined position, and global search (whole scan) for searching the entire drivable range of the focus lens 33.

In addition, in a case where the search control is started with the half pushing of the release switch as a trigger, the camera control unit 21 drives the focus lens 33 at a high speed, and in a case where the search control is started with a condition other than the half pushing of the release switch as a trigger (for example, in the case of a mode where the search control is automatically started even if the release switch is not half-pushed), the focus lens 33 may be driven at a low speed. This is because, by controlling in this manner, the contrast AF can be performed at a high speed when the release switch is half-pushed, and the contrast AF appropriate for the appearance of the through image can be performed when the release switch is not half pushed. The through image is, for example, an image for monitoring which is captured by the imaging element at a predetermined frame rate before an imaging instruction (full push of the release switch).

In addition, the camera control unit 21 may control the focus lens 33 to be driven at a high speed in the search control in the still image imaging mode and may control the focus lens 33 to be driven at a low speed in the search control in the moving-picture imaging mode. By controlling in this manner, it is possible to perform contrast AF at a high speed in the still image imaging mode and contrast AF at a low speed appropriate for appearance of the moving picture in the moving-picture imaging mode.

In addition, in at least one of the still image imaging mode and the moving-picture imaging mode, contrast AF may be performed at a high speed in a sports imaging mode, and contrast AF may be performed at a low speed in a landscape imaging mode. In addition, the driving speed of the focus lens 33 in the search control may be changed according to the focal length, the imaging distance, the aperture value, and the like.

In addition, in the embodiment, focus detection by using a phase difference detection method can be performed. More specifically, the camera body 2 is configured with a focus detection module 261, and the focus detection module 261 is configured to include a microlens arranged in the vicinity of an expected focal plane of the imaging optical system and a pair of line sensors (not illustrated) in which a plurality of pixels including photoelectric conversion elements are arranged. A pair of light flux passing through a pair of different areas of an exit pupil of the focus lens 33 is received by each pixel arranged in the pair of line sensors, so that a pair of image signals can be acquired. The focus detection by using a phase difference detection method that detects a focus adjustment state can be performed by obtaining a phase shift of the pair of image signals acquired by the pair of line sensors by well-known correlation calculation.

The operation unit 28 is an input switch such as a moving picture imaging start switch used by a photographer to set various operation modes of the camera 1 and is configured to switch between a still image imaging mode and a moving-picture imaging mode and switch between an autofocus mode and a manual focus mode. The various modes set by the operation unit 28 are transmitted to the camera control unit 21, and the operations of the entire camera 1 are controlled by the camera control unit 21. The shutter release button includes a first switch SW 1 that is turned on when the button is pushed halfway and a second switch SW 2 that is turned on when the button is fully pushed.

Next, a data communication method between the camera body 2 and the lens barrel 3 will be described.

The camera body 2 is provided with a body-side mount unit 201 to which the lens barrel 3 is detachably attached. In addition, as illustrated in FIG. 1, at a position in the vicinity of the body-side mount unit 201 (the inner surface side of the body-side mount unit 201), a connecting portion 202 that protrudes toward the inner surface side of the body-side mount unit 201 is provided. The connecting portion 202 is provided with a plurality of electrical contacts.

On the other hand, the lens barrel 3 is an exchangeable lens which is detachably attached to the camera body 2, and the lens barrel 3 is provided with a lens-side mount unit 301 which is detachably attached to the camera body 2. In addition, as illustrated in FIG. 1, at a position in the vicinity of the lens-side mount unit 301 (the inner surface side of the lens-side mount unit 301), a connecting portion 302 that protrudes toward the inner surface side of the lens-side mount unit 301 is provided. The connecting portion 302 is provided with a plurality of electrical contacts.

If the lens barrel 3 is attached to the camera body 2, the electrical contacts of the connecting portion 202 provided to the body-side mount unit 201 and the electrical contacts of the connecting portion 302 provided to the lens-side mount unit 301 are electrically and physically connected. As a result, through the connecting portions 202 and 302, power can be supplied from the camera body 2 to the lens barrel 3, and data communication between the camera body 2 and the lens barrel 3 can be performed.

Figure 9:
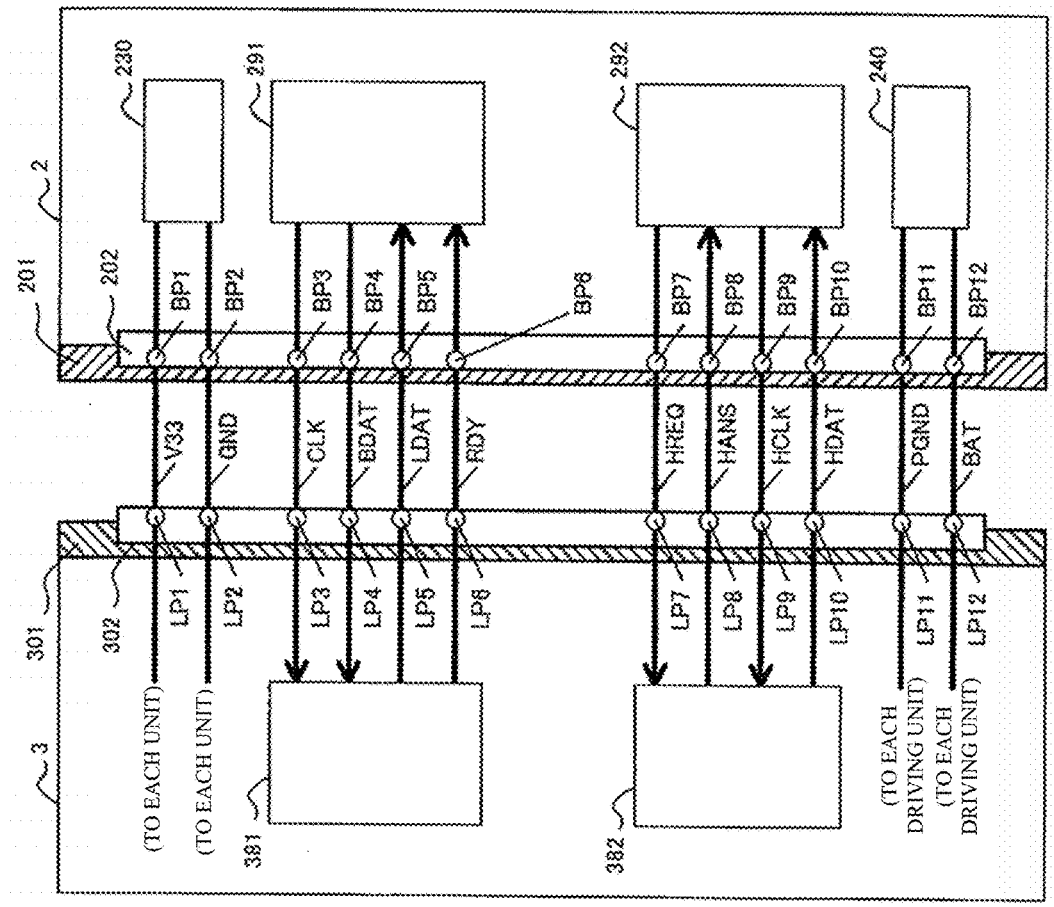
FIG. 9 is a schematic diagram illustrating details of connecting portions 202 and 302.

FIG. 9 is a schematic diagram illustrating details of the connecting portions 202 and 302. In addition, in FIG. 9, the connecting portion 202 is arranged on the right side of the body-side mount unit 201 in accordance with an actual mount structure. Namely, the connecting portion 202 according to the embodiment is arranged at a position deeper than the mount surface of the body-side mount unit 201 (a position on the right side of the body-side mount unit 201 in FIG. 9). Similarly, the structure where the connecting portion 302 is arranged on the right side of the lens-side mount unit 301 illustrates that the connecting portion 302 according to the embodiment is arranged at the position protruding from the mount surface of the lens-side mount unit 301. Since the connecting portion 202 and the connecting portion 302 are arranged in this manner, in the case of mount-connecting the camera body 2 and the lens barrel 3 by allowing the mount surface of the body-side mount unit 201 and the mount surface of the lens-side mount unit 301 to be in contact with each other, the connecting portion 202 and the connecting portion 302 are connected to each other, so that the electrical contacts provided on the connecting portions 202 and 302 are connected to each other.

As illustrated in FIG. 9, in the connecting portion 202, there are twelve electrical contacts BP1 to BP12. In addition, in the connecting portion 302 on the lens 3 side, there are twelve electrical contacts LP1 to LP12 corresponding to the twelve electrical contacts on the camera body 2 side.

The electrical contact BP1 and the electrical contact BP2 are connected to a first power supply circuit 230 in the camera body 2. The first power supply circuit 230 supplies an operating voltage to each component (except for circuits having relatively large power consumption such as the lens driving motors 321 and 331, and the like) in the lens barrel 3 through the electrical contact BP1 and the electrical contact LP1. The voltage value supplied from the first power supply circuit 230 through the electrical contact BP1 and the electrical contact LP1 is not particularly limited. For example, a voltage value of 3 to 4 V (typically, a voltage value approximate to 3.5 V in the middle of the voltage width) may be used. In this case, a current value supplied from the camera body side 2 to the lens barrel side 3 is a current value within a range of about several 10 mA to several 100 mA in the power-on state. The electrical contact BP2 and the electrical contact LP2 are ground terminals corresponding to the operating voltages supplied through the electrical contact BP1 and the electrical contact LP1.

The electrical contacts BP3 to BP6 are connected to a camera-side first communication unit 291, and the electrical contacts LP3 to LP6 are connected to a lens-side first communication unit 381 corresponding to the electrical contacts BP3 to BP6. Then, the camera-side first communication unit 291 and the lens-side first communication unit 381 transmit and receive signals to and from each other by using the electrical contacts. The details of communication performed by the camera-side first communication unit 291 and the lens-side first communication unit 381 will be described later.

The electrical contacts BP7 to BP10 are connected to a camera-side second communication unit 292, and the electrical contacts LP7 to LP10 are connected to a lens-side second communication unit 382 corresponding to the electrical contacts BP7 to BP10. Then, the camera-side second communication unit 292 and the lens-side second communication unit 382 transmit and receive signals to and from each other by using the electrical contacts. The details of communication performed by the camera-side second communication unit 292 and the lens-side second communication unit 382 will be described later.

The electrical contact BP11 and the electrical contact BP12 are connected to a second power supply circuit 240 in the camera body 2. The second power supply circuit 240 supplies an operation voltage to a circuit having a relatively large power consumption such as the lens driving motors 321, 331, and the like through the electrical contact BP11 and the electrical contact LP11. The voltage value supplied by the second power supply circuit 240 is not particularly limited. However, the maximum value of the voltage value supplied by the second power supply circuit 240 may be set to be about several times the maximum value of the voltage value supplied by the first power supply circuit 230. In addition, in this case, a current value supplied from the second power supply circuit 240 to the lens barrel 3 side is a current value within a range of about several 10 mA to several A in the power-on state. The electrical contact BP12 and the electrical contact LP12 are ground terminals corresponding to the operating voltages supplied through the electrical contact BP11 and the electrical contact LP11.

In addition, the first communication unit 291 and the second communication unit 292 on the camera body 2 side illustrated in FIG. 9 constitute the camera transmission/reception unit 29 illustrated in FIG. 2. The first communication unit 381 and the second communication unit 382 on the lens barrel 3 side constitute the lens transmission/reception unit 39 illustrated in FIG. 2.

Next, communication between the camera-side first communication unit 291 and the lens-side first communication unit 381 (hereinafter, referred to as command data communication) will be described. The lens control unit 36 performs the command data communication of performing transmission of control data from the camera-side first communication unit 291 to the lens-side first communication unit 381 and transmission of control data from the lens-side first communication unit 381 to the first camera-side first communication unit 381 in parallel at predetermined intervals (for example, 16 millisecond intervals) through a signal line CLK including electrical contacts BP3 and LP3, a signal line BDAT including electrical contacts BP4 and LP4, a signal line LDAT including electrical contacts BP5 and LP5, and a signal line RDY including electrical contacts BP6 and LP6.

Figure 10:
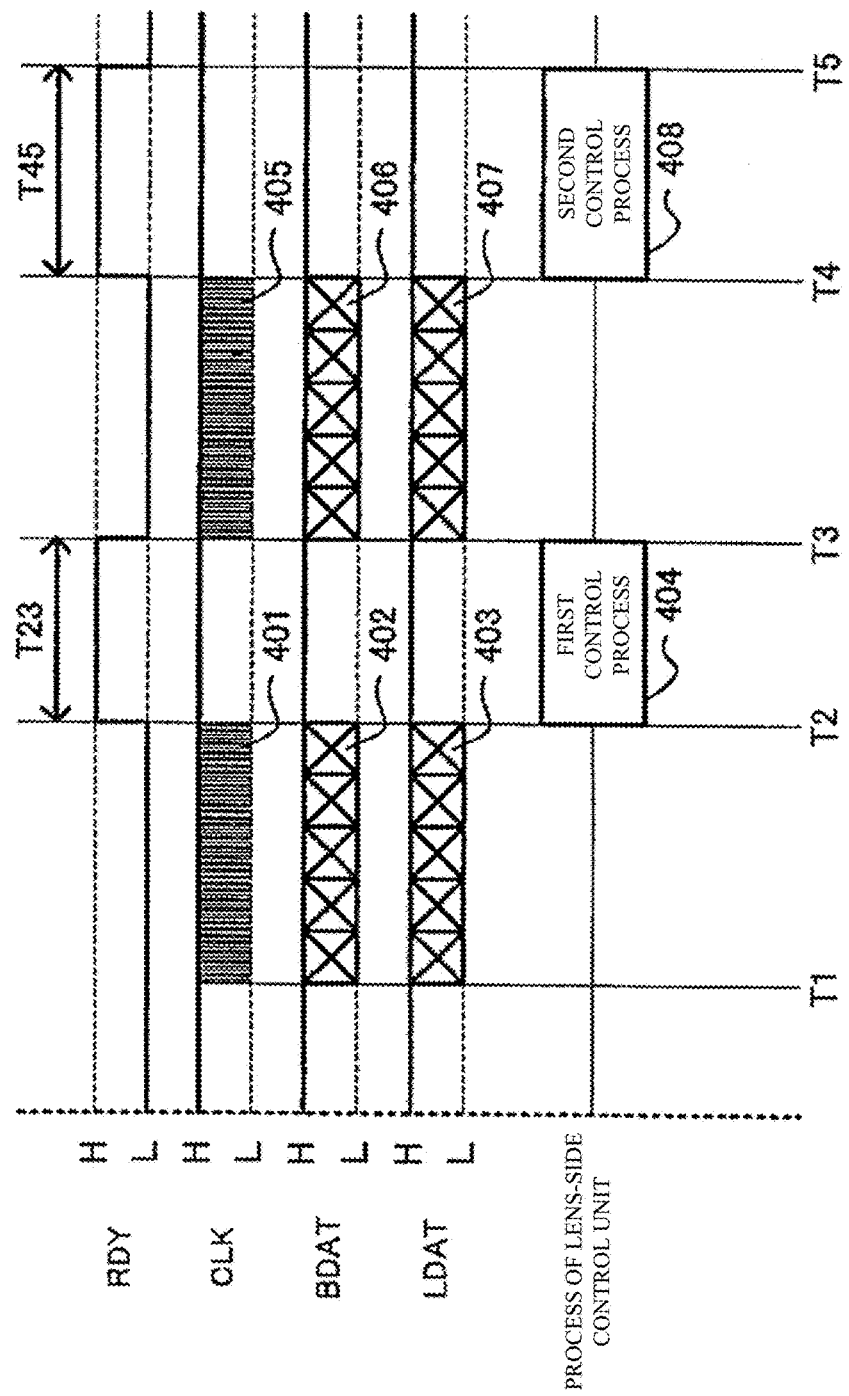
FIG. 10 is a diagram illustrating an example of command data communication.

FIG. 10 is a timing chart illustrating an example of the command data communication. The camera control unit 21 and the camera-side first communication unit 291 first check a signal level of the signal line RDY at the start time (T1) of the command data communication. Herein, the signal level of the signal line RDY indicates whether or not communication by the lens-side first communication unit 381 is enabled. In a case where the communication is disabled, a signal with an H (High) level is output by the lens control unit 36 and the lens-side first communication unit 381. In a case where the signal line RDY is at the H level, the camera-side first communication unit 291 does not perform communication with the lens barrel 3 or dos not perform the next process even in the case of communicating with the lens barrel 3.

On the other hand, in a case where the signal line RDY is at an L (LOW) level, the camera control unit 21 and the camera-side first communication unit 291 transmit a clock signal 401 to the lens-side first communication unit 381 through the signal line CLK. In addition, in synchronization with the clock signal 401, the camera control unit 21 and the camera-side first communication unit 291 transmit a camera-side command packet signal 402 as control data to the lens-side first communication unit 381 through the signal line BDAT. If the clock signal 401 is output, in synchronization with the clock signal 401, the lens control unit 36 and the lens-side first communication unit 381 transmit a lens-side command packet signal 403 as response data through the signal line LDAT.

The lens control unit 36 and the lens-side first communication unit 381 change the signal level of the signal line RDY from the L level to the H level in response to the completion of the transmission of the lens-side command packet signal 403 (T2). Then, the lens control unit 36 starts a first control process 404 according to contents of the camera-side command packet signal 402 received before the time T2.

For example, in a case where the received camera-side command packet signal 402 has a content of requesting specific data of the lens barrel 3 side, the lens control unit 36 performs a process of analyzing a content of the command packet signal 402 and generating the requested specific data as a first control process 404. In addition, as the first control process 404, the lens control unit 36 also performs a communication error checking process for simply checking whether or not there is an error in communication of the command packet signal 402 from the number of data bytes by using checksum data included in the command packet signal 402. The signal of the specific data generated in the first control process 404 is output to the camera body 2 side as a lens-side data packet signal 407(T3). In addition, in this case, a camera-side data packet signal 406 output from the camera body 2 side after the command packet signal 402 is dummy data (including checksum data) which has no particular meaning to the lens side. In this case, as a second control process 408, the lens control unit 36 performs the above-described communication error checking process by using the checksum data included in the camera-side data packet signal 406 (T4).

In addition, for example, in a case where the camera-side command packet signal 402 is a driving instruction of the focus lens 33 and the camera-side data packet signal 406 is driving speed and driving amount of the focus lens 33, as the first control process 404, the lens control unit 36 analyzes the content of the command packet signal 402 and generates a confirmation signal indicating that the content is understood (T2). The confirmation signal generated in the first control process 404 is output as the lens-side data packet signal 407 to the camera body 2 (T3). In addition, as a second control process 408, the lens control unit 36 analyzes the content of the camera-side data packet signal 406 and performs the communication error checking process by using the checksum data included in the camera-side data packet signal 406 (T4). After completion of the second control process 408, the lens control unit 36 drives the focus lens driving motor 331 on the basis of the received camera-side data packet signal 406, that is, the driving speed and driving amount of the focus lens 33, so that the focus lens 33 is driven only by the received driving amount at the received driving speed (T5).

If the second control process 408 is completed, the lens control unit 36 notifies the lens-side first communication unit 381 of the completion of the second control process 408. As a result, the lens control unit 36 outputs a signal with L level to the signal line RDY (T5).

The communication performed at each of the times T1 and T5 described above is one command data communication. As described above, in one command data communication, the camera control unit 21 and the camera-side first communication unit 291 transmit the camera-side command packet signal 402 and the camera-side data packet signal 406 one by one. In this manner, in the embodiment, the control data transmitted from the camera body 2 to the lens barrel 3 is divided into two to be transmitted for the sake of process. However, the two signals of the camera-side command packet signal 402 and the camera-side data packet signal 406 are combined to constitute one control data.

Similarly, in one command data communication, the lens control unit 36 and the lens-side first communication unit 381 transmit the lens-side command packet signal 403 and the lens-side data packet signal 407 one by one. In this manner, the response data transmitted from the lens barrel 3 to the camera body 2 is also divided into two. However, the two signals of the lens-side command packet signal 403 and the lens-side data packet signal 407 are combined to constitute one response data.

Next, communication between the camera-side second communication unit 292 and the lens-side second communication unit 382 (hereinafter, referred to as hot line communication) will be described. Returning to FIG. 9, the lens control unit 36 performs the hot line communication of performing communication at a period (for example, at intervals of 1 millisecond) shorter than that of the command data communication through a signal line HREQ including electrical contacts BP7 and LP7, a signal line HANS including electrical contacts BP8 and LP8, a signal line HCLK including electrical contacts BP9 and LP9, and a signal line HDAT including electrical contacts BP10 and LP10.

For example, in the embodiment, the lens information of the lens barrel 3 is transmitted from the lens barrel 3 to the camera body 2 through the hot line communication. The lens information transmitted through the hot line communication includes the lens position of the focus lens 33, the lens position of the zoom lens 32, the current position image plane movement coefficient $K_{cur}$, the minimum image plane movement coefficient $K_{min}$, the maximum image plane movement coefficient $K_{max}$, and the focus limit information. Herein, the current position image plane movement coefficient $K_{cur}$ is the image plane movement coefficient K corresponding to the current lens position (focal length) of the zoom lens 32 and the current lens position (imaging distance) of the focus lens 33. In the embodiment, the lens control unit 36 refers to a table listing the relationship between the lens position (zoom lens position and focus lens position) and the image plane movement coefficient K stored in the lens memory 37 to obtain the current position image plane movement coefficient $K_{cur}$ corresponding to the current lens position of 32 and the current lens position of the focus lens 33. For example, in the example illustrated in FIG. 6, in a case where the lens position (focal length) of the zoom lens 32 is in "f1" and the lens position (imaging distance) of the focus lens 33 is in "D4", the lens control unit 36 transmits "K14" as the current position image plane movement coefficient $K_{cur}$ to the camera control unit 21 through the hot line communication.

In addition, in the embodiment, the lens control unit 36 transmits the minimum image plane movement coefficient $K_{min}$ and the maximum image plane movement coefficient $K_{max}$ corresponding to the drivable range to the camera control unit 21 through the hot line communication. For example, in the example illustrated in FIG. 6, as illustrated in FIG. 7(A), in a case where the focus limit mode is set to "FULL mode", in a case where the lens position (focal length) of the zoom lens 32 is in "f1", the lens control unit 36 transmits "K11" as the minimum image plane movement coefficient $K_{min}$ and "K19" as the maximum image plane movement coefficient $K_{max}$ to the camera control unit 21 through the hot line communication. On the other hand, in the example illustrated in FIG. 6, as illustrated in FIG. 7(C), in a case where the focus limit mode is set to the "infinity-side limit mode" and the lens position (focal length) of the zoom lens 32 is in "f1", the lens control unit 36 transmits "K14" as the minimum image plane movement coefficient $K_{min}$ and "K19" as the maximum image plane movement coefficient $K_{max}$ to the camera control unit 21 through the hot line communication.

FIG. 11 is a timing chart illustrating an example of the hot line communication. FIG. 11(a) is a diagram illustrating a situation where the hot line communication is repeatedly performed every predetermined period Tn. FIG. 11(b) illustrates an enlarged period Tx of one communication among repeated hot-line communications. Hereinafter, a situation where the lens position of the focus lens 33 is communicated through the hot line communication will be described on the basis of the timing chart of FIG. 11 (b).

First, the camera control unit 21 and the camera-side second communication unit 292 output an L level signal to the signal line HREQ in order to start communication through the hot line communication (T6). Then, the lens-side second communication unit 382 notifies the lens control unit 36 that the signal is input to the electrical contact LP7. In response to this notification, the lens control unit 36 starts execution of a generation process 501 for generating lens position data. The generation process 501 is a process in which the lens control unit 36 causes the focus lens encoder 332 to detect the position of the focus lens 33 and generates the lens position data representing a detection result.

If the lens control unit 36 completes the generation process 501, the lens control unit 36 and the lens-side second communication unit 382 output a signal with an L level to the signal line HANS (T7). If the signal is input to the electrical contact BP8, the camera control unit 21 and the camera-side second communication unit 292 output a clock signal 502 from the electrical contact BP9 to the signal line HCLK.

The lens control unit 36 and the lens-side second communication unit 382 output a lens position data signal 503 representing lens position data from the electrical contact LP10 to the signal line HDAT in synchronization with the clock signal 502. If the transmission of the lens position data signal 503 is completed, the lens control unit 36 and the lens-side second communication unit 382 output a signal with an H level signal from the electrical contact LP8 to the signal line HANS (T8). Then, if the signal is input to the electrical contact BP8, the camera-side second communication unit 292 outputs a signal with an H level from the electrical contact LP7 to the signal line HREQ (T9).

In addition, the command data communication and the hot line communication can be executed simultaneously or in parallel.

Figure 12:
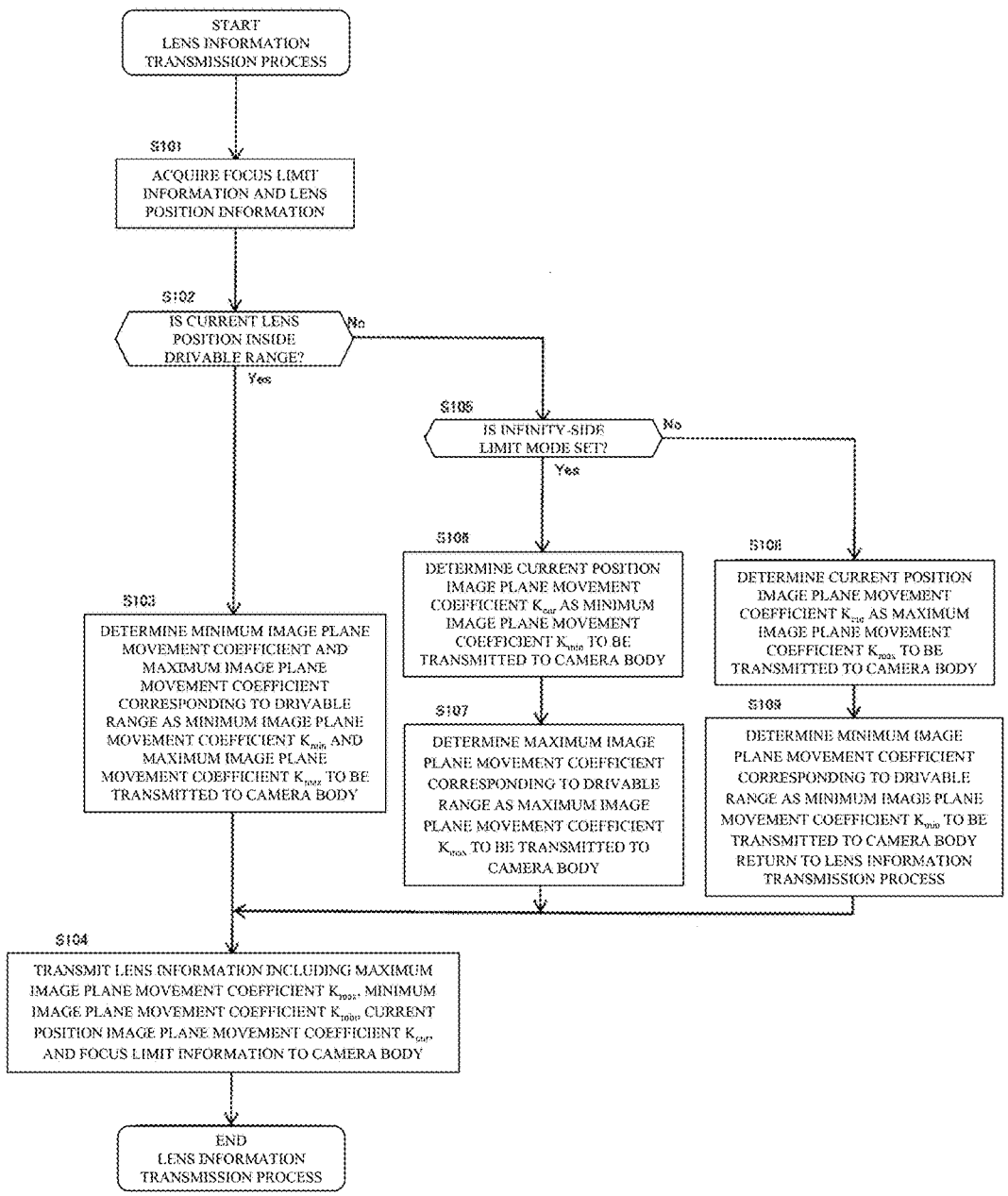
FIG. 12 is a flowchart illustrating a lens information transmission process according to the first embodiment.

Next, the lens information transmission process according to the first embodiment will be described with reference to FIG. 12. FIG. 12 is a flowchart illustrating the lens information transmission process according to the first embodiment. In addition, the following operation is repeatedly performed at predetermined intervals after the hot line communication is started by the lens control unit 36.

First, in step S101, the lens control unit 36 acquires focus limit information and information on the current lens position of the focus lens 33. In step S102, the lens control unit 36 determines whether or not the current lens position of the focus lens 33 is inside the drivable range on the basis of the focus limit information and the current lens position of the focus lens 33 acquired in step S101.

For example, in the case of the "FULL mode", if the focus lens position is within the range between the lens position of the infinity-end soft limit $SL_{IP}$ and the lens position of the near-end soft limit $SL_{NP}$, the lens barrel 3 determines that the current lens position of the focus lens 33 is inside the drivable range, and if the focus lens position is not within the range between the lens position of the infinity-end soft limit $SL_{IP}$ and the lens position of the near-end soft limit $SL_{NP}$, the lens barrel determines that the current lens position of the focus lens 33 does not exist inside the drivable range.

Similarly, in the case of the "rear-side limit mode", the lens barrel 3 determines whether or not the focus lens position is within the range between the lens position of the infinity-end soft limit $SL_{IP}$ and the lens position of the near-side soft limit $SL_{NS}$. In the case of the "infinity-side limit mode", the lens barrel 3 determines whether or not the focus lens position is within the range between the lens position of the infinity-side soft limit $SL_{IS}$ and the lens position of the near-end soft limit $SL_{NP}$.

Herein, the lens control unit 36 normally drives the focus lens 33 inside the drivable range. For this reason, the lens control unit 36 normally determines that the current lens position of the focus lens 33 is inside the drivable range. On the other hand, for example, in a case where the user changes the focus limit mode by operating the focus limit switch 38, and thus, the drivable range is changed, in some cases, the lens position of the focus lens 33 may temporarily become outside the drivable range. Herein, a case where the lens position of the focus lens 33 is outside the drivable range will be described with reference to FIG. 13 and FIG. 14.

Figure 13:
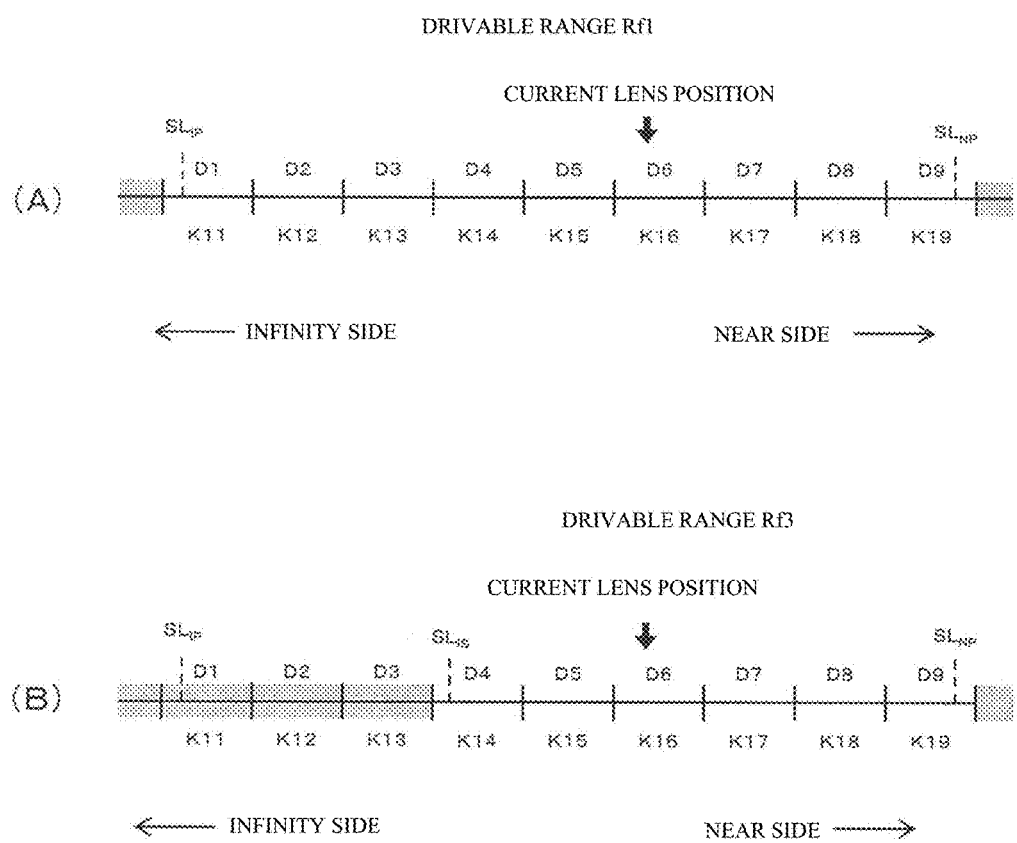
FIG. 13 is a diagram illustrating an example of a relationship among a lens position of a focus lens, an image plane movement coefficient, and a drivable range.
Figure 14:
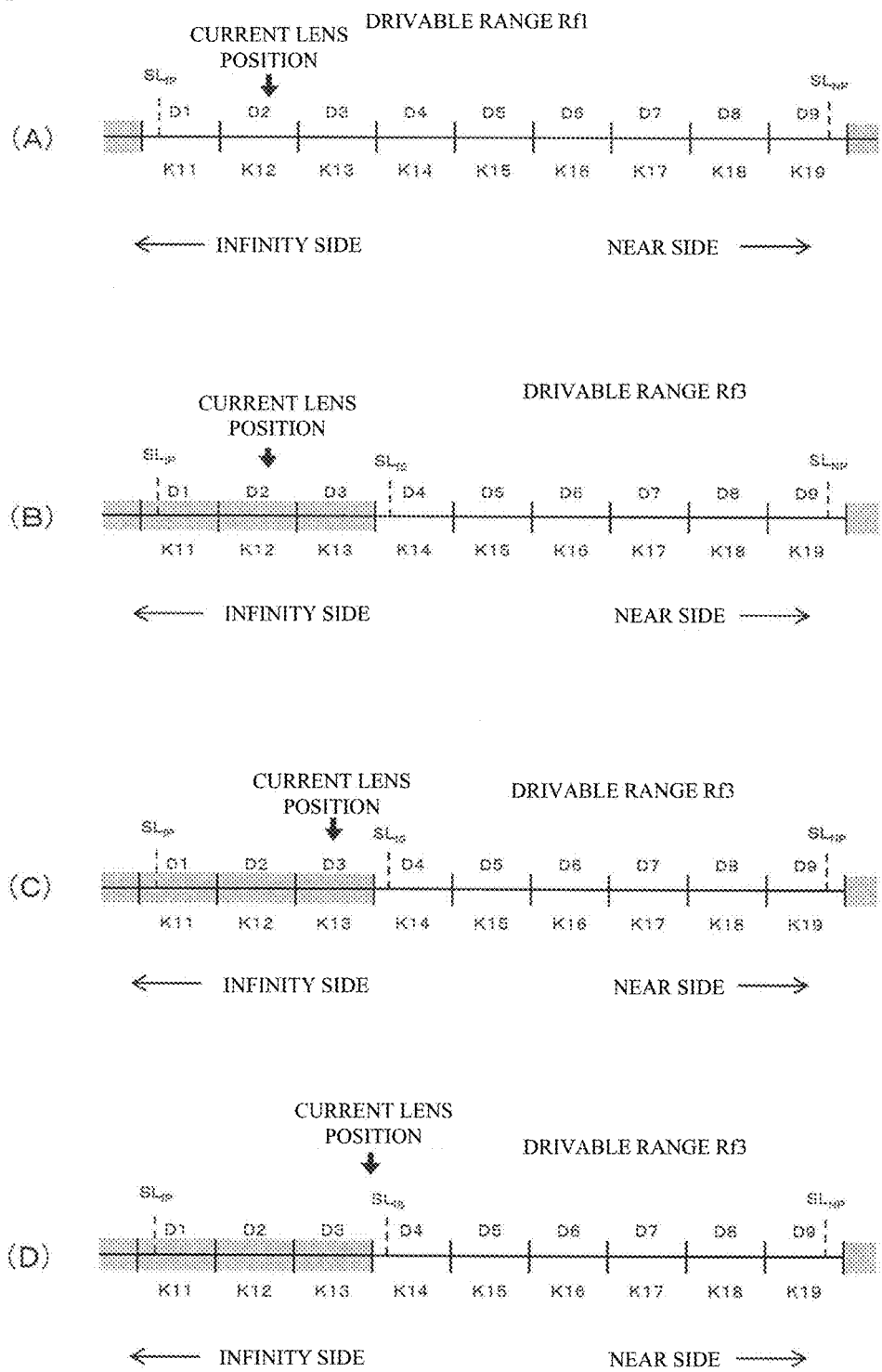
FIG. 14 is a diagram illustrating another example of a relationship between a lens position of a focus lens, an image plane movement coefficient, and a drivable range.

FIGS. 13 and 14 are diagrams illustrating examples of the relationship among the lens position of the focus lens 33, the image plane movement coefficient, and the drivable range. In addition, FIGS. 13 and 14 illustrate scenes in which the lens position (focal length) of the zoom lens 32 is in "f1" among the examples illustrated in FIG. 6.

For example, in the example illustrated in FIG. 13(A), "FULL mode" is set as the focus limit mode, and the range from the lens position of the infinity-end soft limit $SL_{IP}$ to the lens position of the near-end soft limit $SL_{NP}$ is set as the drivable range Rf1. In addition, in the example illustrated in FIG. 13(A), the current lens position of the focus lens 33 is within the area D6 of the drivable range Rf1. In this case, for example, in a case where the user operates the focus limit switch 38 to change the focus limit mode from the "FULL mode" to the "infinity-side limit mode", as illustrated in FIG. 13(B), the range from the lens position of the infinity-side soft limit $SL_{IS}$ to the lens position of the near-end soft limit $SL_{NP}$ is set as the drivable range Rf3. In this case, as illustrated in FIG. 13(B), the lens position of the focus lens 33 is inside the drivable range Rf3. For this reason, in step S102, the lens control unit 36 determines that the current lens position of the focus lens 33 is inside the drivable range.

On the other hand, in the example illustrated in FIG. 14(A), the lens position of the focus lens 33 is within the area D2 of the drivable range Rf1. In this case, for example, in a case where the user operates the focus limit switch 38 to change the focus limit mode from the "FULL mode" to the "infinity-side limit mode", as illustrated in FIG. 14(B), the current lens position of the focus lens 33 is outside the drivable range Rf3. For this reason, in step S102, the lens control unit 36 determines that the current lens position of the focus lens 33 is outside the drivable range. In this manner, in some cases, the focus lens 33 may temporarily exist outside the drivable range at the timing when the drivable range of the focus lens 33 is changed.

Then, in step S102, as a result of determining whether the current lens position of the focus lens 33 is inside or outside the drivable range, as illustrated in FIG. 13(B), in a case where it is determined that the current lens position of the focus lens 33 is inside the drivable range, the process proceeds to step S103. On the other hand, as illustrated in FIG. 14(B), in a case where it is determined that the current lens position of the focus lens 33 is outside the drivable range, the process proceeds to step S105.

In step S103, since it is determined that the current lens position of the focus lens 33 is inside the drivable range, the lens control unit 36 determines the minimum image plane movement coefficient $K_{min}$ and the maximum image plane movement coefficient $K_{max}$ as the minimum image plane movement coefficient $K_{min}$ and the maximum image plane movement coefficient $K_{max}$ to be transmitted to the camera body 2. For example, as illustrated in FIG. 13(A), in a case where the current lens position of the focus lens 33 is inside the drivable range Rf1, the minimum image plane movement coefficient $K_{min}$="K11" and the maximum image plane movement coefficient $K_{max}$="K19" corresponding to the drivable range Rf1 are determined as the minimum image plane movement coefficient $K_{min}$ and the maximum image plane movement coefficient $K_{max}$ to be transmitted to the camera body 2.

In addition, as illustrated in FIG. 13(B), even in a case where the drivable range of the focus lens 33 is changed, the lens position of the focus lens 33 after the change is inside the drivable range Rf3. Herein, in the example illustrated in FIG. 13(B), among the plurality of image plane movement coefficients "K14" to "K19" at the lens positions in the drivable range Rf3, "K14" is stored as the minimum image plane movement coefficient $K_{min}$ in the lens memory 37, and "K19" is stored as the maximum image plane movement coefficient $K_{max}$ in the lens memory 37. For this reason, "K14" which is the minimum image plane movement coefficient $K_{min}$ corresponding to the drivable range Rf3 and "K19" which is the maximum image plane movement coefficient $K_{max}$ corresponding to the drivable range Rf3 are determined as the minimum image plane movement coefficient $K_{min}$ and the maximum image plane movement coefficient $K_{max}$ to be transmitted to the camera body 2.

In step S104, lens information including the minimum image plane movement coefficient $K_{min}$ and the maximum image plane movement coefficient $K_{max}$ determined by the lens control unit 36 in step S103, the current position image plane movement coefficient $K_{cur}$ at the current lens position of the focus lens 33, the focus limit information, the focus lens position, and the zoom lens position is transmitted to the camera control unit 21. In addition, as described above, in a case where the current lens position of the focus lens 33 is inside the drivable range, the minimum image plane movement coefficient $K_{min}$ and the maximum image plane movement coefficient $K_{max}$ corresponding to the drivable range are transmitted to the camera control unit 21. In addition, the lens control unit 36 transmits the lens information to the camera control unit 21 through the hot line communication.

On the other hand, as illustrated in FIG. 14(B), in a case where it is determined in step S102 that the current lens position of the focus lens 33 is outside the drivable range, the process proceeds to step S105. In step S105, the lens control unit 36 determines whether or not the "infinity-side limit mode" is set as the focus limit mode. In a case where the "infinity-side limit mode" is set, the process proceeds to step S106, and on the other hand, in a case where the "rear-side limit mode" is set, the process proceeds to step S108.

In step S106, as illustrated in FIG. 14(B), since the focus limit mode is set to the "infinity-side limit mode", it is considered that the current lens position of the focus lens 33 is temporarily outside the drivable range Rf3. In this case, as illustrated in FIG. 14(B), it can be determined that the current lens position of the focus lens 33 is closer to the infinity side than the drivable range Rf3 of the focus lens 33. For example, in the example illustrated in FIG. 14(B), the current lens position of the focus lens 33 is inside the area "D2", and the lens position at the near side closest to the drivable range Rf3 is inside the area "D9". In this case, the lens control unit 36 determines the smallest current position image plane movement coefficient $K_{cur}$ "K12" among the image plane movement coefficients of the areas D2 to D9 of the lens position as the minimum image plane movement coefficient $K_{min}$ to be transmitted to the camera body 2.

In addition, subsequently, in step S107, the lens control unit 36 determines the maximum image plane movement coefficient $K_{max}$ corresponding to the focusable range as the maximum image plane movement coefficient $K_{max}$ to be transmitted to the camera body 2. For example, in the example illustrated in FIG. 14(B), the current lens position of the focus lens 33 is inside the area "D2" and the lens position at the near side closest to the drivable range Rf3 is inside the area "D9". In this case, the lens control unit 36 determines the image plane movement coefficient "K19" of the lens position of the closest near side of the largest drivable range Rf3 among the image plane movement coefficients of the areas D2 to D9 of the lens position as the maximum image plane movement coefficient $K_{max}$ (the maximum image plane movement coefficient $K_{max}$ corresponding to the drivable range Rf3) to be transmitted to the camera body 2.

Then, the process proceeds to step S104, and in step S104, lens information including the minimum image plane movement coefficient $K_{min}$ determined in step S106, the maximum image plane movement coefficient $K_{max}$ determined in step S107, the current position image plane movement coefficient $K_{cur}$, the focus limit information, the focus lens position, the zoom lens position is transmitted to the camera control unit 21 through the hot line communication.

On the other hand, in a case where it is determined in step S105 that the "rear-side limit mode" is set, the process proceeds to step S108. In this case, since the focus limit mode is set to the "rear-side limit mode", it is considered that the current lens position of the focus lens 33 is temporarily outside the drivable range Rf2. In this case, it can be determined that the current lens position of the focus lens 33 is closer to the near side than the drivable range Rf2 of the focus lens 33. For example, in a case where the current lens position of the focus lens 33 is in the area "D8" and the lens position on the infinity side of the drivable range Rf2 is in the area "D1" (not illustrated), the lens control unit 36 determines the largest current image plane movement coefficient $K_{cur}$ "K18" among the image plane movement coefficients of the areas D1 to D8 of the lens position as the maximum image plane movement coefficient $K_{max}$ to be transmitted to the camera body 2. In addition, in the subsequent step S109, in a case where the current lens position of the focus lens 33 is in the area "D8" and the lens position on the infinity side of the drivable range Rf2 is in the area "D1", the lens control unit 36 determines the image plane movement coefficient "K11" of the lens position on the infinity side of the smallest drivable range Rf2 among the image plane movement coefficients of the areas D1 to D8 of the lens position as the minimum image plane movement coefficient $K_{min}$ (the minimum image plane movement coefficient $K_{min}$ corresponding to the drivable range Rf2) to be transmitted to the camera body 2).

Then, the process proceeds to step S104, the lens information including the maximum image plane movement coefficient $K_{max}$ determined in step S108, the minimum image plane movement coefficient $K_{min}$ determined in step S109, the current position image plane movement coefficient $K_{cur}$, the focus limit information, the focus lens position, and the zoom lens position is transmitted to the camera control unit 21 through the hot line communication.

Figure 15:
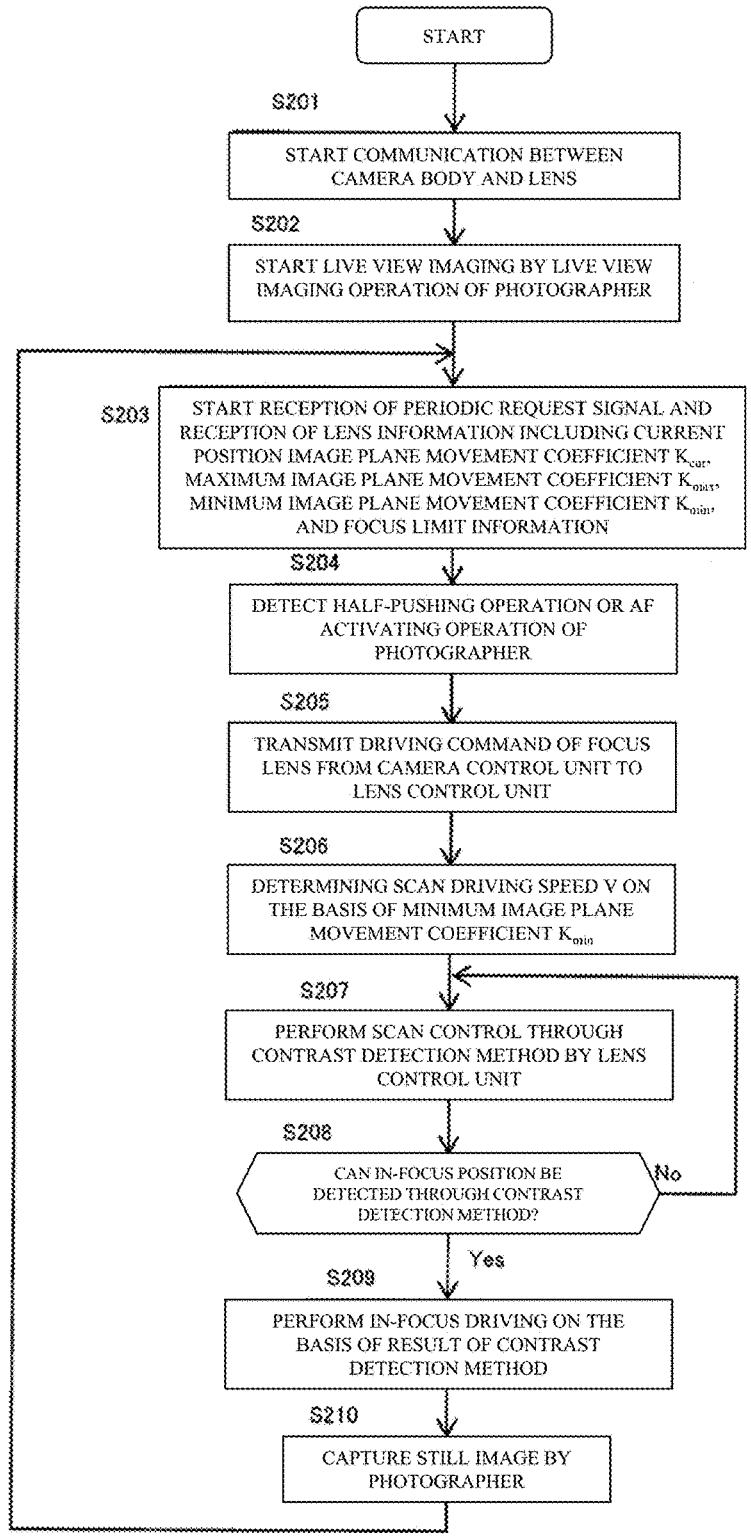
FIG. 15 is a flowchart illustrating an example of operations according to the embodiment.

Next, an example of operations of the camera 1 according to the embodiment will be described with reference to FIG. 15. FIG. 15 is a flowchart illustrating the operations of the camera 1 according to the embodiment. The following operations are started when the power of the camera 1 is turned on.

First, in step S201, the camera body 2 performs communication for identifying the lens barrel 3. This is because the communication type that can be communicated differs depending on the type of the lens barrel. Then, the process proceeds to step S202, and in step S202, it is determined whether or not the photographer has turned on a live view imaging on/off switch provided in the operation unit 28. In a case where it is determined that the live view imaging is turned on, the mirror system 220 is at the imaging position of the subject, and a light flux from the subject is guided to the imaging element 22.

In step S203, the hot line communication is started between the camera body 2 and the lens barrel 3. In the hot line communication, as described above, the L level signal (request signal) output to the signal line HREQ is transmitted to the lens control unit 36 by the camera control unit 21 and the camera-side second communication unit 292. Therefore, the lens control unit 36 transmits the lens information to the camera control unit 21, and the camera control unit 21 receives the lens information transmitted from the lens control unit 36. In addition, the lens control unit 36 repeatedly transmits the request signal to the camera control unit 21, so that the camera control unit 21 repeatedly receives the lens information from the camera control unit 21. In addition, the lens information includes, for example, information of the lens position of the focus lens 33, the lens position of the zoom lens 32, the current position image plane movement coefficient $K_{cur}$, the minimum image plane movement coefficient $K_{min}$, the maximum image plane movement coefficient $K_{max}$, and the focus limit information. In addition, the hot line communication is repeatedly performed after step S203, for example, until the power switch is turned off.

In addition, in the embodiment, when the minimum image plane movement coefficient $K_{min}$ and the maximum image plane movement coefficient $K_{max}$ are transmitted, the lens control unit 36 transmits the minimum image plane movement coefficient $K_{min}$ and the maximum image plane movement coefficient $K_{max}$ determined in the lens information transmission process illustrated in FIG. 12 to the camera control unit 21. Namely, in a case where the current lens position of the focus lens 33 is inside the drivable range, the lens control unit 36 transmits the minimum image plane movement coefficient $K_{min}$ and the maximum image plane movement coefficient $K_{max}$ corresponding to the drivable ranges to the camera control unit 21. On the other hand, in a case where the current lens position of the focus lens 33 is outside the drivable range, in a case where the "infinity-side limit mode" is set, the lens control unit 36 transmits the maximum image plane movement coefficient $K_{max}$ corresponding to the drivable range Rf3 to the camera control unit 21 and transmits the current position image plane movement coefficient $K_{cur}$ as the minimum image plane movement coefficient $K_{min}$ to the camera control unit 21. In addition, in a case where the "rear-side limit mode" is set, the lens control unit 36 transmits the minimum image plane movement coefficient $K_{min}$ corresponding to the drivable range Rf2 to the camera control unit 21 and transmits the current position image plane movement coefficient $K_{cur}$ as the maximum image plane movement coefficient $K_{max}$ to the camera control unit 21. As a result, the camera control unit 21 receives different minimum image plane movement coefficients $K_{min}$ or maximum image plane movement coefficients $K_{max}$ between a case where the current lens position of the focus lens 33 is outside the drivable range and a case where the current lens position of the focus lens is inside the drivable range.

In addition, in the embodiment, the camera control unit 21 receives the focus limit information from the lens control unit 36. For example, in a case where the "rear-side limit mode" illustrated in FIG. 4(B) is set, the camera control unit 21 receives the infinity-end soft limit $SL_{IP}$ and the near-side soft limit $SL_{NS}$ which are the references the limit position of the drivable range Rf2 in the "rear-side limit mode" as the focus limit information from the lens control unit 36.

In step S204, it is determined whether or not a half-pushing operation (ON of the first switch SW1) of the release button provided on the operation unit 28, an AF activating operation, or the like has been performed by the photographer. If such an operation has been performed, the process proceeds to step S205 (hereinafter, a case where the half-pushing operation has been performed will be described in detail).

In step S205, the camera control unit 21 transmits a scan driving command (scan driving start instruction) to the lens control unit 36 in order to perform the focus detection by using the contrast detection method. The scan driving command (instruction of the driving speed at the time of the scan driving or instruction of the driving position) to the lens control unit 36 may be given at a driving speed of the focus lens 33, may be given at an image plane moving speed, or may be given as at a target drive position or the like.

In step S206, the camera control unit 21 determines the scan driving speed V, which is the driving speed of the focus lens 33 in the scanning operation on the basis of the minimum image plane movement coefficient $K_{min}$ acquired in step S203.

The scanning operation is an operation of allowing the focus lens driving motor 331 to drive the focus lens 33 the scan driving speed V determined in step S206, allowing the camera control unit 21 to simultaneously perform calculation of the focus evaluation value by using the contrast detection method at predetermined intervals, and thus to perform detection of the in-focus position by using the contrast detection method at predetermined intervals.

In this scanning operation, when the in-focus position is to be detected by the contrast detection method, the camera control unit 21 calculates the focus evaluation value at a predetermined sampling interval while scan-driving the focus lens 33, and the lens position at which the calculated focus evaluation value is a peak is detected as the in-focus position. More specifically, the camera control unit 21 scan-drives the focus lens 33 to movie the image plane by the optical system in the direction of the optical axis, so that focus evaluation values are calculated on different image planes, and the lens position at which the focus evaluation value is a peak is detected as the in-focus position. On the other hand, however, if the image plane moving speed is too high, the interval between the image planes for calculating the focus evaluation value becomes too large, and thus, it may be impossible to appropriately detect the in-focus position. In particular, since the image plane movement coefficient K indicating the moving amount of the image plane with respect to the driving amount of the focus lens 33 changes depending on the lens position in the optical axis direction of the focus lens 33, even in a case where the focus lens 33 is driven at a constant speed, the image plane moving speed may be too high depending on the lens position of the focus lens 33. As a result, in some cases, the distance between the image planes for calculating the focus evaluation value becomes too large, and thus, the in-focus position may not be appropriately detected.

Therefore, in the embodiment, the camera control unit 21 calculates the scan driving speed V at the time of performing the scan drive of the focus lens 33 on the basis of the latest minimum image plane movement coefficient $K_{min}$ received from the lens control unit 36. The camera control unit 21 uses a minimum image plane movement coefficient $K_{min}$ to calculate the scan driving speed V which is a driving speed so that the in-focus position can be appropriately detected by the contrast detection method and which is the highest driving speed.

In the embodiment, as described above, the minimum image plane movement coefficient $K_{min}$ to be transmitted to the camera control unit 21 is determined by the lens information transmission process illustrated in FIG. 12. Namely, as illustrated in FIG. 13(A) or FIG. 13(B), in a case where the current lens position of the focus lens 33 is inside the drivable range, the minimum image plane movement coefficient $K_{min}$ corresponding to the drivable range is transmitted to the camera control unit 21. And, as illustrated in 14(B), in a case where the current lens position of the focus lens 33 is outside the drivable range, the current position image plane movement coefficient $K_{cur}$ is transmitted as the minimum image plane movement coefficient $K_{min}$ to the camera control unit 21. For this reason, as illustrated in FIG. 13(A) or FIG. 13(B), in a case where the current lens position of the focus lens 33 is inside the drivable range, the camera control unit 21 calculates the scan driving speed V on the basis of the minimum image plane movement coefficient $K_{min}$ corresponding to the drivable range. On the other hand, as illustrated in FIG. 14(B), in a case where the current lens position of the focus lens 33 is outside the drivable range, the camera control unit 21 calculates the scan driving speed V on the basis of the minimum image plane movement coefficient $K_{min}$ having a value equal to the current position image plane movement coefficient $K_{cur}$.

In step S207, the scanning operation is started at the scan driving speed V determined in step S206. More specifically, the camera control unit 21 transmits a scan driving start command to the lens control unit 36. The lens control unit 36 drives the focus lens driving motor 331 on the basis of the command from the camera control unit 21 to scan-drive the focus lens 33 at the scan driving speed V determined in step S207. Then, while scan-driving the focus lens 33 at the scan driving speed V, the camera control unit 21 performs reading the pixel output from the imaging pixels of the imaging element 22 at predetermined intervals and calculates the focus evaluation values on the basis of the read pixel output. As a result, by acquiring the focus evaluation values at different focus lens positions, the camera control unit performs the detection of the in-focus position by using the contrast detection method.

Next, in step S208, the camera control unit 21 determines whether or not the peak value of the focus evaluation values can be detected (whether or not the in-focus position can be detected). In a case where the peak value of the focus evaluation values cannot be detected, the process returns to step S207 to repeat the operations of steps S207 and S208 until the peak value of the focus evaluation values can be detected or the focus lens 33 is driven to the predetermined drive end. On the other hand, when the peak value of the focus evaluation values can be detected, the process proceeds to step S209.

When the peak value of the focus evaluation values can be detected, the process proceeds to step S209, and in step S209, the camera control unit 21 transmits a command for performing in-focus driving to the position corresponding to the peak value of the focus evaluation values to the lens control unit 36. The lens control unit 36 performs driving control of the focus lens 33 according to the received command.

Next, the process proceeds to step S210. In step 210, the camera control unit 21 determines that the focus lens 33 has reached a position corresponding to the peak value of the focus evaluation values, and when the photographer performs a full-pushing operation of the shutter release button (when the second switch SW 2 is turned on), the imaging control of the still image is performed. After the imaging control is completed, the process returns to step S203.

Next, a backlash filling determination process according to the embodiment will be described. In the backlash filling determination process, in the flowchart illustrated in FIG. 15, in a case where the in-focus position can be detected by the contrast detection method in step S208, when the in-focus driving is performed on the basis of the result of the contrast detection method in step S209, it is determined whether or not the backlash filling driving is to be performed, and the driving form of the focus lens 33 at the time of in-focus driving is set to be different on the basis of this determination.

Figure 16:
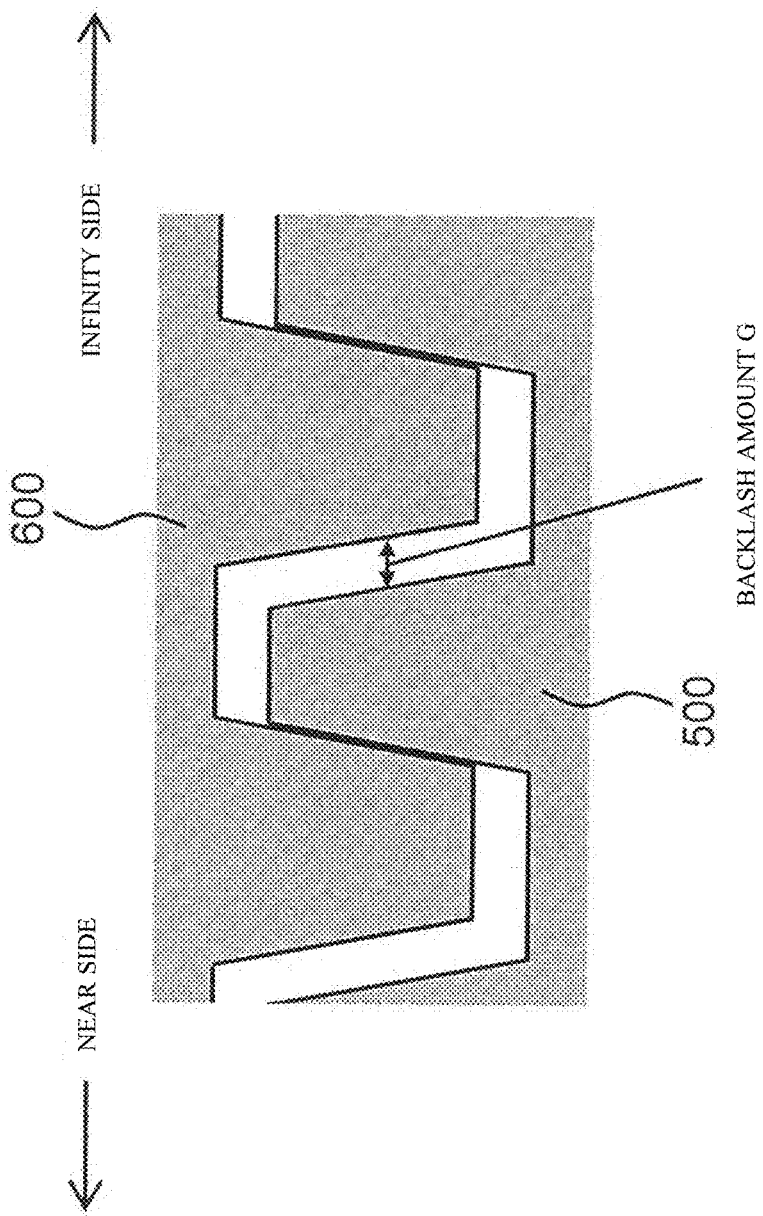
FIG. 16 is a diagram illustrating a backlash amount G of a driving transmission mechanism of a focus lens.

Namely, the focus lens driving motor 331 for driving the focus lens 33 illustrated in FIG. 2 is usually configured with a mechanical driving transmission mechanism. As illustrated in FIG. 16, the driving transmission mechanism is configured with, for example, a first driving mechanism 500 and a second driving mechanism 600. If the first driving mechanism 500 is driven, the second driving mechanism 600 of the focus lens 33 side is configured to be driven in accompany with the driving, so that the focus lens 33 is moved to the near side or the infinity side. In such a drive mechanism, a backlash amount G is normally provided from the viewpoint of smooth operation of engagement portions of gears. On the other hand, in the contrast detection method, as illustrated in FIGS. 17(A) and 17(B), on the mechanism, there is a need where the focus lens 33 passes through the in-focus position by the scanning operation once, and after that, the focus lens is driven to the in-focus position in the reverse driving direction. In this case, as illustrated in FIG. 17(B), in a case where the backlash filling driving is not performed, there is a characteristic that the lens position of the focus lens 33 deviates from the in-focus position by the backlash amount G. For this reason, in order to eliminate such influence of the backlash amount G, as illustrated in FIG. 17(A), when performing the in-focus driving of the focus lens 33, there is a need to perform the backlash filling driving where, after the focus lens passes through the in-focus position once, the focus lens is driven to the in-focus position in the reversed driving direction.

Figure 17:
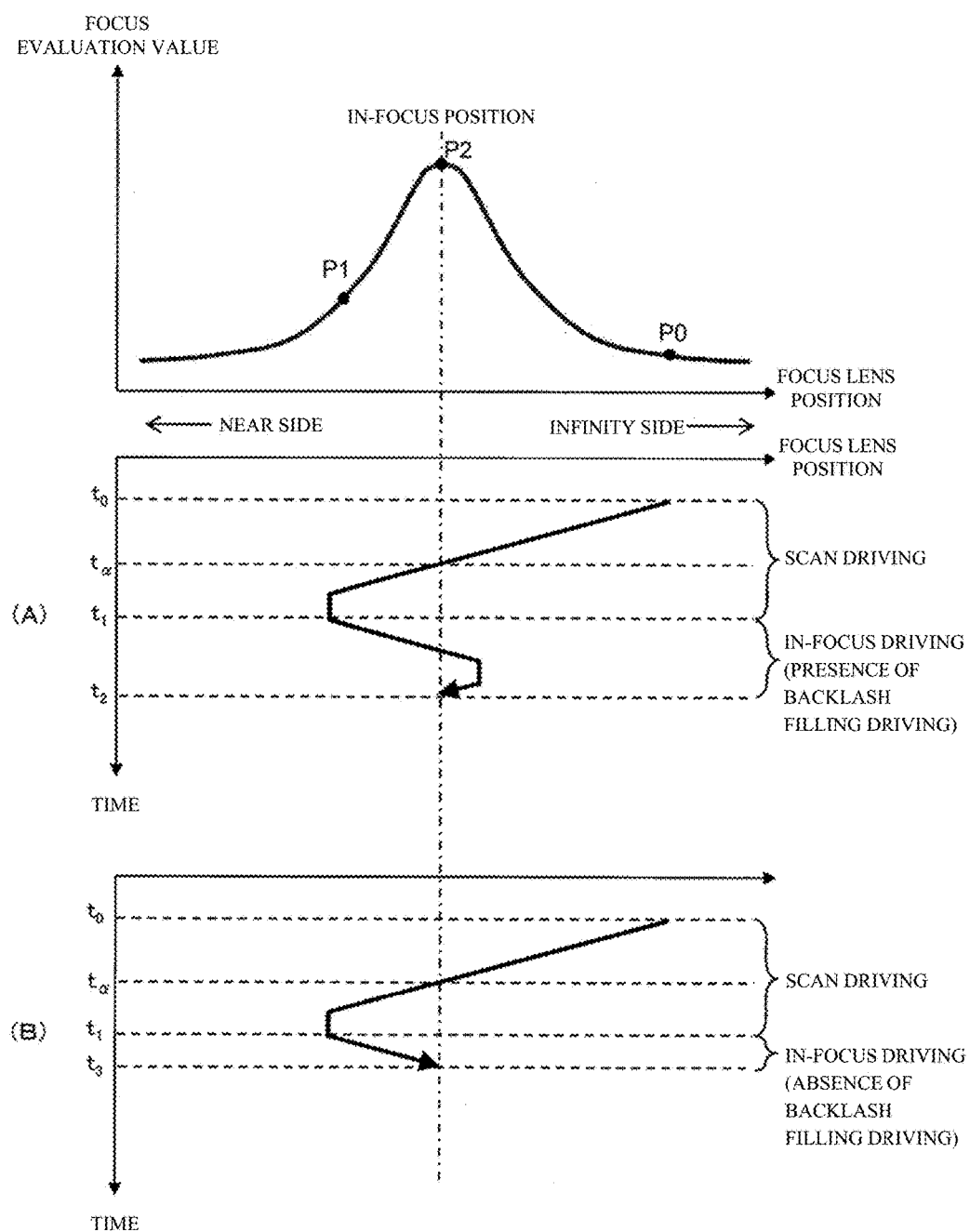
FIG. 17 is a diagram illustrating a relationship between a focus lens position and a focus evaluation value and a relationship between a focus lens position and a time in performing a scanning operation and in-focus driving on the basis of a contrast detection method.

In addition, FIG. 17 illustrates a relationship between the focus lens position and the focus evaluation value and a relationship between the focus lens position and the time when the in-focus driving on the basis of the scanning operation and the contrast detection method according to the embodiment is performed. Then, FIG. 17(A) illustrates an aspect of starting the scanning operation of the focus lens 33 from the lens position P0 toward from the infinity side to the near side at the time t0, after that, at the time t1, if the peak position (in-focus position) P2 of the focus evaluation value is detected at the time when the focus lens 33 is moved to the lens position P1 stopping the scanning operation and performing the in-focus driving in accompany with the backlash filling driving, and thus, driving the focus lens 33 to the in-focus position at the time t2. On the other hand, similarly, FIG. 17(B) illustrates an aspect of starting the scanning operation at the time t0, after that, stopping the scanning operation at the time t1 to perform the in-focus driving without being accompanied with the backlash filling driving, and thus, driving the focus lens 33 to the in-focus position at the time t3.

Figure 18:
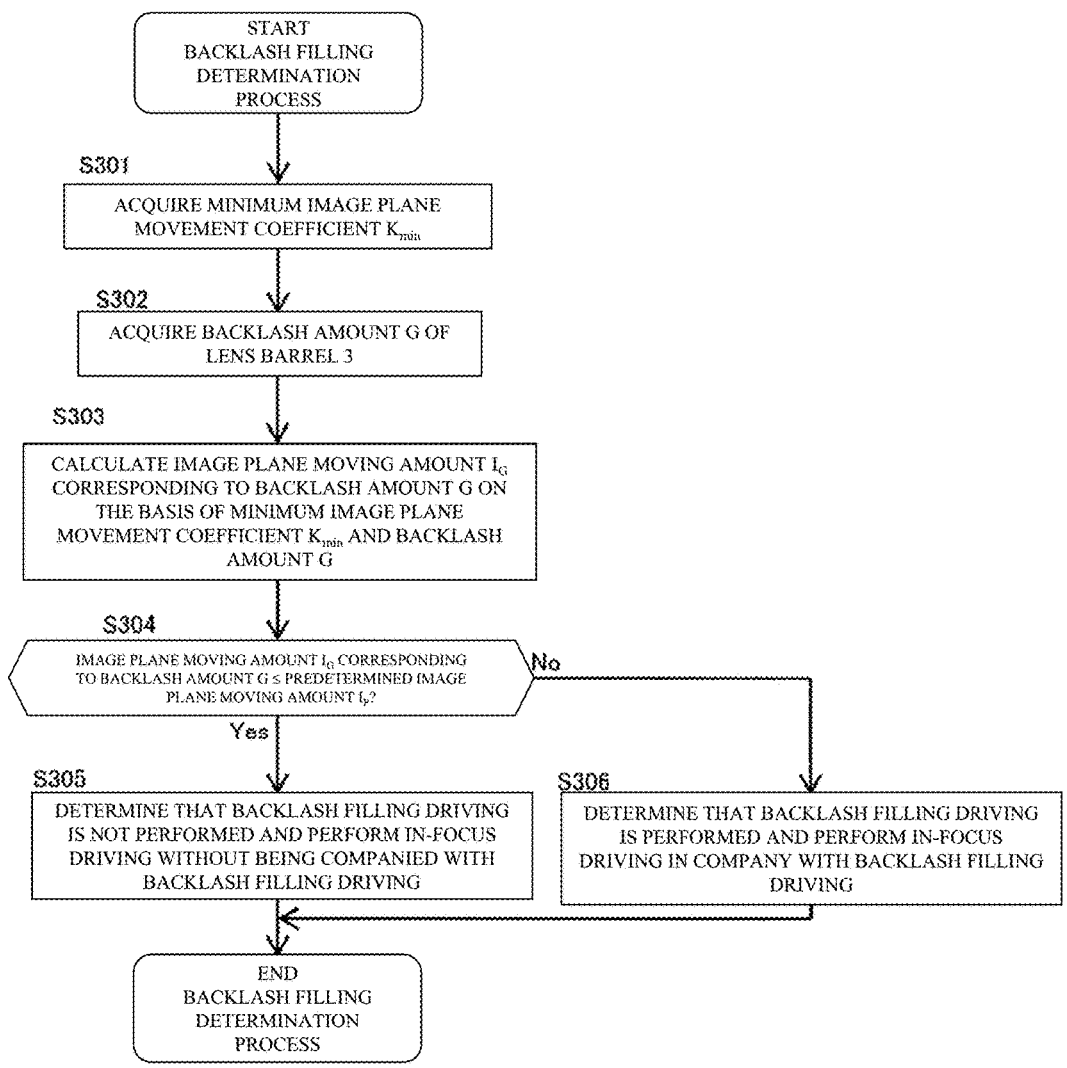
FIG. 18 is a flowchart illustrating a backlash filling determination process.

An operation example of a backlash filling process will be described below with reference to a flowchart illustrated in FIG. 18. In addition, the following operation is performed when the in-focus position is detected through the contrast detection method in step S209 in the flowchart illustrated in FIG. 15 described above. Namely, as illustrated in FIGS. 17(A) and 17(B), the scanning operation is started from the time t0, and at the time t1, in a case where the peak position (in-focus position) P2 of the focus evaluation value is detected at the time when the focus lens 33 is moved to the lens position P1, the operation is at the time t1.

Namely, if the in-focus position is detected by the contrast detection method, first, in step S301, the camera control unit 21 acquires the minimum image plane movement coefficient $K_{min}$ at the current lens position of the zoom lens 32. In addition, the minimum image plane movement coefficient $K_{min}$ can be acquired from the lens control unit 36 through the lens transmission/reception unit 39 and the camera transmission/reception unit 29 through the hot line communication performed between the camera control unit 21 and the lens control unit 36.

Next, in step S302, the camera control unit 21 acquires information of the backlash amount G (refer to FIG. 11) of the driving transmission mechanism of the focus lens 33. In addition, the backlash amount G of the driving transmission mechanism of the focus lens 33 can be acquired, for example, by storing the backlash amount in the lens memory 37 provided in the lens barrel 3 in advance and referring to the backlash amount. Namely, more specifically, the camera control unit 21 transmits a transmission request for the backlash amount G of the driving transmission mechanism of the focus lens 33 to the lens control unit 36 through the camera transmission/reception unit 29 and the lens transmission/reception unit 39, and the information can be acquired by allowing the lens control unit 36 to transmit the information of the backlash amount G of the driving transmission mechanism of the focus lens 33 stored in the lens memory 37. Alternatively, in some aspect, the lens information transmitted and received through the hot line communication performed between the camera control unit 21 and the lens control unit 36 described above may include the information of the backlash amount G of the driving transmission mechanism of the focus lens 33 stored in the lens memory 37.

Next, in step S303, the camera control unit 21 calculates the image plane moving amount $I_G$ corresponding to the backlash amount G on the basis of the information of the minimum image plane movement coefficient $K_{min}$ acquired in step S301 described above and the information of the backlash amount G of the driving transmission mechanism of the focus lens 33 acquired in step S302. In addition, the image plane moving amount $I_G$ corresponding to the backlash amount G is the moving amount of the image plane in a case where the focus lens is driven only by the same amount as the backlash amount G. In the embodiment, the image plane moving amount $I_G$ is calculated according to the following formula.

(Image Plane moving amount corresponding to Backlash Amount $GG$)=(Backlash Amount $G$)×(Minimum Image Plane Movement Coefficient $K_{min}$)

In addition, in the embodiment, as described above, the minimum image plane movement coefficient $K_{min}$ to be transmitted to the camera control unit 21 is determined by the lens information transmission process illustrated in FIG. 12. Namely, as illustrated in FIG. 13(A) or FIG. 13(B), in a case where the current lens position of the focus lens 33 is inside the drivable range, the minimum image plane movement coefficient $K_{min}$ corresponding to the drivable range is transmitted to the camera control unit 21. And, as illustrated in 14(B), in a case where the current lens position of the focus lens 33 is outside the drivable range, the current position image plane movement coefficient $K_{cur}$ is transmitted as the minimum image plane movement coefficient $K_{min}$ to the camera control unit 21. For this reason, as illustrated in FIG. 13(A) or FIG. 13(B), in a case where the current lens position of the focus lens 33 is inside the drivable range, the camera control unit 21 calculates the image plane moving amount $I_G$ corresponding to the backlash amount G on the basis of the minimum image plane movement coefficient $K_{min}$. On the other hand, as illustrated in FIG. 14(B), in a case where the current lens position of the focus lens 33 is outside the drivable range, the camera control unit 21 calculates the image plane moving amount $I_G$ corresponding to the backlash amount G on the basis of the minimum image plane movement coefficient $K_{min}$ having a value equal to the current position image plane movement coefficient $K_{cur}$.

Next, in step S304, the camera control unit 21 compares the image plane moving amount $I_G$ corresponding to the backlash amount G calculated in step S303 described above with the predetermined image plane moving amount $I_P$, and the camera control unit determines on the basis of the result of the comparison whether or not the image plane moving amount $I_G$ corresponding to the backlash amount G is equal to or smaller than the predetermined image plane moving amount $I_P$, namely, whether or not the "image plane moving amount $I_G$ corresponding to the backlash amount G"≤the "predetermined image plane moving amount $I_P$". In addition, the predetermined image plane moving amount $I_P$ is set corresponding to the focal depth of the optical system and is usually set as the image plane moving amount corresponding to the focal depth. Since the predetermined image plane moving amount $I_P$ is set to the focal depth of the optical system, the predetermined image plane moving amount may be appropriately set according to an F value, a cell size of the imaging element 22, and a format of the image to be captured. Namely, the larger the F value is, the larger the predetermined image plane moving amount $I_P$ can be set. Alternatively, the larger the cell size of the imaging element 22 is, or the smaller the image format is, the larger the predetermined image plane moving amount $I_P$ can be set. Then, in a case where the image plane moving amount $I_G$ corresponding to the backlash amount G is equal to or smaller than the predetermined image plane moving amount $I_P$, the process proceeds to step S305. On the other hand, in a case where the image plane moving amount $I_G$ corresponding to the backlash amount G is larger than the predetermined image plane moving amount $I_P$, the process proceeds to step S306.

In step S305, since it is determined that the image plane moving amount $I_G$ corresponding to the backlash amount G is equal to or smaller than the predetermined image plane moving amount $I_P$ in the above-described step S304, in this case, even in a case where backlash filling driving is not performed, it is determined that the lens position of the focus lens 33 after the driving can be within the focal depth of the optical system, and it is decided not to perform the backlash filling driving at the time of the in-focus driving. And on the basis of the determination, the in-focus driving is performed without being accompanied with the backlash filling driving. Namely, at the time of performing the in-focus driving, it is decided to drive the focus lens 33 directly to the in-focus position. And, on the basis of the determination, as illustrated in FIG. 17(B), the in-focus driving is performed without being accompanied with the backlash filling driving.

On the other hand, in step S306, since it is determined that the image plane moving amount $I_G$ corresponding to the backlash amount G is larger than the predetermined image plane moving amount $I_P$ in the above-described step S304, in this case, if backlash filling driving is not performed, it is determined that the lens position of the focus lens 33 after driving cannot be within the depth of focus of the optical system, it is determined that backlash filling driving is performed at the time of the in-focus driving, and the in-focus driving in accompany with the backlash filling driving is performed on the basis of the determination. Namely, when the focus lens 33 is driven to perform the in-focus driving, it is determined that the focus lens passes through the in-focus position once and, after that, the focus lens is driven to the in-focus position by reverse driving, and as illustrated in FIG. 17(A), the in-focus driving in accompany with the backlash filling driving is performed on the basis of the determination.

As described above, the image plane moving amount $I_G$ corresponding to the backlash amount G is calculated on the basis of the information of the minimum image plane movement coefficient $K_{min}$ and the backlash amount G of the driving transmission mechanism of the focus lens 33, and the backlash filling control is performed to perform the determination as to whether or not to perform the backlash filling driving when performing the in-focus driving by determining whether or not the image plane moving amount $I_G$ corresponding to the calculated backlash amount G is equal to or smaller than the predetermined image plane moving amount $I_P$ corresponding to the focal depth of the optical system. Then, as a result of the determination, in a case where the image plane moving amount $I_G$ corresponding to the backlash amount G is equal to or smaller than the predetermined image plane moving amount $I_P$ corresponding to the focal depth of the optical system and the lens position of the focus lens 33 after the driving may be set to be within the focal depth of the optical system, the backlash filling driving is not performed. On the other hand, in a case where the image plane moving amount $I_G$ corresponding to the backlash amount G is larger than the predetermined image plane moving amount $I_P$ corresponding to the focal depth of the optical system and the lens position of the focus lens 33 after the driving may not be set be within the focal depth of the optical system unless the backlash filling driving is performed, the backlash filling driving is performed. For this reason, according to the embodiment, in a case where there is no need for the backlash filling driving, it is possible to reduce the time required for the in-focus driving by not performing the backlash filling driving, so that the time related to the in-focus operation can be reduced. On the other hand, in a case where there is a need for the backlash filling driving, it is possible to improve the in-focus accuracy by performing the backlash filling driving.

In particular, the image plane moving amount $I_G$ corresponding to the backlash amount G of the driving transmission mechanism of the focus lens 33 is calculated by using the minimum image plane movement coefficient $K_{min}$, and the calculated image plane moving amount $I_G$ is compared with a predetermined image plane moving amount $I_P$ corresponding to the focal depth of the optical system, so that it is possible to appropriately determine whether or not the backlash filling driving at the time of focusing is needed.

Next, a clipping operation (noise-reduction control) according to the embodiment will be described. In the embodiment, in the search control by using the contrast detection method, the image plane moving speed of the focus lens 33 is controlled to be constant, and on the other hand, in the search control of such a contrast detection method, the clipping operation is performed so as to suppress the driving sound of the focus lens 33. The clipping operation is an operation of clipping the speed of the focus lens 33 so as not to be lower than the noise-reduction lower limit lens moving speed in a case where the speed of the focus lens 33 becomes low and disturbs noise reduction.

In the embodiment, as described later, the camera control unit 21 of the camera body 2 compares the predetermined noise-reduction lower limit lens moving speed V0b and the focus lens driving speed V1a by using a predetermined coefficient (Kc), so that it is determined whether or not the clipping operation is to be performed.

Figure 19:
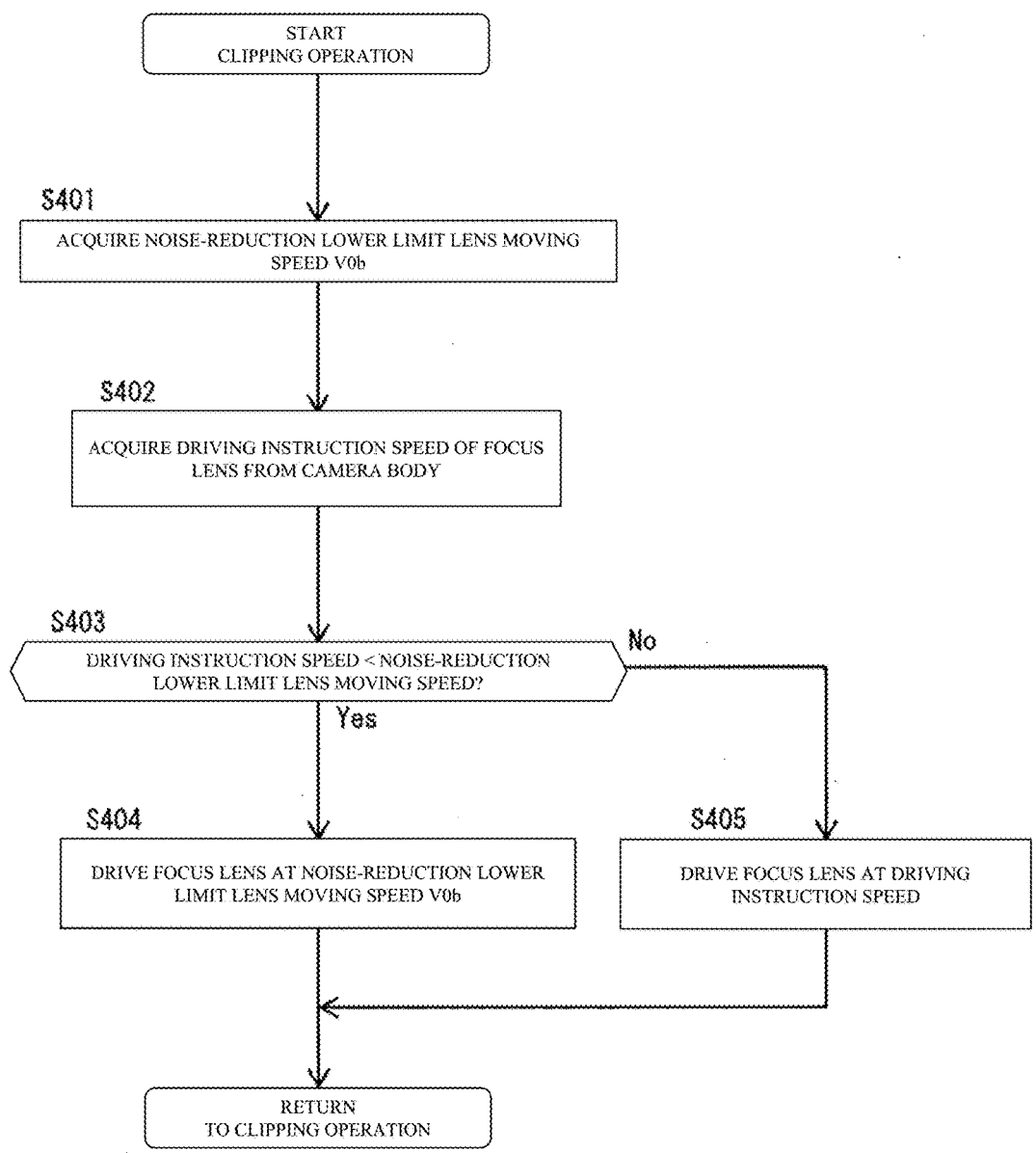
FIG. 19 is a flowchart illustrating a clipping operation.

Then, in a case where the clipping operation is permitted by the camera control unit 21, the lens control unit 36 limits the driving speed of the focus lens 33 to the noise-reduction lower limit lens moving speed V0b so that the driving speed V1a of the focus lens 33 described later is not lower than the noise-reduction lower limit lens moving speed V0b. Hereinafter, it will be described in detail with reference to the flowchart illustrated in FIG. 19. Herein, FIG. 19 is a flowchart illustrating the clipping operation (noise-reduction control) according to the embodiment.

In step S401, the noise-reduction lower limit lens moving speed V0b is acquired by the lens control unit 36. The noise-reduction lower limit lens moving speed V0b is stored in the lens memory 37, and the lens control unit 36 can acquire the noise-reduction lower limit lens moving speed V0b from the lens memory 37.

In step S402, the lens control unit 36 acquires a driving instruction speed of the focus lens 33. In the embodiment, the driving instruction speed is transmitted from the camera control unit 21 to the lens control unit 36 through the command data communication, and thus, the lens control unit 36 can acquire the driving instruction speed of the focus lens 33 from the camera control unit 21.

In step S403, the lens control unit 36 compares the noise-reduction lower limit lens moving speed V0b acquired in step S401 with the driving instruction speed of the focus lens 33 acquired in step S402. More specifically, the lens control unit 36 determines whether or not the driving instruction speed (unit: pulses/second) of the focus lens 33 is smaller than the noise-reduction lower limit lens moving speed V0b (unit: pulses/second). In a case where the driving instruction speed of the lens 33 is smaller than the noise-reduction lower limit lens moving speed, the process proceeds to step S404. On the other hand, in a case where the driving instruction speed of the focus lens 33 is equal to or higher than the noise-reduction lower limit lens moving speed V0b, the process proceeds to step S405.

In step S404, it is determined that the driving instruction speed of the focus lens 33 transmitted from the camera body 2 is smaller than the noise-reduction lower limit lens moving speed V0b. In this case, in order to suppress the driving sound of the focus lens 33, the lens control unit 36 drives the focus lens 33 at the noise-reduction lower limit lens moving speed V0b. In this manner, in a case where the driving instruction speed of the focus lens 33 is smaller than the noise-reduction lower limit lens moving speed V0b, the lens control unit 36 limits the lens driving speed V1a of the focus lens 33 to the noise-reduction lower limit lens moving speed V0b.

On the other hand, in step S405, it is determined that the driving instruction speed of the focus lens 33 transmitted from the camera body 2 is equal to or higher than the noise-reduction lower limit lens moving speed V0b. In this case, since the driving sound of the focus lens 33 having a predetermined value or more does not occur (or the driving sound is extremely small), the lens control unit 36 drives the focus lens 33 at the driving instruction speed of the focus lens 33 transmitted from the camera body 2.

Figure 20:
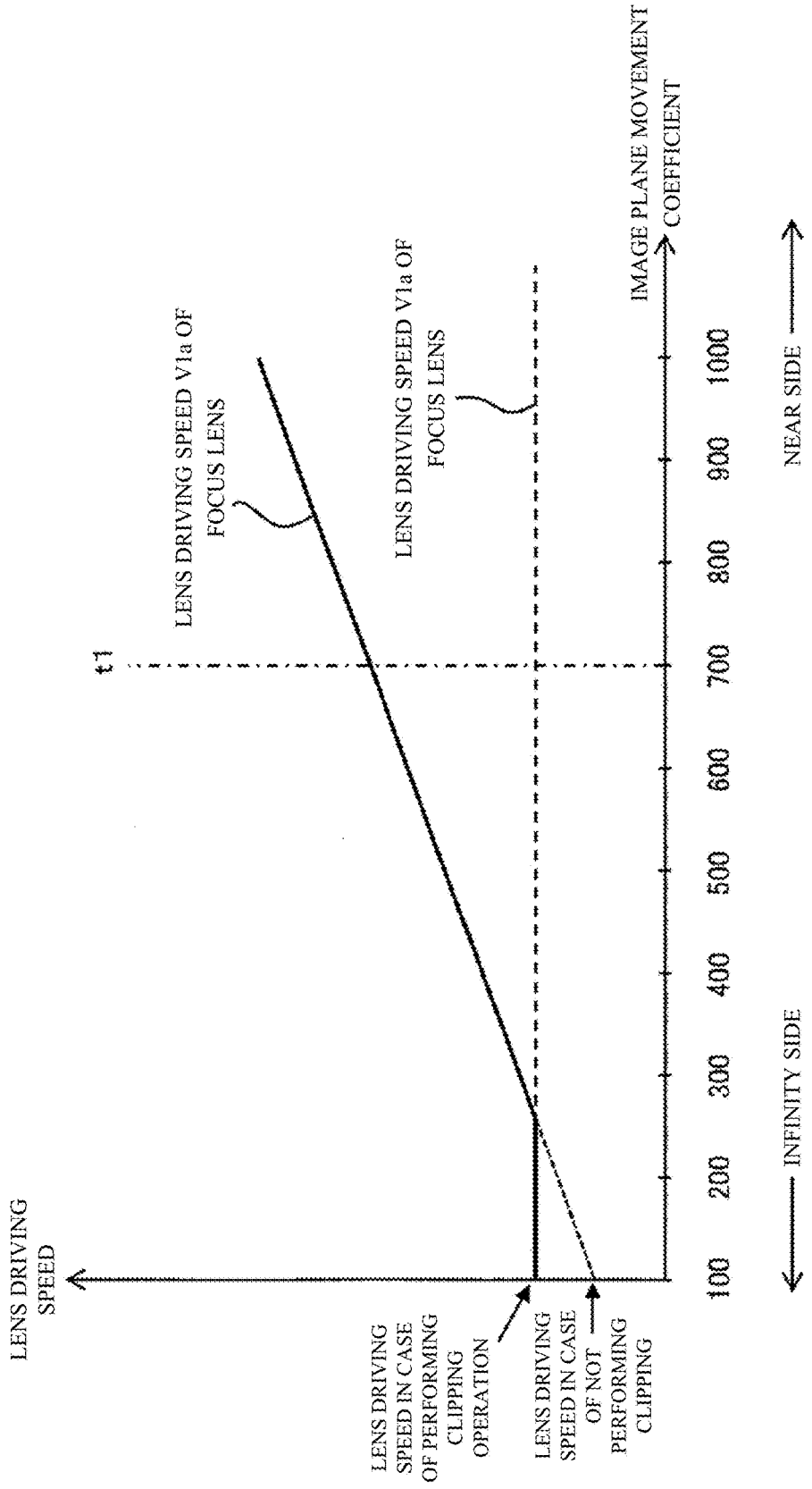
FIG. 20 is a diagram illustrating a relationship between a lens driving speed V1$a$ of a focus lens and a noise-reduction lower limit lens moving speed V0$b$.

FIG. 20 is a graph illustrating the relationship between the lens driving speed V1a of the focus lens 33 and the noise-reduction lower limit lens moving speed V0b. The vertical axis represents the lens driving speed, and the horizontal axis represents the image plane movement coefficient K. As illustrated in the horizontal axis in FIG. 20, the image plane movement coefficient K changes depending on the lens position of the focus lens 33. In the example illustrated in FIG. 20, the image plane movement coefficient K tenses to be decreased toward the infinity side, and the image plane movement coefficient K tends to be increased toward the near side. On the other hand, in the embodiment, at the time of performing the focus detection operation, when the focus lens 33 is to be driven, the focus lens 33 is driven at such a speed that the image plane moving speed is constant. For this reason, as illustrated in FIG. 20, the actual driving speed V1a of the focus lens 33 changes depending on the lens position of the focus lens 33. Namely, in the example illustrated in FIG. 20, in a case where the focus lens 33 is driven so that the image plane moving speed becomes a constant speed, the lens moving speed V1a of the focus lens 33 becomes lower toward the infinity side and becomes higher toward the near side.

Figure 22:
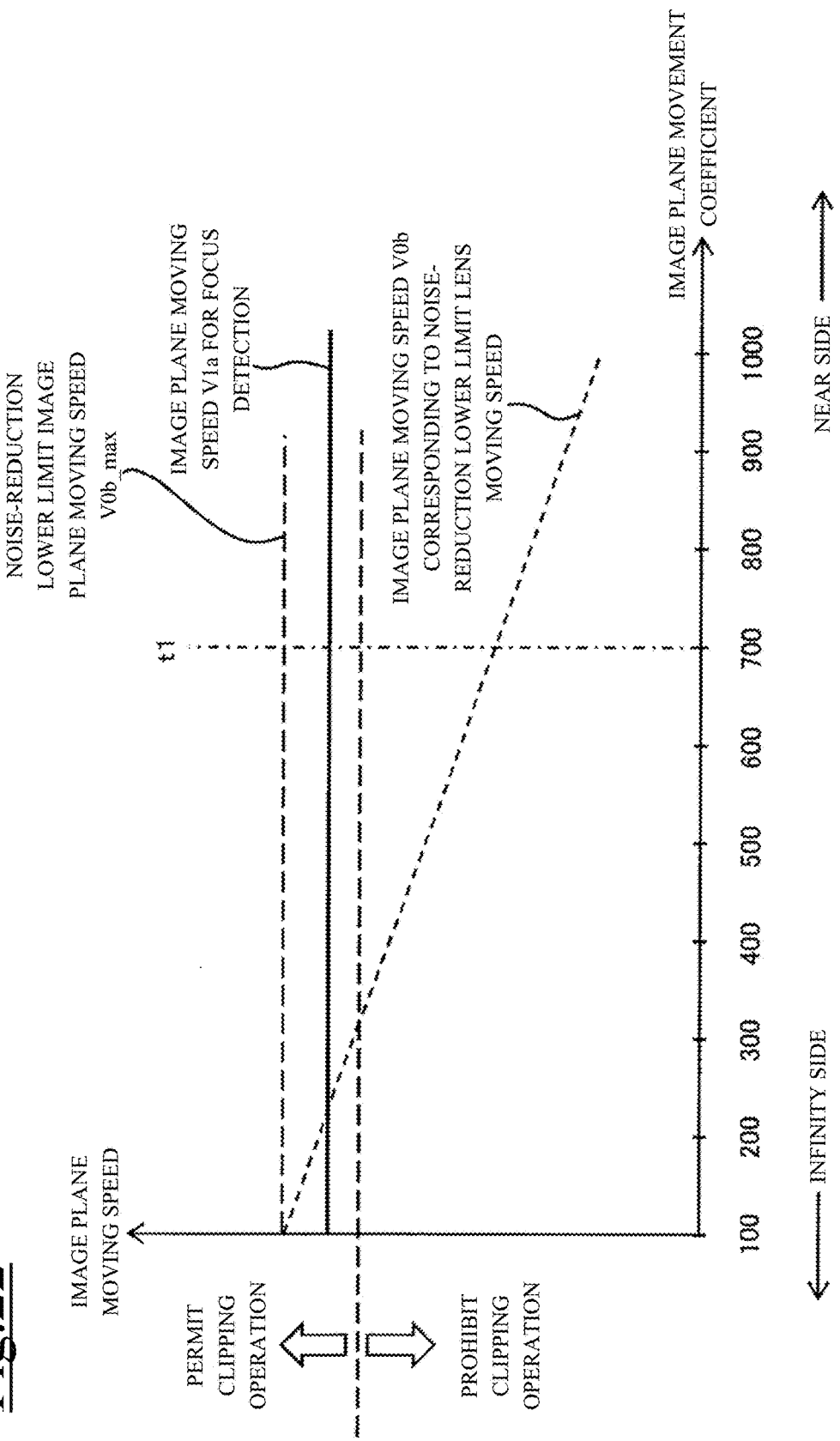
FIG. 22 is a diagram illustrating a relationship between an image plane moving speed V1$a$ of a focus lens and a noise-reduction lower limit image plane moving speed V0$b$_max.

On the other hand, as illustrated in FIG. 20, in a case where the focus lens 33 is driven, the image plane moving speed in such a case is indicated to be constant as illustrated in FIG. 22. In addition, FIG. 22 is a graph illustrating the relationship between the image plane moving speed V1a according to the driving of the focus lens 33 and the noise-reduction lower limit image plane moving speed V0b_max, in which the vertical axis represents the image plane moving speed, and the horizontal axis represents the image plane movement coefficient K. In addition, in FIGS. 20 and 22, both of the actual driving speed of the focus lens 33 and the image plane moving speed by driving the focus lens 33 are represented by V1a. For this reason, as illustrated in FIG. 20, in a case where the vertical axis of the graph is the actual driving speed of the focus lens 33, V1a becomes variable (not parallel to the horizontal axis, and as illustrated in FIG. 22, in a case where the axis is the image plane moving speed, V1a becomes a constant value (parallel to the horizontal axis).

Then, in a case where the focus lens 33 is driven so that the image plane moving speed becomes a constant speed, unless the clipping operation is performed, as in the example illustrated in FIG. 20, in some cases, the lens driving speed V1a of the focus lens 33 may be smaller than the noise-reduction lower limit lens moving speed V0b. For example, at the position of the focus lens 33 (the minimum image plane movement coefficient $K_{min}$=100 in FIG. 20) at which the minimum image plane movement coefficient $K_{min}$ can be obtained, the lens moving speed V1a becomes lower than the noise-reduction lower limit lens moving speed V0b.

In particular, in a case where the focal length of the lens barrel 3 is long or the light environment is bright, the lens moving speed V1a of the focus lens 33 tends to be lower than the noise-reduction lower limit lens moving speed V0b. In such a case, as illustrated in FIG. 20, by performing the clipping operation, the lens control unit 36 limits the driving speed V1a of the focus lens 33 to the noise-reduction lower limit lens moving speed V0b (controls the driving speed as not to be lower than the noise-reduction lower limit lens moving speed V0b) (step S404), so that it is possible to suppress the driving sound of the focus lens 33.

Figure 21:
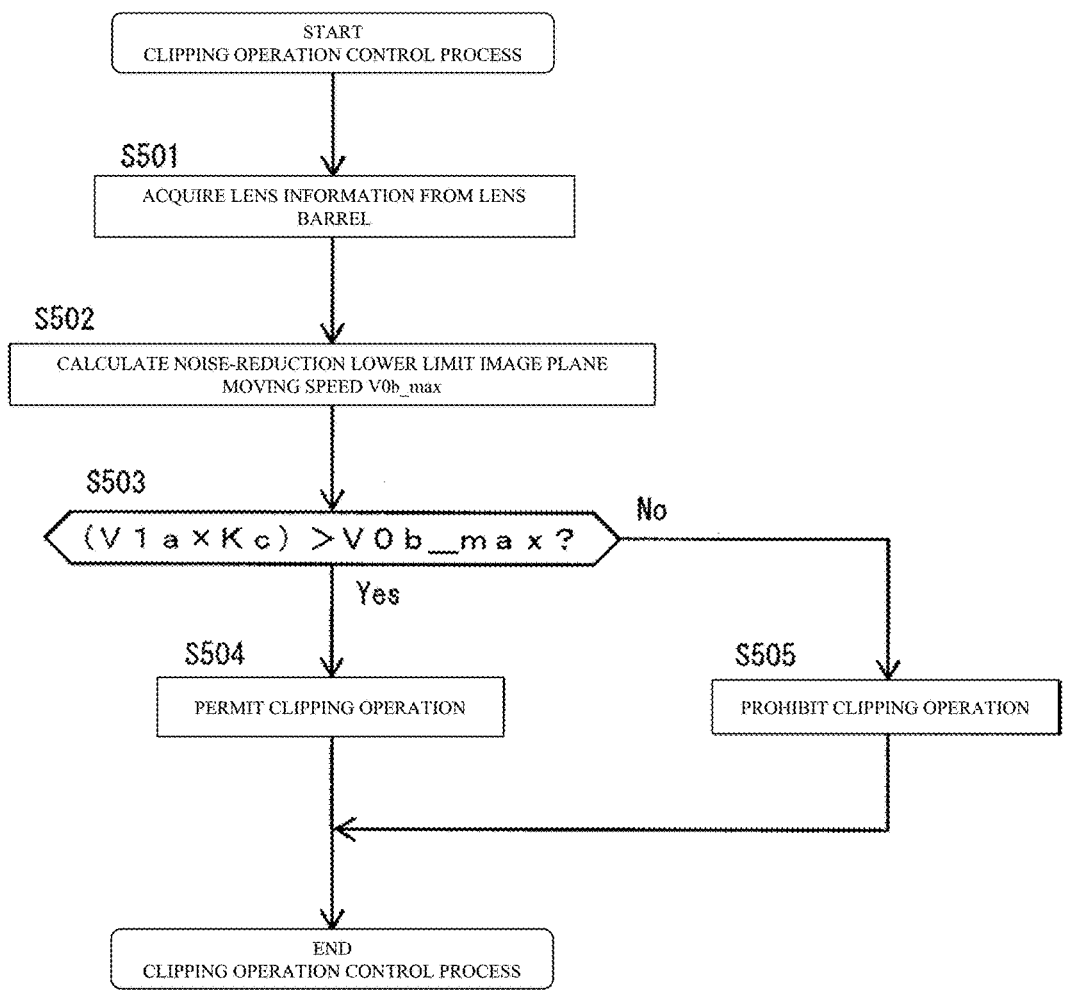
FIG. 21 is a flowchart illustrating clipping operation control process.

Next, a clipping operation control process for determining whether to permit or prohibit the clipping operation illustrated in FIG. 19 will be described with reference to FIG. 21. FIG. 21 is a flowchart illustrating the clipping operation control process according to the embodiment. In addition, the clipping operation control process described below is performed by the camera body 2, for example, when an AF-F mode or a moving-picture imaging mode is set.

First, in step S501, the lens information is acquired by the camera control unit 21. More specifically, the camera control unit 21 acquires the current image plane movement coefficient $K_{cur}$, the minimum image plane movement coefficient $K_{min}$, the maximum image plane movement coefficient $K_{max}$, and the noise-reduction lower limit lens moving speed V0b from the lens barrel 3 through the hot line communication.

Then, in step S502, the camera control unit 21 calculates the noise-reduction lower limit image plane moving speed V0b_max. The noise-reduction lower limit image plane moving speed V0b_max is an image plane moving speed when the focus lens 33 is driven at the noise-reduction lower limit lens moving speed V0b at the position of the focus lens 33 at which the minimum image plane coefficient $K_{min}$ is obtained. Hereinafter, the noise-reduction lower limit image plane moving speed V0b_max will be described in detail.

First, as illustrated in FIG. 20, it is determined on the basis of the actual driving speed of the focus lens 33 whether or not the driving sound is generated by the driving of the focus lens 33. For this reason, as illustrated in FIG. 20, the noise-reduction lower limit lens moving speed V0b becomes a constant speed when represented by the lens driving speed. On the other hand, if the such a noise-reduction lower limit lens moving speed V0b is represented by the image plane moving speed, as described above, the image plane movement coefficient K changes depending on the lens position of the focus lens 33, and thus, the lens moving speed becomes variable as illustrated in FIG. 20. In addition, in FIGS. 20 and 22, both of the noise-reduction lower limit lens moving speed (the lower limit value of the actual driving speed of the focus lens 33) and the image plane moving speed in a case where the focus lens 33 is driven at the noise-reduction lower limit lens moving speed are represented by V0b. For this reason, as illustrated in FIG. 20, in a case where the vertical axis of the graph is the actual driving speed of the focus lens 33, V0b becomes a constant value (parallel to the horizontal axis), and as illustrated in FIG. 22, in a case where the axis is the image plane moving speed, V1b becomes variable (not parallel to the horizontal axis).

In the embodiment, in a case where the focus lens 33 is driven so that the image plane moving speed is constant, the noise-reduction lower limit image plane moving speed V0b_max is set to the image plane moving speed at which the moving speed of the focus lens 33 becomes the noise-reduction lower limit lens moving speed V0b at the position (the image plane movement coefficient K=100 in the example illustrated in FIG. 22) of the focus lens 33 where the minimum image plane movement coefficient $K_{min}$ is obtained. Namely, in the embodiment, when the focus lens 33 is driven at the noise-reduction lower limit lens moving speed, the maximum image plane moving speed (the image plane moving speed at the image plane movement coefficient K=100 in the example illustrated in FIG. 22) is set as the noise-reduction lower limit image plane moving speed V0b_max.

In this manner, in the embodiment, among the image plane moving speeds corresponding to the noise-reduction lower limit lens moving speed V0b which changes depending on the lens position of the focus lens 33, the maximum image plane moving speed (the image plane moving speed at the lens position where the image plane movement coefficient is the minimum) is calculated as the noise-reduction lower limit image plane moving speed V0b_max. For example, in the example illustrated in FIG. 22, since the minimum image plane movement coefficient $K_{min}$ is "100", the image plane moving speed at the lens position of the focus lens 33 where the image plane movement coefficient is "100" is calculated as the noise-reduction lower limit image plane moving speed V0b_max.

More specifically, as expressed in the following formula, the camera control unit 21 calculates the noise-reduction lower limit image plane moving speed V0b_max (unit: mm/second) on the basis of the noise-reduction lower limit lens moving speed V0b (unit: pulses/second) and the minimum image plane movement coefficient $K_{min}$ (unit: pulses/mm).

Noise-reduction Lower Limit Image Plane Moving Speed V0b_max=Noise-reduction Lower Limit Lens Moving Speed(Actual Driving Speed of Focus Lens)V0b/Minimum Image Plane Movement Coefficient $K_{min}$ In this manner, in the embodiment, by calculating the noise-reduction lower limit image plane moving speed V0b_max by using the minimum image plane movement coefficient $K_{min}$, it is possible to calculate the noise-reduction lower limit image plane moving speed V0b_max at the timing of starting the focus detection or moving picture imaging by the AF-F, the noise-reduction lower limit image. For example, in the example illustrated in FIG. 22, in a case where the focus detection or moving picture imaging by AF-F is started at a timing t1', the image plane moving speed at the lens position of the focus lens 33 where the image plane movement coefficient K becomes "100" at the timing t1' can be calculated as the noise-reduction lower limit image plane moving speed V0b_max.

In addition, in the embodiment, as described above, the minimum image plane movement coefficient $K_{min}$ to be transmitted to the camera control unit 21 is determined by the lens information transmission process illustrated in FIG. 12. Namely, as illustrated in FIG. 13(A) or FIG. 13(B), in a case where the current lens position of the focus lens 33 is inside the drivable range, the minimum image plane movement coefficient $K_{min}$ corresponding to the drivable range is transmitted to the camera control unit 21. And, as illustrated in 14(B), in a case where the current lens position of the focus lens 33 is outside the drivable range, the current position image plane movement coefficient $K_{cur}$ is transmitted as the minimum image plane movement coefficient $K_{min}$ to the camera control unit 21. For this reason, as illustrated in FIG. 13(A) or FIG. 13(B), in a case where the current lens position of the focus lens 33 is inside the drivable range, the camera control unit 21 calculates the noise-reduction lower limit image plane moving speed V0b_max on the basis of the minimum image plane movement coefficient $K_{min}$ corresponding to the drivable range. On the other hand, as illustrated in FIG. 14(B), in a case where the current lens position of the focus lens 33 is outside the drivable range, the camera control unit 21 calculates the noise-reduction lower limit image plane moving speed V0b_max on the basis of the minimum image plane movement coefficient $K_{min}$ having a value equal to the current position image plane movement coefficient $K_{cur}$.

Next, in step S503, the camera control unit 21 compares the image plane moving speed V1a for the focus detection acquired in step S501 with the noise-reduction lower limit image plane moving speed V0b_max calculated in step S502. More specifically, the camera control unit 21 determines whether or not the image plane moving speed V1a (unit: mm/second) for the focus detection and the noise-reduction lower limit image plane moving speed V0b_max (unit: mm/second) satisfy the following formula.

(Image Plane Moving Speed V1a×Kc for Focus Detection)>(Noise-reduction Lower Limit Image Plane Moving Speed V0b_max)

In the above formula, the coefficient Kc is a value of 1 or more (Kc≥1), and the details thereof will be described later.

In a case where the above formula is satisfied, the process proceeds to step S504, and the camera control unit 21 permits the clipping operation illustrated in FIG. 19. Namely, in order to suppress the driving sound of the focus lens 33, as illustrated in FIG. 20, the driving speed V1a of the focus lens 33 is limited to the noise-reduction lower limit lens moving speed V0b (the search control is performed so that the driving speed V1a of the focus lens 33 is not lower than the noise-reduction lower limit lens moving speed V0b).

On the other hand, in a case where the above formula is not satisfied, the process proceeds to step S505, and the camera control unit prohibits the clipping operation illustrated in FIG. 19. Namely, without limiting the driving speed V1a of the focus lens 33 to the noise-reduction lower limit lens moving speed V0b (allowing the driving speed V1a of the focus lens 33 to be lower than the noise-reduction lower limit lens moving speed V0b), the focus lens 33 is driven so to achieve the image plane moving speed V1a at which the in-focus position can be appropriately detected.

Herein, as illustrated in FIG. 20, if the clipping operation is permitted and the driving speed of the focus lens 33 is limited to the noise-reduction lower limit lens moving speed V0b, the image plane moving speed becomes high at the lens position where the image plane movement coefficient K is small. As a result, in some cases, the image plane moving speed becomes higher than the image plane moving speed at which the in-focus position can be appropriately detected, and thus, appropriate in-focus accuracy may not be obtained. On the other hand, in a case where the focus lens 33 is driven so that the clipping operation is prohibited and, thus, the image plane moving speed becomes the image plane moving speed at which the in-focus position can be appropriately detected, as illustrated in FIG. 20, in some cases, the driving speed V1a of the focus lens 33 becomes smaller than the noise-reduction lower limit lens moving speed V0b, so that driving sound of a predetermined value or more may occur.

In this manner, in a case where the image plane moving speed Via for the focus detection is smaller than the noise-reduction lower limit image plane moving speed V0b_max, in some cases, there may be a problem as to whether to drive the focus lens 33 at a lens driving speed which is lower than the noise-reduction lower limit lens moving speed V0b in order to obtain the image plane moving speed V1a at which the in-focus position can be appropriately detected or whether to drive the focus lens 33 at a lens driving speed which is equal to or higher than the noise-reduction lower limit lens moving speed V0b in order to suppress the driving sound of the focus lens 33.

On the other hand, in the embodiment, even in a case where the focus lens 33 is driven at the noise-reduction lower limit lens moving speed V0b, if the above formula is satisfied, the coefficient Kc in the above formula is stored as a value of 1 or more, where the constant focus detection accuracy can be secured. As a result, as illustrated in FIG. 22, even in a case where the image plane moving speed V1a for the focus detection is smaller than the noise-reduction lower limit image plane moving speed V0b_max, if the above formula is satisfied, the camera control unit 21 determines that a predetermined detection accuracy can be secured, and thus, the camera control unit permits the clipping operation for driving the focus lens 33 at the lens driving speed lower than the noise-reduction lower limit lens moving speed V0b in preference to suppressing the driving sound of the focus lens 33.

On the other hand, in a case where the image plane moving speed V1a×Kc (where Kc≥1) at the time of the focus detection is equal to or lower than the noise-reduction lower limit image plane moving speed V0b_max, if the clipping operation is permitted and the driving speed of the focus lens 33 is limited to the noise-reduction lower limit lens moving speed V0b, in some cases, the image plane moving speed for the focus detection becomes too high, so that it may be possible to secure the focus detection accuracy. For this reason, in a case where the above formula is not satisfied, the camera control unit 21 prohibits the clipping operation illustrated in FIG. 19 in preference to the focus detection accuracy. Therefore, at the time of the focus detection, the image plane moving speed may be set to the image plane moving speed V1a at which the in-focus position can be appropriately detected, and the focus detection can be performed with a high accuracy.

In addition, in a case where the aperture value is large (the diaphragm aperture is small), since the depth of field becomes deep, sampling intervals at which the in-focus position can be appropriately detected are widened. As a result, it is possible to increase the image plane moving speed V1a at which the in-focus position can be appropriately detected. For this reason, in a case where the image plane moving speed V1a at which the in-focus position can be appropriately detected is a fixed value, the camera control unit 21 can increase the coefficient Kc of the above formula as the aperture value increases.

In addition, similarly, since high focus detection accuracy is not required in a case where the image size is small such as a live view image (in a case where a compression ratio of the image is high or in a case where a thinning rate of pixel data is high), the coefficient Kc of the above formula can be increased. In addition, in a case where a pixel pitch of the imaging element 22 is wide, the coefficient Kc of the above formula can also be increased.

Figure 23:
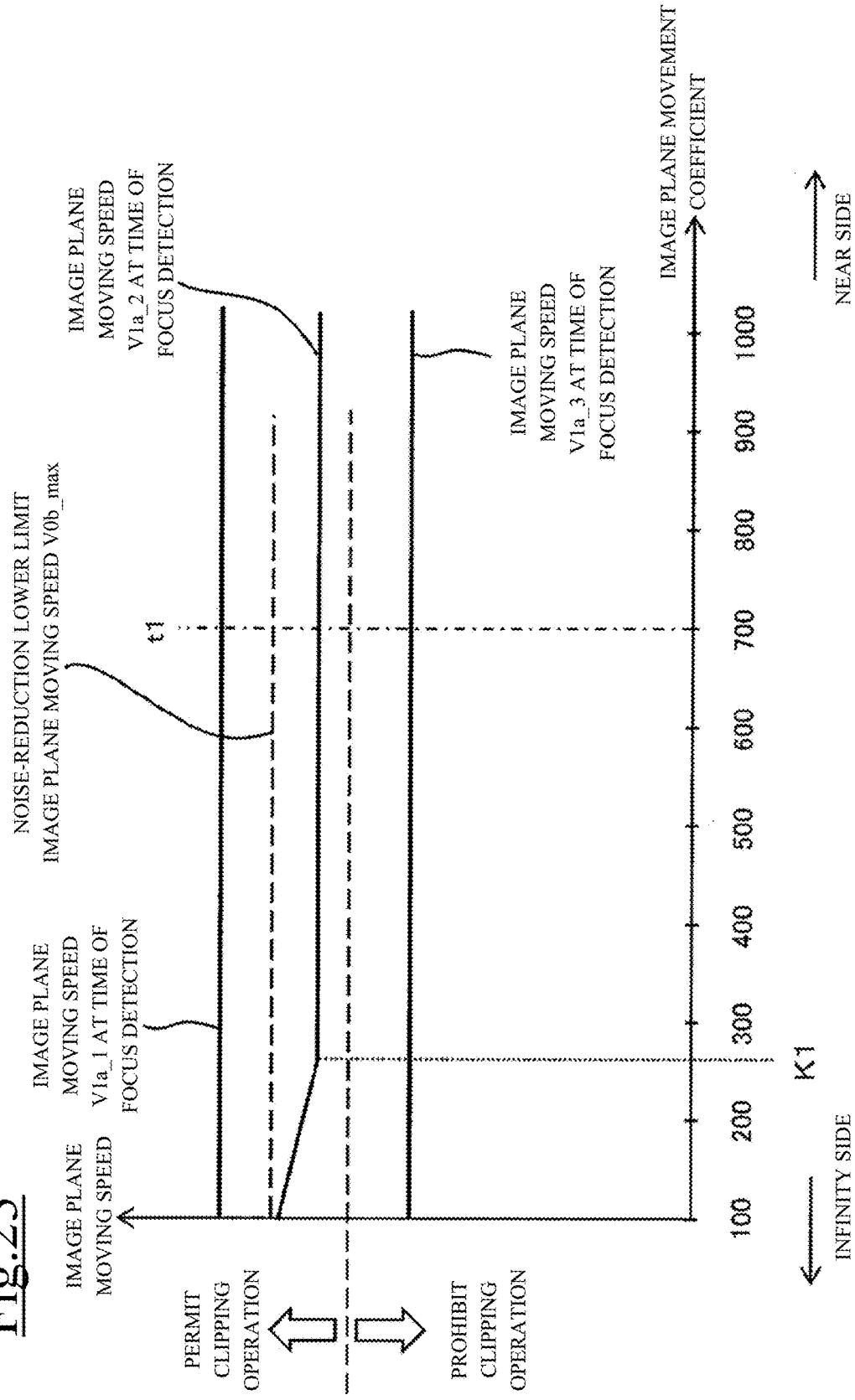
FIG. 23 is a diagram illustrating a relationship between an image plane moving speed V1$a$ at a time of the focus detection and a clipping operation.
Figure 24:
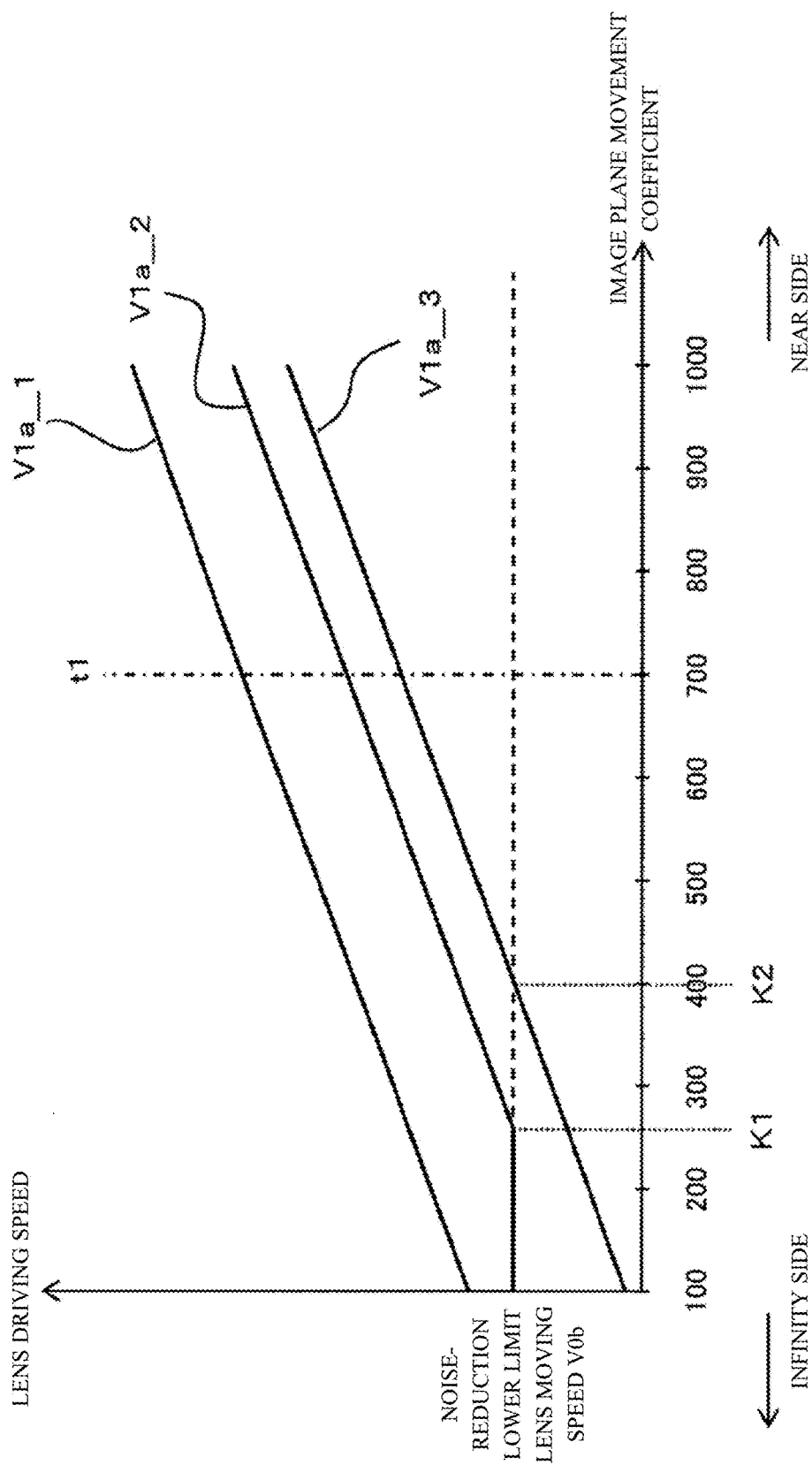
FIG. 24 is a diagram illustrating a relationship between a lens driving speed V1$a$ of a focus lens and a clipping operation.

Next, the control of the clipping operation will be described in more detail with reference to FIG. 23 and FIG. 24. FIG. 23 is a diagram illustrating a relationship between the image plane moving speed V1a at the time of the focus detection and the clipping operation. FIG. 24 is a diagram illustrating a relationship between the actual lens driving speed V1a of the focus lens 33 and the clipping operation.

For example, as described above, in the embodiment, in a case where the search control is started with half pushing of the release switch as a trigger, and in a case where the search control is started with a condition other than the half pushing of the release switch as a trigger, in some cases, the image plane moving speed in the search control may be different depending on the still image imaging mode and the moving-picture imaging mode, the sports imaging mode and the landscape imaging mode, or the focal length, the imaging distance, the aperture value, and the like. FIG. 23 illustrates the image plane moving speeds $V1a\_1$, $V1a\_2$, and $V1a\_3$ of three different image planes.

More specifically, the image plane moving speed $V1a\_1$ at the time of the focus detection illustrated in FIG. 23 is the maximum moving speed among the image plane moving speeds that can appropriately detect the focus state, it is an image plane moving speed which satisfies the relationship of the above formula. The image plane moving speed $V1a\_2$ at the time of the focus detection is an image plane moving speed which is lower than $V1a\_1$, it is an image plane moving speed which satisfies the relationship of the above formula at the timing t1'. On the other hand, the image plane moving speed $V1a\_3$ at the time of the focus detection is an image plane moving speed which does not satisfy the relationship of the above formula.

In this manner, in the example illustrated in FIG. 23, in a case where the image plane moving speeds at the time of the focus detection are $V1a\_1$ and $V1a\_2$, since the relationship of the above formula is satisfied at the timing t1, the clipping operation illustrated in FIG. 19 is permitted. On the other hand, in a case where the image plane moving speed at the time of the focus detection is $V1a\_3$, since the relationship of the above formula is not satisfied, the clipping operation illustrated in FIG. 19 is prohibited.

This point will be specifically described with reference to FIG. 24. FIG. 24 is a diagram obtained from the graph illustrated in FIG. 23 by changing the vertical axis thereof from the image plane moving speed to the lens driving speed. As described above, since the lens driving speed $V1a\_1$ of the focus lens 33 satisfies the relationship of the above formula, the clipping operation is permitted. However, as illustrated in FIG. 24, even at the lens position where the minimum image plane movement coefficient (K=100) is obtained, since the lens driving speed $V1a\_1$ is not smaller than the noise-reduction lower limit lens moving speed V0b, in fact, the clipping operation is not performed.

In addition, since the lens driving speed $V1a\_2$ of the focus lens 33 also satisfies the relationship of the above formula at a timing t1' which is a start timing of focus detection, the clipping operation is permitted. In the example illustrated in FIG. 24, in a case where the focus lens 33 is driven at the lens driving speed $V1a\_2$, since the lens driving speed $V1a\_2$ is smaller than the noise-reduction lower limit lens moving speed V0b at the lens position where the image plane movement coefficient K is K1, the lens driving speed $V1a\_2$ of the focus lens 33 is limited to the noise-reduction lower limit lens moving speed V0b at the lens position where the image plane movement coefficient K is smaller than K1.

Namely, the clipping operation is performed at the lens position where the lens driving speed $V1a\_2$ of the focus lens 33 is smaller than the noise-reduction lower limit lens moving speed V0b, so that the search control of the focus evaluation value is performed at an image plane moving speed where the image plane moving speed $V1a\_2$ at the time of the focus detection is different from the image plane moving speed (search speed) of the focus position up to now. Namely, as illustrated in FIG. 23, at the lens position where the image plane movement coefficient is smaller than K1, the image plane moving speed $V1a\_2$ at the time of the focus detection becomes different from a constant speed up to now.

In addition, since the lens driving speed $V1a\_3$ of the focus lens 33 does not satisfy the relationship of the above formula, the clipping operation is prohibited. For this reason, in the example illustrated in FIG. 24, in a case where the focus lens 33 is driven at the lens driving speed $V1a\_3$, the lens driving speed $V1a\_3$ is smaller than the noise-reduction lower limit lens moving speed V0b at the lens position where the image plane movement coefficient K is K2. However, at the lens position where the image plane movement coefficient K smaller than K2 is obtained, the clipping operation is not performed. In addition, although the driving speed $V1a\_3$ of the focus lens 33 becomes lower than the noise-reduction lower limit lens moving speed V0b in order to appropriately detect the focus state, the clipping operation is not performed.

As described above, the maximum image plane moving speed among the image plane moving speeds in a case where the focus lens 33 is driven at the noise-reduction lower limit lens moving speed V0b is calculated as the noise-reduction lower limit image plane moving speed V0b_max, and the calculated noise-reduction lower limit image plane moving speed V0b_max and the image plane moving speed V1a at the time of the focus detection are compared. Then, in a case where the image plane moving speed V1a×Kc (where Kc≥1) at the time of the focus detection is higher than the noise-reduction lower limit image plane moving speed V0b_max, even if the focus lens 33 is driven at the noise-reduction lower limit lens moving speed V0b, it is determined that focus detection accuracy equal to or higher than a certain level can be obtained, and the clipping operation illustrated in FIG. 19 is permitted. Therefore, in the embodiment, it is possible to suppress the driving sound of the focus lens 33 while securing the focus detection accuracy.

On the other hand, in a case where the image plane moving speed V1a×Kc (where Kc≥1) at the time of the focus detection is equal to or lower than the noise-reduction lower limit image plane moving speed V0b_max, if the driving speed V1a of the focus lens 33 is limited to the noise-reduction lower limit lens moving speed V0b, in some cases, it may be impossible to obtain appropriate focus detection accuracy. For this reason, in the embodiment, in such a case, the clipping operation illustrated in FIG. 19 is prohibited so that an image plane moving speed appropriate for the focus detection can be obtained. Therefore, in the embodiment, it is possible to appropriately detect the in-focus position at the time of the focus detection.

In the embodiment, the minimum image plane movement coefficient $K_{min}$ is stored in advance in the lens memory 37 of the lens barrel 3, and the noise-reduction lower limit image plane moving speed V0b_max is calculated by using the minimum image plane movement coefficient $K_{min}$. For this reason, in the embodiment, for example, as illustrated in FIG. 17, at the timing of the time t1 when the moving picture imaging and the focus detection by the AF-F mode are started, by determining whether or not the image plane moving speed V1a×Kc for the focus detection (however, Kc≥1) exceeds the noise-reduction lower limit image plane moving speed V0b_max, it is possible to determine whether or not to perform the clipping operation. In this manner, in the embodiment, instead of repeatedly determining whether or not to perform the clipping operation by using the current position image plane movement coefficient $K_{cur}$, since it is possible to determine whether or not to perform the clipping operation at the first timing when the moving picture imaging or the focus detection by the AF-F mode is started by using the minimum image plane movement coefficient $K_{min}$, it is possible to reduce the process load of the camera body 2.

In addition, in the above-described embodiments, exemplified is the configuration where the clipping operation control process illustrated in FIG. 21 is performed in the camera body 2. However, the present invention is not limited to this configuration. In some configuration, for example, the clipping operation control process illustrated in FIG. 21 may be performed in the lens barrel 3.

In addition, in the above-described embodiments, exemplified is the configuration where the image plane movement coefficient K is calculated by using (the image plane movement coefficient K)=(the driving amount of the focus lens 33)/(the moving amount of the image plane) as represented in the above-described formula is exemplified. However, the present invention is not limited to this configuration. In some configuration, for example, the image plane movement coefficient K may be calculated as represented in the following formula.

(Image Plane Movement Coefficient $K$)=(Moving Amount of Image Plane)/(Driving Amount of Focus Lens 33)

In addition, in this case, the camera control unit 21 can calculate the noise-reduction lower limit image plane moving speed V0$b$_max as follows. Namely, as illustrated in the following formula, the camera control unit 21 calculates the noise-reduction lower limit image plane moving speed V0$b$_max (unit: mm/second) on the basis of the noise-reduction lower limit lens moving speed V0$b$ (unit: pulses/second) and the maximum image plane movement coefficient $K_{max}$ (unit: pulses/mm) indicating the maximum value among the image plane movement coefficients K at each lens position (focal length) of the zoom lens 32 (unit: pulses/second).

(Noise-reduction Lower Limit Image Plane Moving Speed $V0b$_max)=(Noise-reduction Lower Limit Lens Moving Speed $V0b$)/(Maximum Image Plane Movement Coefficient $K_{max}$)

For example, in the case of employing the value calculated by "the moving amount of the image plane/the amount of drive of the focus lens 33" as the image plane movement coefficient K, as the value (absolute value) is increased, the moving amount of the image plane is increased in a case where the focus lens is driven by a predetermined value (for example, 1 mm). In the case of employing the value calculated by "the driving amount of the focus lens 33/the moving amount of the image plane" is adopted as the image plane movement coefficient K, the larger the value (absolute value), as the value (absolute value) is increased, the moving amount of the image plane is decreased in a case where the focus lens is driven by a predetermined value (for example, 1 mm).

Figure 25:
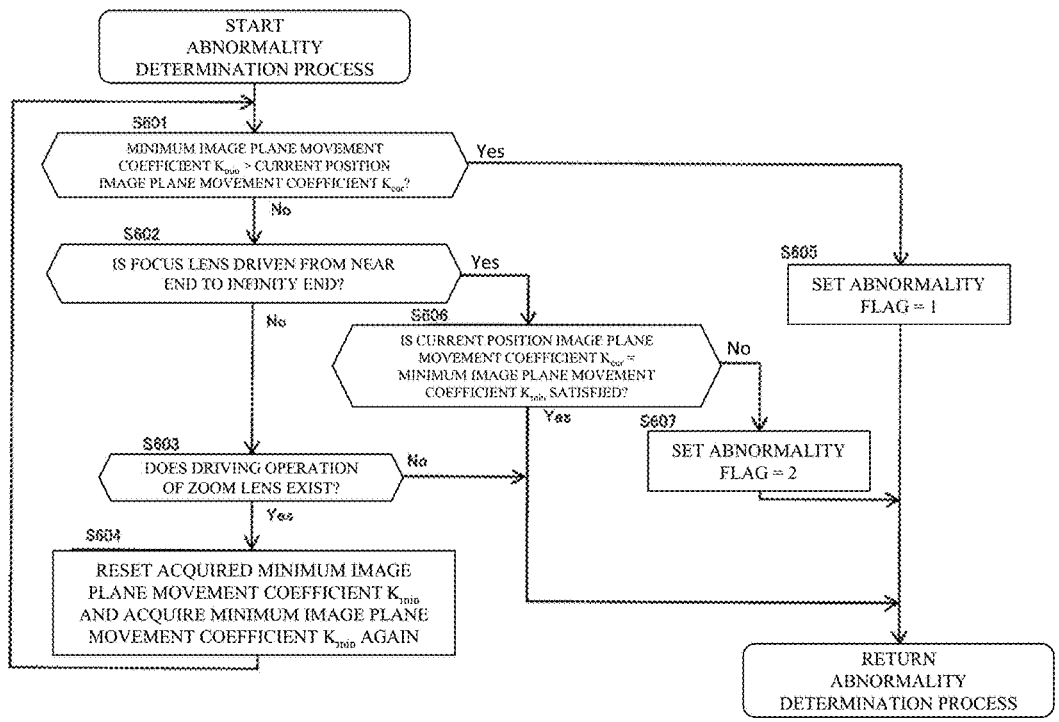
FIG. 25 is a flowchart illustrating an abnormality determination process according to the first embodiment.

Next, an abnormality determination process according to the first embodiment will be described. FIG. 25 is a flowchart illustrating the abnormality determination process according to the first embodiment. For example, in a case where a photographer performs a half-pushing operation on a release button provided on the operation unit 28 or performs an AF activating operation or the like, the abnormality determination process is performed in parallel with the operations of the camera 1 illustrated in FIG. 15. In addition, the abnormality determination process illustrated in FIG. 25 is repeatedly performed at predetermined intervals.

First, in step S601, it is determined whether or not the current position image plane movement coefficient $K_{cur}$ repeatedly acquired through the hot line communication is smaller than the minimum image plane movement coefficient $K_{min}$. Namely, it is determined whether or not the current position image plane movement coefficient $K_{cur}$ satisfying that the minimum image plane movement coefficient $K_{min}$>the current position image plane movement coefficient $K_{cur}$ has been detected. In a case where the current position image plane movement coefficient $K_{cur}$ satisfying that the minimum image plane movement coefficient $K_{min}$>the current position image plane movement coefficient $K_{cur}$ has been detected, since it is considered that some abnormality such as communication abnormality has occurred between the camera body 2 and the lens barrel 3, the process proceeds to step S605. The abnormality flag=1 is set, and the abnormality determination process is ended. In addition, in a case where the abnormality does not occur, in the normal period, the abnormality flag is set to 0. On the other hand, in a case where current position image plane movement coefficient $K_{cur}$ satisfying that the minimum image plane movement coefficient $K_{min}$>current position image plane movement coefficient $K_{cur}$ has not been detected, the process proceeds to step S602.

For example, in the example illustrated in FIG. 13(B), since the current lens position of the focus lens 33 is inside the drivable range Rf3, the minimum image plane movement coefficient $K_{min}$ "K14" corresponding to the drivable range and the current position image plane movement coefficient $K_{cur}$ "K16" are transmitted to the camera control unit 21. In this case, since the current position image plane movement coefficient $K_{cur}$ "K16" is larger than the minimum image plane movement coefficient $K_{min}$ "K14", the process proceeds to step S602. On the other hand, in the example illustrated in FIG. 13(B), in a case where some abnormality such as communication abnormality has occurred between the camera body 2 and the lens barrel 3 and the minimum image plane movement coefficient $K_{cur}$ is received as "K17", it is determined that the current position image plane movement coefficient $K_{cur}$ "K16" is larger than the minimum image plane movement coefficient $K_{min}$ "K17", and the process proceeds to step S605, where it is determined that some abnormality such as communication abnormality has occurred between the camera body 2 and the lens barrel 3.

In addition, as illustrated in FIG. 14(B), in a case where the current lens position of the focus lens 33 is outside the drivable range, the lens information transmission process illustrated in FIG. 12 causes the current position image plane movement coefficient $K_{cur}$ "K12" as the minimum image plane movement coefficient $K_{min}$ to be transmitted to the camera control unit 21. Accordingly, the camera control unit 21 determines that the current position image plane movement coefficient $K_{cur}$ "K12" is equal to the minimum image plane movement coefficient $K_{min}$ "K12", and the process proceeds to step S302. In this manner, in the embodiment, since the current lens position of the focus lens 33 is outside the drivable range, it is determined that the current position image plane movement coefficient $K_{cur}$ is smaller than the minimum image plane movement coefficient $K_{min}$. As a result, it is possible to effectively prevent erroneous determination that some abnormality such as communication abnormality has occurred between the camera body 2 and the lens barrel 3.

In step S602, it is determined whether or not the focus lens 33 has been driven from the near end to the infinity end in a time period from the power-on of the camera 1 to the current time. In particular, in the embodiment, since the drivable range of the focus lens 33 is set, it is determined whether or not the focus lens 33 has been driven from the near end to the infinity end of the currently-set drivable range. For example, in the example illustrated in FIG. 13(B), since the range from the lens position of the infinity-side soft limit $SL_{IS}$ to the near-end soft limit $SL_{NP}$ is set as the drivable range Rf3, it is determined whether or not the focus lens 33 has been driven from the near-end soft limit $SL_{NP}$ which is the near end of the drivable range Rf3 to the lens position of the infinity-side soft limit $SL_{IS}$ which is the infinity end.

In a case where the focus lens 33 is driven from the near end to the infinity end, the process proceeds to step S606. In step S606, it is determined whether or not the current position image plane movement coefficient $K_{cur}$=the minimum image plane movement coefficient $K_{min}$ has been detected as the current position image plane movement coefficient $K_{cur}$ obtained through the hot line communication as a result of the driving of the focus lens 33 from the near end to the infinity end. In a case where it is not detected that the current position image plane movement coefficient $K_{cur}$=the minimum image plane movement coefficient $K_{min}$ irrespective of driving the focus lens 33 from the near end to the infinity end, since it is considered that some abnormality such as communication abnormality between the camera body 2 and the lens barrel 3 has occurred, the process proceeds to step S607, where the abnormality flag is set to 2, and the abnormality determination process is ended. In a case where it is determined in step S606 that the current position image plane movement coefficient $K_{cur}$=the minimum image plane movement coefficient $K_{min}$ it is determined that no abnormality has occurred, and the abnormality determination process is ended.

On the other hand, in a case where it is determined in step S602 that the focus lens 33 is not driven from the near end to the infinity end, the process proceeds to step S603. In step S603, it is determined whether or not the driving operation of the zoom lens 32 is performed by the camera control unit 21. In a case where it is determined that the driving operation of the zoom lens 32 is performed, the process proceeds to step S604. In a case where it is determined that the driving operation of the zoom lens 32 is not performed, the abnormality determination process is ended.

In step S604, the camera control unit 21 transmits a request signal again to the lens control unit 36. The lens control unit 36 transmits the minimum image plane movement coefficient $K_{min}$ corresponding to the lens position of the zoom lens 32 after driving the zoom lens 32 to the camera control unit 21. In addition, the camera control unit 21 resets the minimum image plane movement coefficient $K_{min}$ and the current position image plane movement coefficient $K_{cur}$ acquired before driving the zoom lens 32.

This is because the above-described determinations in steps S601 and S606 are to compare the minimum image plane movement coefficient $K_{min}$ and the current position image plane movement coefficient $K_{cur}$ obtained in a case where the lens position of the zoom lens 32 is at the same position, and thus, in a case where the lens position of the zoom lens 32 changes, the determinations of steps S601 and S606 that the minimum image plane movement coefficient $K_{min}$ and the current position image plane movement coefficient $K_{cur}$ are not newly collected cannot be appropriately performed. If the process of step S604 is ended, the process returns to step S601.

In a case where the "abnormality flag=1" or "abnormality flag=2" is set, it is preferable to perform abnormality process. As abnormality process, for example, it is preferable to prohibit performing in-focus indication by an electronic viewfinder 26 or the like. In a case where the "abnormality flag=1" or "abnormality flag=2" is set, there is a possibility that communication abnormality, circuit abnormality, power supply abnormality, or the like has occurred, and thus, the reliability of AF cannot be guaranteed. For this reason, it is preferable to perform the abnormality process such as prohibition of in-focus indication in order not to perform "in-focus indication" with a low reliability. In a case where the abnormality flag=1 or the abnormality flag=2 is set and the in-focus indication is prohibited, even though the focus lens 33 reaches the in-focus position in step S209, the in-focus indication is not performed.

in a case where the "abnormality flag=1" or "abnormality flag=2" is set, for example, instead of performing a process of prohibiting the in-focus indication or in addition to the process of prohibiting the in-focus indication, it is also preferable to perform a full area search of driving the focus lens from the near end to the infinity end. In some cases, by performing the full area search, it can be confirmed that the cause of the abnormality has been eliminated.

In addition, it is further preferable to perform the full area search in which the focus lens 33 is driven from the near end to the infinity end at a second driving speed which is sufficiently delayed in comparison with a first driving speed which is a driving speed in a normal state. This is because safer full-range search can be performed by performing at a sufficiently delayed second driving speed. In addition, this is because there is a case where, for example, in a case where the driving speed of the focus lens 33 is too high and, thus, the current position image plane movement coefficient $K_{cur}$ satisfying the current position image plane movement coefficient $K_{cur}$=the minimum image plane movement coefficient $K_{min}$ is not detected, in some cases, the current position image plane movement coefficient $K_{cur}$ satisfying the current position image plane movement coefficient $K_{cur}$=the minimum image plane movement coefficient $K_{min}$ may be detected by performing the full area search at a sufficiently delayed second driving speed.

In addition, in a case where the "abnormality flag=1" or "abnormality flag=2", instead of or in addition to the process of prohibiting performing the in-focus indication or the process of performing the full area search at a sufficiently delayed second driving speed, it may be possible to perform a process of prohibiting both of the focus detection by using the phase difference detection method and the focus detection by using the contrast detection method. In particular, in a case where it is considered that "abnormality flag=1" or "abnormality flag=2" and some abnormality such as communication abnormality has occurred, there is a high possibility that a favorable focus detection result cannot be obtained even though the focus detection by using the phase difference detection method and the contrast detection method by using the contrast detection method is performed. For this reason, in this case, a process of prohibiting the focus detection by using the phase difference detection method and the detection by the contrast detection method may be performed.

In addition, in a case where "abnormality flag=1" or "abnormality flag=2" is set once, since it is considered that some abnormality such as communication abnormality has occurred, it is preferable that the abnormality flag is not reset, and the "abnormality flag=1" or "abnormality flag=2" remains until the power is turned off or until the lens barrel 3 is exchanged.

For example, in a case where the abnormality flag=1 or the abnormality flag=2 is set, since the reliability of the AF cannot be guaranteed, in order to avoid useless driving of the focus lens 33, the camera control unit 21 may perform a process of prohibiting the driving of the focus lens 33 irrespective of whether or not the peak value can be detected in step S208. In this case, it is preferable to prohibit the driving of the focus lens 33 until power is turned off or until the lens barrel 3 is exchanged.

In addition, for example, in a case where the abnormality flag=1 or the abnormality flag=2 is set, the camera control unit 21 may perform a process of performing the full area search at a sufficiently delayed second driving speed irrespective of whether or not the peak value can be detected in step S208, a process of prohibiting at least one of the focus detection by using the phase difference detection system and the focus detection by using the contrast detection system, a process of turning off the power supply of the camera, a caution display of the occurrence of an abnormality, or the like.

In addition, for example, in a case where the abnormality flag=1 or the abnormality flag=2 is set, since the reliability of the AF cannot be guaranteed, even if the camera control unit 21 can detect the peak value at step S208, the camera control unit may perform a process of not performing the in-focus driving in S209.

As described above, in the first embodiment, in a case where the focus lens 33 is outside the drivable range, the current position image plane movement coefficient $K_{cur}$ is transmitted as the minimum image plane movement coefficient $K_{min}$. As a result, even in a case where the focus lens 33 is outside the drivable range, it is possible to appropriately perform the setting of the scan driving speed V in step S206 illustrated in FIG. 15, the backlash filling determination process illustrated in FIG. 18, and the clipping operation control process illustrated in FIG. 21.

Namely, in the related art, as illustrated in FIG. 14(B), even in a case where the focus lens 33 is outside the drivable range Rf3, the minimum image plane movement coefficient $K_{min}$ corresponding to the drivable range Rf3 is transmitted to the camera control unit 21. For this reason, the scan driving speed V is calculated on the basis of the minimum image plane movement coefficient $K_{min}$ that is larger than the current position image plane movement coefficient $K_{cur}$, and as a result, in some cases, for example, at the current lens position of the focus lens 33, the scan driving speed V is higher than the speed at which the in-focus position can be appropriately detected, so that the in-focus position may not be appropriately detected. In addition, the image plane moving amount $I_G$ corresponding to the backlash amount G is calculated on the basis of the minimum image plane movement coefficient $K_{min}$ that is larger than the current position image plane movement coefficient $K_{cur}$, and as a result, in some cases, for example, at the current lens position of the focus lens 33, the image plane moving amount $I_G$ becomes smaller than the focal depth of the optical system, so that the backlash filling determination may not be appropriately performed. In addition, the noise-reduction lower limit image plane moving speed V0b_max is calculated on the basis of the minimum image plane movement coefficient $K_{min}$ that is larger than the current position image plane movement coefficient $K_{cur}$, and as a result, in some cases, the image plane moving speed V0b corresponding to the noise-reduction lower limit lens moving speed becomes higher than the noise-reduction lower limit image plane moving speed V0b_max (for example, in the example illustrated in FIG. 22, in a case where the current position image plane movement coefficient $K_{cur}$ is "0", the image plane moving speed V0b becomes higher than the noise-reduction lower limit image plane moving speed V0b_max). In this case, even in a case where the image plane moving speed at the time of the focus detection is the image plane moving speed V1a for the focus detection where clipping operation is to be prohibited, in some cases, the clipping operation may be permitted, and thus, in some cases, the appropriate focus detection accuracy can be secured.

On the other hand, in the first embodiment, in a case where the focus lens 33 is outside the drivable range, since the current position image plane movement coefficient $K_{cur}$ is transmitted from the lens control unit 36 to the camera control unit 21, the scan driving speed V, the image plane moving amount $I_G$ corresponding to the backlash amount G, or the noise-reduction lower limit image plane moving speed V0b_max can be effectively prevented from being calculated on the basis of the minimum image plane movement coefficient $K_{min}$ that is larger than the image plane movement coefficient corresponding to the current lens position of the focus lens 33. As a result, even in a case where the focus lens 33 is outside the drivable range, it is possible to appropriately perform the setting of the scan driving speed V in step S206 illustrated in FIG. 15, the backlash filling determination process illustrated in FIG. 18, and the clipping operation control process illustrated in FIG. 21.

In the embodiment, in the abnormality determination process illustrated in FIG. 25, in a case where the current position image plane movement coefficient $K_{cur}$ is smaller than the minimum image plane movement coefficient $K_{min}$ (step S601=No), it is determined that some abnormality such as communication abnormality between the camera body 2 and the lens barrel 3 has occurred, and thus, the abnormality process is performed. Therefore, it is possible to notify the user that an abnormality has occurred, and it is possible to effectively prevent an unfocused image or the like from being captured due to the operations of the camera 1 at the time of occurrence of the abnormality. On the other hand, as illustrated in FIG. 14(B), in a case where the focus lens 33 is outside the drivable range, in some cases, the current position image plane movement coefficient $K_{cur}$ may be smaller than the minimum image plane movement coefficient $K_{min}$. Even in a case where no abnormality has occurred between the camera body 2 and the lens barrel 3, in some cases, it is determined that an abnormality has occurred. On the other hand, in the embodiment, in a case where the focus lens 33 is outside the drivable range, the current position image plane movement coefficient $K_{cur}$ is transmitted as the minimum image plane movement coefficient $K_{min}$, so that it is possible to effectively prevent the current position image plane movement coefficient $K_{cur}$ from being determined to be smaller than the minimum image plane movement coefficient $K_{min}$. As a result, it is possible to appropriately perform the abnormality determination.

In addition, in the embodiment, in a case where it is determined that the current lens position of the focus lens 33 is outside the drivable range, it is preferable that the camera control unit 21 performs the search driving of the focus lens 33 inside the drivable range before the search driving (search control).

In addition, it is preferable that the drivable range changes depending on the state of the focus limit switch 38. It is preferable that the drivable range is at least one of a range where the focus lens 33 is driven in the search control of the contrast AF and a range where the focus lens 33 is driven in the in-focus driving after the search control of the contrast AF. In addition, the drivable range may be a range where the photographer desires to perform the in-focus driving of the focus lens 33.

In addition, in the embodiment, the embodiment where the camera control unit 21 performs the focus control with the contrast AF has been described in detail, but the camera control unit 21 may perform the focus control with the phase difference AF. In this case, if a defocus amount detected by the phase difference detection method is inside the drivable range, the camera control unit 21 may be configured to drive the focus lens 33 on the basis of the defocus amount. In addition, if the defocus amount is outside the drivable range, the focus lens 33 may configured not to be driven on the basis of the defocus amount. In addition, if the position where the focus lens 33 is driven is inside the drivable range on the basis of the defocus amount, the camera control unit 21 may be configured to perform in-focus indication on a finder 235, an electronic viewfinder 26, and the like. In addition, if the position where the focus lens 33 is driven is outside the drivable range on the basis of the defocus amount, the camera control unit may be configured not perform the in-focus indication on the finder 235, the electronic viewfinder 26, or the like.

Second Embodiment

Next, a second embodiment will be described. In the second embodiment, the camera 1 illustrated in FIG. 1 has a configuration similar to that of the above-described first embodiment except for operations described below. More specifically, the camera 1 according to the second embodiment performs operates similarly to the camera 1 except for the operations described below in the lens information transmission process illustrated in FIG. 26 and the abnormality determination process illustrated in FIG. 27 in the same manner as in the first embodiment.

Figure 26:
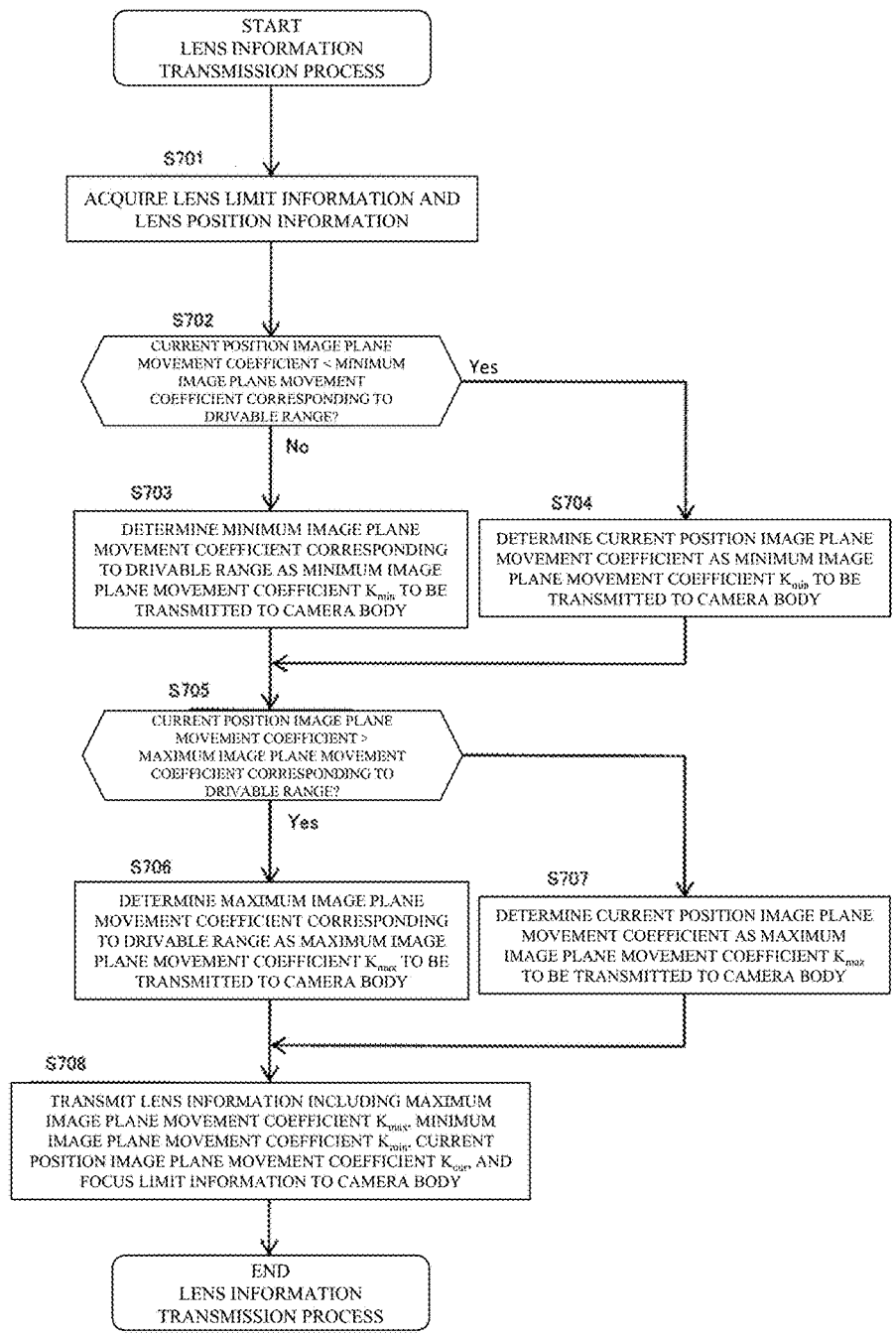
FIG. 26 is a flowchart illustrating a lens information transmission process according to a second embodiment.

FIG. 26 is a flowchart illustrating a lens information transmission process according to the second embodiment. Hereinafter, the lens information transmission process according to the second embodiment will be described with reference to FIG. 26. The lens information transmission process according to the second embodiment is repeatedly performed at predetermined intervals after the hot line communication is started by the lens control unit 36.

First, in step S701, similarly to step S101 in the first embodiment, the focus limit information and the information on the current lens position of the focus lens 33 are acquired.

Then, in step S702, the lens control unit 36 determines whether or not the current position image plane movement coefficient $K_{cur}$ corresponding to the current lens position of the focus lens 33 is smaller than the minimum image plane movement coefficient $K_{min}$ corresponding to the drivable range.

For example, in the example illustrated in FIG. 14(B), the current position image plane movement coefficient $K_{cur}$ is "K12", and the minimum image plane movement coefficient $K_{min}$ corresponding to the drivable range Rf3 is "K14". For this reason, it is determined that the current position image plane movement coefficient $K_{cur}$ is smaller than the minimum image plane movement coefficient $K_{min}$ corresponding to the drivable range Rf3. in a case where it is determined that the current position image plane movement coefficient $K_{cur}$ is greater than or equal to the minimum image plane movement coefficient $K_{min}$ corresponding to the drivable range, the process proceeds to step S703. On the other hand, in a case where it is determined that it is smaller than the minimum image plane movement coefficient $K_{min}$, the process proceeds to step S704.

In step S703, since it is determined that the current position image plane movement coefficient $K_{cur}$ is equal to or larger than the minimum image plane movement coefficient $K_{min}$ corresponding to the drivable range, similarly to step S103 of the first embodiment, the minimum image plane movement coefficient corresponding to the drivable range is determined as the minimum image plane movement coefficient $K_{min}$ to be transmitted to the camera body 2. On the other hand, in step S704, since it is determined that the current position image plane movement coefficient $K_{cur}$ is smaller than the minimum image plane movement coefficient $K_{min}$ corresponding to the drivable range, similarly to step S106 of the first embodiment, the current position image plane movement coefficient $K_{cur}$ at the current lens position of the focus lens 33 is determined as the minimum image plane movement coefficient $K_{min}$ to be transmitted to the camera body 2.

In addition, in step S705, the lens control unit 36 determines whether or not the current position image plane movement coefficient $K_{cur}$ corresponding to the current lens position of the focus lens 33 is larger than the maximum image plane movement coefficient $K_{max}$ corresponding to the drivable range. In a case where it is determined that the current position image plane movement coefficient $K_{cur}$ is larger than the maximum image plane movement coefficient $K_{max}$ corresponding to the drivable range, the process proceeds to step S707. On the other hand, in a case where the current position image plane movement coefficient $K_{cur}$ is equal to or smaller than the maximum image plane movement coefficient $K_{max}$ corresponding to the drivable range, the process proceeds to step S706.

In step S706, since it is determined that the current position image plane movement coefficient $K_{cur}$ is equal to or smaller than the maximum image plane movement coefficient $K_{max}$ corresponding to the drivable range, similarly to step S103 of the first embodiment, the maximum image plane movement coefficient corresponding to the display device is determined as the maximum image plane movement coefficient $K_{max}$ to be transmitted to the camera body 2. On the other hand, in step S707, since it is determined that the current position image plane movement coefficient $K_{cur}$ is larger than the maximum image plane movement coefficient $K_{max}$ corresponding to the drivable range, similarly to step S108 of the first embodiment, the current position image plane movement coefficient $K_{cur}$ at the current lens position of the focus lens 33 is determined as the maximum image plane movement coefficient $K_{max}$ to be transmitted to the camera body 2.

Then, in step S708, similarly to step S104 of the first embodiment, lens information including the minimum image plane movement coefficient $K_{min}$ determined in step S703 or S 704, the maximum image plane movement coefficient $K_{max}$ determined in step S706 or S 707, the current position image plane movement coefficient $K_{cur}$ at the current lens position of the focus lens 33, the focus limit information, the focus lens position, and the zoom lens position is transmitted to the camera control unit 21.

Figure 27:
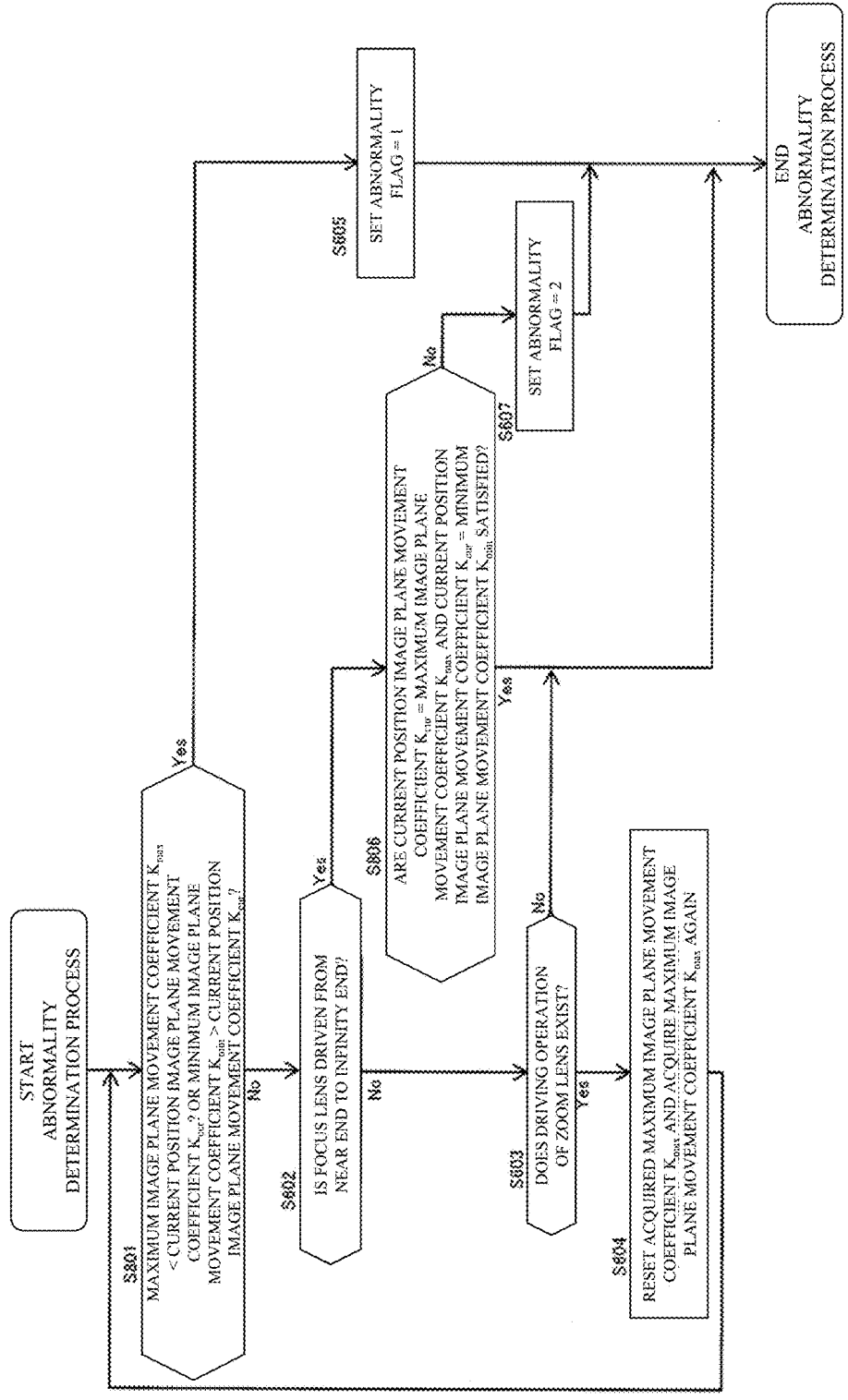
FIG. 27 is a flowchart illustrating an abnormality determination process according to the second embodiment.

Next, the abnormality determination process according to the second embodiment will be described. FIG. 27 is a flowchart illustrating the abnormality determination process according to the second embodiment. In FIG. 27, steps S602 to S605 and S607 are similar to the configuration of FIG. 25, and thus, the detailed description thereof will be omitted. In addition, similarly to the first embodiment, for example, in a case where a photographer performs a half-pushing operation of a release button provided on the operation unit 28 or performs an AF activating operation, or the like, the abnormality determination process illustrated in FIG. 27 is performed in parallel with the operations of the camera 1 illustrated in FIG. 15.

First, in step S801, it is determined whether the current position image plane movement coefficient $K_{cur}$ repeatedly acquired through the hot line communication is larger than the maximum image plane movement coefficient $K_{max}$ or smaller than the minimum image plane movement coefficient $K_{min}$. In a case where the current position image plane movement coefficient $K_{cur}$ is detected so that the maximum image plane movement coefficient $K_{max}$<the current position image plane movement coefficient $K_{cur}$ or the minimum image plane movement coefficient $K_{min}$>the current position image plane movement coefficient $K_{cur}$, it is considered that some abnormality such as communication abnormality between the camera body 2 and the lens barrel 3 has occurred. For this reason, the process proceeds to step S605, where the abnormality flag is set to 1, and the abnormality determination process is ended. On the other hand, in a case where the current position image plane movement coefficient $K_{cur}$ is not detected so that the maximum image plane movement coefficient $K_{max}$<the current position image plane movement coefficient $K_{cur}$ or the minimum image plane movement coefficient $K_{min}$>the current position image plane movement coefficient $K_{cur}$, the process proceeds to step S602.

Herein, in the second embodiment, an abnormality determination process is performed by using the current position image plane movement coefficient $K_{cur}$, the minimum image plane movement coefficient $K_{min}$, and the maximum image plane movement coefficient $K_{max}$ transmitted from the lens information transmission process illustrated in FIG. 26. For example, in the example illustrated in FIG. 13(B), through the lens information transmission process illustrated in FIG. 26, the current position image plane movement coefficient $K_{cur}$ "K16", the minimum image plane movement coefficient $K_{min}$ "K14" corresponding to the drivable range, and the maximum image plane movement coefficient $K_{max}$ "K19" corresponding to the drivable range are transmitted to the camera control unit 21. Accordingly, the camera control unit 21 determines that the current position image plane movement coefficient $K_{cur}$ "K16" is larger than the minimum image plane movement coefficient $K_{min}$ "K14" and smaller than the maximum image plane movement coefficient $K_{max}$ "K19", and the process proceeds to step S602.

In addition, in the example illustrated in FIG. 14(B), the current position image plane movement coefficient $K_{cur}$ "K12" is smaller than the minimum image plane movement coefficient $K_{min}$ "K14" corresponding to the drivable range. For this reason, in the lens information transmission process illustrated in FIG. 26, the current position image plane movement coefficient $K_{cur}$ "K12" is transmitted as the minimum image plane movement coefficient $K_{min}$ to the camera control unit 21. In addition, through the lens information transmission process illustrated in FIG. 26, the current position image plane movement coefficient $K_{cur}$ "K12" and the maximum image plane movement coefficient $K_{max}$ "K19" corresponding to the drivable range are transmitted to the camera control unit 21. Accordingly, the camera control unit 21 determines that the current position image plane movement coefficient $K_{cur}$ "K12" is equal to the minimum image plane movement coefficient $K_{min}$ "K12" and smaller than the maximum image plane movement coefficient $K_{max}$ "K19", and the process proceeds to step S602.

In a case where it is determined in step S602 that the focus lens 33 has been driven from the near end to the infinity end, the process proceeds to step S806. In step S806, it is determined whether or not the current position image plane movement coefficient $K_{cur}$=the maximum image plane movement coefficient $K_{max}$ has been detected and the current position image plane movement coefficient $K_{cur}$=the minimum image plane movement coefficient $K_{min}$ has been detected as the current position image plane movement coefficient $K_{cur}$ obtained through the hot line communication as a result of the driving of the focus lens 33 from the near end to the infinity end. In a case where it cannot be detected that the current position image plane movement coefficient $K_{cur}$=the maximum image plane movement coefficient $K_{max}$ and the current position image plane movement coefficient $K_{cur}$=the minimum image plane movement coefficient $K_{min}$ irrespective of driving the focus lens 33 from the near end to the infinity end, since it is considered that some abnormality such as communication abnormality between the camera body 2 and the lens barrel 3 has occurred, the process proceeds to step S607, where the abnormality flag=2 is set, and the abnormality determination process is ended. In a case where it is determined in step S806 that the current position image plane movement coefficient $K_{cur}$=the maximum image plane movement coefficient $K_{max}$ and the current position image plane movement coefficient $K_{cur}$=the minimum image plane movement coefficient $K_{min}$ have been detected, the abnormality determination process is ended.

In this manner, in the second embodiment, in a case where the current position image plane movement coefficient $K_{cur}$ is smaller than the minimum image plane movement coefficient $K_{min}$, the current position image plane movement coefficient $K_{cur}$ is transmitted as the minimum image plane movement coefficient $K_{min}$ to the camera control unit 21. In addition, in a case where the current position image plane movement coefficient $K_{cur}$ is larger than the maximum image plane movement coefficient $K_{max}$, the current position image plane movement coefficient $K_{cur}$ is transmitted as the maximum image plane movement coefficient $K_{max}$ to the camera control unit 21. Accordingly, in the second embodiment, in addition to the effect of the first embodiment, it is possible to transmit an appropriate image plane movement coefficient corresponding to the lens position of the focus lens 33 to the camera control unit 21 without determining whether or not the focus lens 33 is inside the drivable range. As a result, even in a case where the focus lens 33 is outside the drivable range, it is possible to appropriately perform the setting of the scan driving speed V in step S206 illustrated in FIG. 15, the backlash filling determination process illustrated in FIG. 18, and the clipping operation control process illustrated in FIG. 21.

In addition, in the second embodiment, in a case where the current position image plane movement coefficient $K_{cur}$ is larger than the maximum image plane movement coefficient $K_{max}$, by determining that the current position image plane movement coefficient $K_{cur}$ is abnormal, it is possible to appropriately determine the occurrence of abnormality such as communication abnormality between the camera body 2 and the lens barrel 3. In addition, the second embodiment, in the lens barrel 3, in a case where it is determined that the current position image plane movement coefficient $K_{cur}$ is larger than the maximum image plane movement coefficient $K_{max}$, the current position image plane movement coefficient $K_{cur}$ is controlled to be transmitted as the maximum image plane movement coefficient $K_{max}$ to the camera control unit 21. Therefore, in a case where the camera control unit 21 determines that the current position image plane movement coefficient $K_{cur}$ is larger than the maximum image plane movement coefficient $K_{max}$, it is possible to more appropriately determine that abnormality such as communication abnormality between the camera body 2 and the lens barrel 3 has occurred.

Third Embodiment

Next, a third embodiment will be described. In the third embodiment, the camera 1 illustrated in FIG. 1 has a configuration similar to that of the above-described first embodiment except for operations described below. More specifically, the camera 1 according to the third embodiment operates similarly to the camera 1 according to the first embodiment except for operations described below in the abnormality determination process illustrated in FIG. 28. Hereinafter, the abnormality determination process according to the third embodiment will be described.

Figure 28:
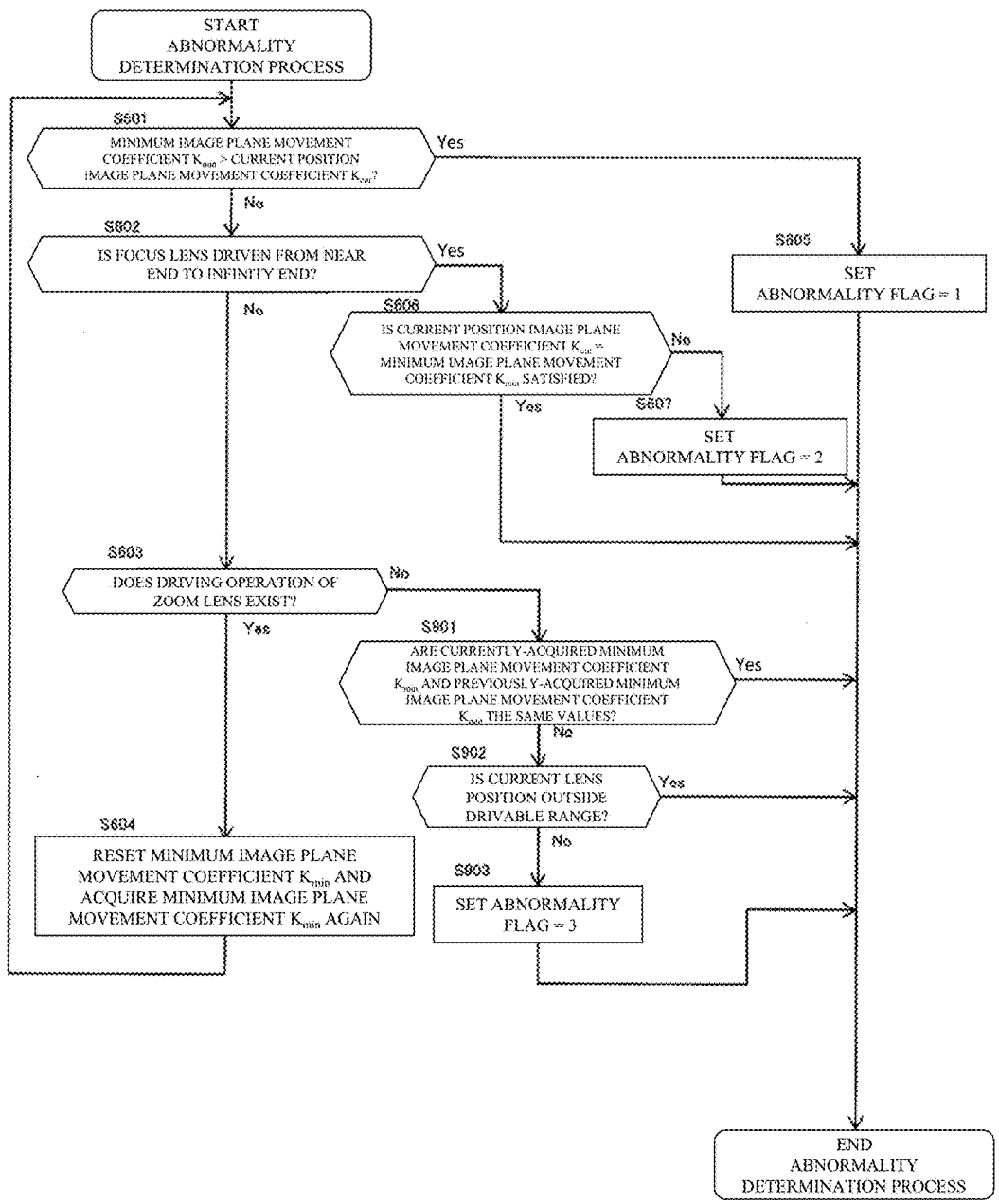
FIG. 28 is a flowchart illustrating an abnormality determination process according to a third embodiment.
Figure 29:
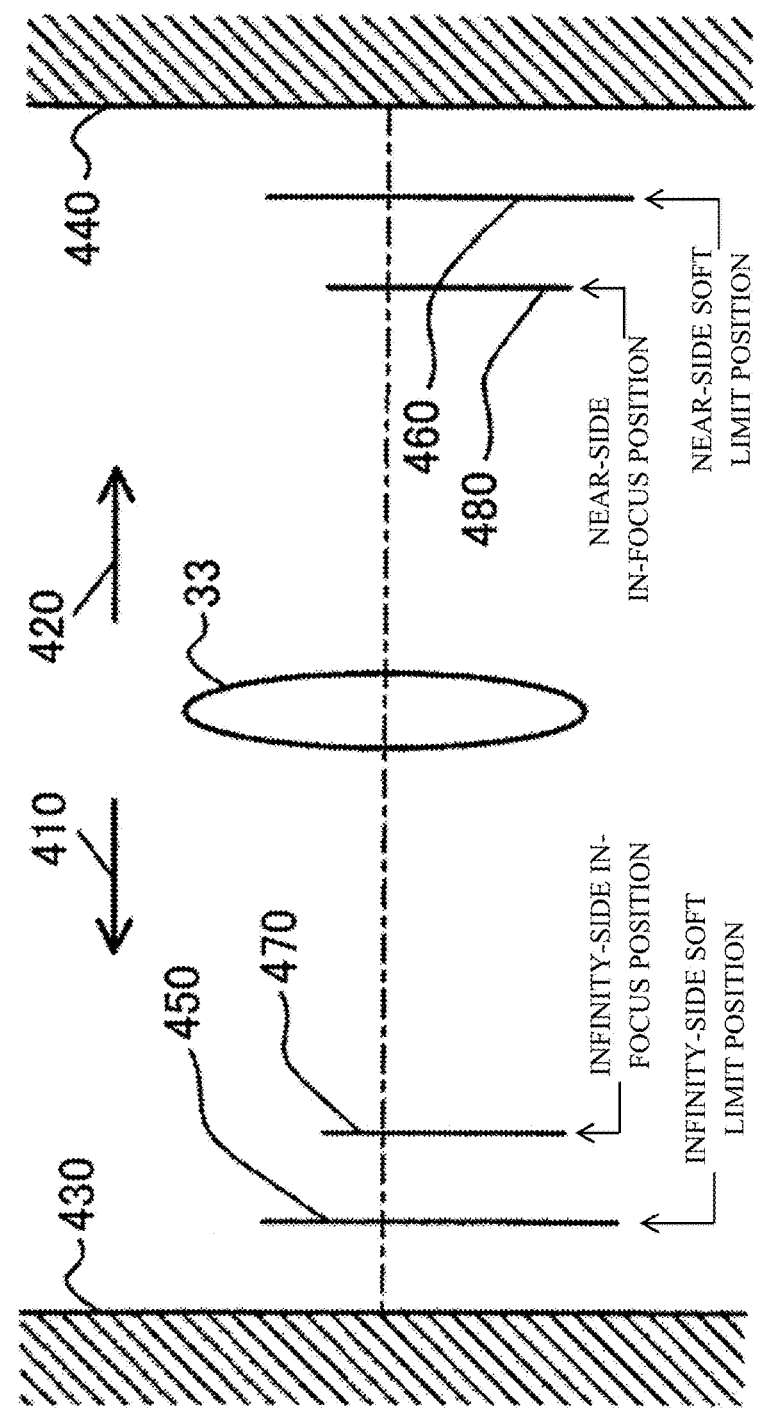
FIG. 29 is a diagram illustrating a drivable range of a focus lens 33.

FIG. 28 is a flowchart illustrating the abnormality determination process according to the third embodiment. In FIG. 28, steps S602 to S607 are similar to the configuration of FIG. 25, and thus, the detailed description thereof will be omitted. In addition, similarly to the first embodiment, for example, in a case where a photographer performs a half-pushing operation of a release button provided on the operation unit 28 or performs an AF activating operation or the like, the abnormality determination process illustrated in FIG. 28 is performed in parallel with the operations of the camera 1 illustrated in FIG. 15.

In the abnormality determination process according to the third embodiment, when the focus lens 33 is being driven from the near end to the infinity end (step S602=No), in a case where there is no driving operation of the zoom lens (step S603=No), the process proceeds to step S901. In step S901, the lens control unit 36 compares the currently-acquired minimum image plane movement coefficient $K_{min\_0}$ which is the minimum image plane movement coefficient $K_{min}$ acquired in the current process with the previously-acquired minimum image plane movement coefficient $K_{min\_1}$ which is the minimum image plane movement coefficient $K_{min}$ acquired in the previous process and determines whether the minimum image plane movement coefficients are the same value or different values.

Namely, in step S901, it is determined whether or not the minimum image plane movement coefficient $K_{min}$ repeatedly acquired has changed. In a case where the currently-acquired minimum image plane movement coefficient $K_{min\_0}$ and the previously-acquired minimum image plane movement coefficient $K_{min\_1}$ are the same value, namely, in a case where it is determined that the repeatedly acquired minimum image plane movement coefficient $K_{min}$ has not changed, it is determined that no abnormality has occurred, and the abnormality determination process is ended. On the other hand, in a case where the currently-acquired minimum image plane movement coefficient $K_{min\_0}$ and the previously-acquired minimum image plane movement coefficient $K_{min\_1}$ are different values, namely, in a case where it is determined that the repeatedly acquired minimum image plane movement coefficient $K_{min}$ has changed, the process proceeds to step S902.

In step S902, it is determined whether or not the current lens position of the focus lens 33 is outside the drivable range. In a case where the current lens position of the focus lens 33 is outside the drivable range, the abnormality determination process is ended. This is because, as illustrated in FIG. 14(B), such a change of the minimum image plane movement coefficient $K_{min}$ is caused by repeatedly transmitting the current position image plane movement coefficient $K_{cur}$ as the minimum image plane movement coefficient $K_{min}$ while driving the focus lens backward in order that the current lens position of the focus lens 33 is outside the drivable range Rf3, and thus, it cannot be considered that any abnormality such as communication abnormality has occurred. On the other hand, in a case where the current lens position of the focus lens 33 is inside the drivable range, it is determined that some abnormality has occurred, and the process proceeds to step S903, where the abnormality flag=3 is set.

In addition, in the third embodiment, in a case where the "abnormality flag=3" is set, similarly to a case where the "abnormality flag=1" or "abnormality flag=2" is set, the abnormality process is performed. For example, in a case where the "abnormality flag=3" is set, it is possible to perform prohibiting the in-focus indication, performing the full area search, prohibiting the focus detection, turning off the power supply of the camera, displaying a caution that abnormality has occurred, and the like.

In this manner, in the third embodiment, in a case where the focus lens 33 is inside the drivable range and the minimum image plane movement coefficient $K_{min}$ changes while the zoom lens 32 is not driven, it is determined that there is a possibility that communication abnormality, circuit abnormality, power supply abnormality or the like has occurred, and it is possible to effectively preventing malfunctioning and false focusing of the camera 1 by performing the abnormality process.

In addition, in the third embodiment, as the abnormality process is appropriately performed, even in a case where the minimum image plane movement coefficient $K_{min}$ changes while the zoom lens 32 is not driven, in a case where the focus lens 33 is outside the drivable range, it is determined that such a change of the minimum image plane movement coefficient Kim is caused by repeatedly transmitting the current position image plane movement coefficient $K_{cur}$ as the minimum image plane movement coefficient $K_{min}$ while driving the focus lens 33 backward in order that the focus lens 33 is outside the drivable range, and thus, the abnormality process may not be performed.

In addition, in the third embodiment described above, although the abnormality determination method in a case where the minimum image plane movement coefficient $K_{min}$ changes has been described, it is also possible to perform the abnormality determination in a case where the maximum image plane movement coefficient $K_{max}$ changes. Namely, in some configuration, in a case where the focus lens 33 is inside the drivable range and the maximum image plane movement coefficient $K_{max}$ changes while the zoom lens 32 is not driven, the abnormality process may be performed. In addition, in some configuration, even in a case where the maximum image plane movement coefficient $K_{max}$ changes while the zoom lens 32 is not driven, in a case where the focus lens 33 is outside the drivable range, it is determined that such a change of the maximum image plane movement coefficient $K_{max}$ is caused by repeatedly transmitting the current position image plane movement coefficient $K_{cur}$ as the maximum image plane movement coefficient $K_{max}$ while driving the focus lens 33 backward in order that the focus lens 33 is outside the drivable range, and thus, the abnormality process may not be performed.

Fourth Embodiment

Next, a fourth embodiment will be described. In the fourth embodiment, the camera 1 illustrated in FIG. 1 has a configuration similar to that of the above-described first embodiment except for operations described below.

In the above-described first embodiment, exemplified is the configuration where, in a case where the focus limit mode is changed and the focus lens 33 is temporarily outside the drivable range, the current position image plane movement coefficient $K_{cur}$ at the current lens position of the focus lens 33 is transmitted as the minimum image plane movement coefficient $K_{min}$ to the camera control unit 21.

On the other hand, in the camera 1 according to the fourth embodiment, for example, as illustrated in FIG. 14(B), in a case where the focus limit mode is changed from the "FULL mode" to the "infinity-side limit mode" and the current lens position of the focus lens 33 is temporarily outside the drivable range Rf3, the smallest image plane movement coefficient (1(11 to K13) among the image plane movement coefficients (K11 to K13) corresponding to the areas (D1 to D3) outside the drivable range (K11) is transmitted as the minimum image plane movement coefficient $K_{min}$ to the camera control unit 21.

Namely, in the fourth embodiment, as illustrated in FIG. 14(B), in a case where the current lens position of the focus lens 33 is in the area "D2" outside the drivable range, the smallest image plane movement coefficient (K11) among the image plane movement coefficients (K11 to K13) corresponding to the areas (D1 to D3) outside the drivable range is transmitted as the minimum image plane movement coefficient $K_{min}$ to the camera body 2. In addition, even in a case where the current lens position of the focus lens 33 is in the area "D3" outside the drivable range, the smallest image plane movement coefficient (K11) among the image plane movement coefficients (K11 to K13) corresponding to the areas (D1 to D3) outside the drivable range is transmitted as the minimum image plane movement coefficient $K_{min}$ to the camera body 2.

In addition, similarly, in the fourth embodiment, in a case where the focus limit mode is changed from the "FULL mode" to the "rear-side limit mode" and the current lens position of the focus lens 33 is temporarily outside the drivable range Rf2, the largest image plane movement coefficient (K19) among the image plane movement coefficients (K16 to K19) corresponding to the outside of the drivable range (for example, D6 to D9 in the example illustrated in FIG. 7(B)) is transmitted as the maximum image plane movement coefficient $K_{max}$ to the camera control unit 21.

Namely, in the fourth embodiment, in the example illustrated in FIG. 7(B), in a case where the current lens position of the focus lens 33 is in the area "D6" outside the drivable range, the largest image plane movement coefficient (K19) among the image plane movement coefficients (K16 to K19) corresponding to the outsides (D6 to D9) of the drivable range is transmitted as the maximum image plane movement coefficient $K_{max}$ to the camber body 2. In addition, in a case where the current lens position of the focus lens 33 is in the area "D7", the largest image plane movement coefficient (K19) among the image plane movement coefficients (K16 to K19) corresponding to the outsides (D6 to D9) (K19) is transmitted as the maximum image plane movement coefficient $K_{max}$ to the camera body 2.

In this manner, in the fourth embodiment, in a case where the focus lens 33 is outside the drivable range, the smallest image plane movement coefficient or the largest image plane movement coefficient among the plurality of image plane movement coefficients corresponding to each area outside the drivable range is transmitted as the minimum image plane movement coefficient $K_{min}$ or the maximum image plane movement coefficient $K_{max}$ from the lens control unit 36 to the camera control unit 21. Accordingly, in the fourth embodiment, in addition to the effects of the first embodiment, it is possible to obtain the following effects. Namely, in the fourth embodiment, in a case where the focus lens 33 is outside the drivable range, a predetermined image plane movement coefficient can be transmitted as the minimum image plane movement coefficient $K_{min}$ or the maximum image plane movement coefficient $K_{max}$ to the camera control unit 21. For this reason, similarly to the first embodiment, in comparison with a case where the current image plane movement coefficient $K_{cur}$ corresponding to the current position of the focus lens 33 is detected and the current position image plane movement coefficient $K_{cur}$ is transmitted as the minimum image plane movement coefficient $K_{min}$ or the maximum image plane movement coefficient $K_{max}$ to the camera control unit 21, it is possible to simplify the circuit design of the lens control unit 36.

In addition, in the fourth embodiment, in a case where the focus lens 33 is within the drivable range, similarly to the first embodiment, the minimum image plane movement coefficient $K_{min}$ and the maximum image plane movement coefficient $K_{max}$ are transmitted as the minimum image plane movement coefficient $K_{min}$ and the maximum image plane movement coefficient $K_{max}$ to the camera body 2.

Fifth Embodiment

Next, a fifth embodiment will be described. In the fifth embodiment, the camera 1 illustrated in FIG. 1 has a configuration similar to that of the above-described first embodiment except for operations described below.

In the fifth embodiment, for example, as illustrated in FIG. 14(B), in a case where the focus limit mode is changed from the "FULL mode" to the "infinity-side limit mode" and the current lens position of the focus lens 33 is temporarily outside the range Rf3, a value obtained by multiplying the current image plane movement coefficient $K_{cur}$ by a predetermined constant k1 (0<k1<1) is transmitted as the minimum image plane movement coefficient $K_{min}$ to the camera control unit 21. In addition, the constant k1 is not particularly limited as long as it is larger than 0 and smaller than 1, and for example, k1 may be set to "0.9".

In the fifth embodiment, as illustrated in FIG. 7(B), for example, in a case where the focus limit mode is changed from the "FULL mode" to the "rear-side limit mode" and the current lens position of the focus lens 33 is temporarily outside the drivable range Rf2, a value obtained by multiplying the current image plane movement coefficient $K_{cur}$ by a predetermined constant k2 (1<k2) is transmitted as the maximum image plane movement coefficient $K_{max}$ to the camera control unit 21. In addition, the constant k2 is not particularly limited as long as it is a number greater than 1, and for example, the constant may be set to "1.1".

In this manner, in the fifth embodiment, in a case where the focus lens 33 is outside the drivable range, the values obtained by multiplying the current image plane movement coefficient $K_{cur}$ by the predetermined constants k1 (0<k1<1) and k2 (1<k2) are transmitted as the minimum image plane movement coefficient $K_{min}$ or the maximum image plane movement coefficient $K_{max}$ from the lens control unit 36 to the camera control unit 21. Therefore, in the fifth embodiment, as illustrated in FIG. 14(B), even in a case where the focus limit mode is changed and the current lens position of the focus lens 33 is temporarily outside the drivable range Rf3, the current position image plane movement coefficient $K_{cur}$ can be set to be larger than the minimum image plane movement coefficient $K_{min}$. As a result, in the abnormality determination process, it is possible to effectively prevent erroneous determination that an abnormality has occurred due to the fact that the current position image plane movement coefficient $K_{cur}$ is smaller than the minimum image plane movement coefficient $K_{min}$. Similarly, in the example illustrated in FIG. 7(B), for example, even in a case where the current lens position of the focus lens 33 is temporarily outside the drivable range Rf2, the current position image plane movement coefficient $K_{cur}$ is set to be smaller than the maximum image plane movement coefficient. As a result, in the abnormality determination process, it is possible to effectively prevent erroneous determination that an abnormality has occurred due to the fact that the current position image plane movement coefficient $K_{cur}$ is larger than the maximum image plane movement coefficient $K_{max}$.

In addition, in the fifth embodiment, in a case where the focus lens 33 is within the drivable range, similarly to the first embodiment, the minimum image plane movement coefficient $K_{min}$ and the maximum image plane movement coefficient $K_{max}$ are transmitted as the minimum image plane movement coefficient $K_{min}$ and the maximum image plane movement coefficient $K_{max}$ to the camera body 2.

Sixth Embodiment

Next, a sixth embodiment will be described. In the sixth embodiment, the camera 1 illustrated in FIG. 1 has a configuration similar to that of the above-described first embodiment except for operations described below.

In the sixth embodiment, for example, as illustrated in FIG. 14(B), in a case where the focus limit mode is changed from the "FULL mode" to the "infinity-side limit mode" and the current lens position of the focus lens 33 is temporarily outside the drivable range Rf3, a value ($K_{cur}$–k3) obtained by subtracting a predetermined value k3 (0<k3) from the current image plane movement coefficient $K_{cur}$ is transmitted as the minimum image plane movement coefficient $K_{min}$ to the camera control unit 21. In addition, the constant k3 is not particularly limited as long as it is a number larger than 0, and for example, k3 may be set to "1".

In addition, in the sixth embodiment, for example, as illustrated in FIG. 7(B), in a case where the focus limit mode is changed from the "FULL mode" to the "rear-side limit mode" and the current lens position of the focus lens 33 is temporarily outside the drivable range Rf2, a value ($K_{cur}$+k4) obtained by adding the predetermined value k4(0<k4) to the current image plane movement coefficient $K_{cur}$ is transmitted to the camera control unit 21 as the maximum image plane movement coefficient $K_{max}$. In addition, the constant k4 is not particularly limited as long as it is a number larger than 0, and, for example, the constant may be set to "1".

In this manner, in the sixth embodiment, in a case where the focus lens 33 is outside the drivable range, a value obtained by subtracting a predetermined value k3 (0<k3) from the current image plane movement coefficient $K_{cur}$ or a value obtained by adding k4 (0<k4) to the current image plane movement coefficient $K_{cur}$ is transmitted as the minimum image plane movement coefficient $K_{min}$ or the maximum image plane movement coefficient $K_{max}$ from the lens control unit 36 to the camera control unit 21. Thus, in the sixth embodiment, as illustrated in FIG. 14(B), even in a case where the focus limit mode is changed and the current lens position of the focus lens 33 is temporarily outside the drivable range Rf3, the current position image plane movement coefficient $K_{cur}$ can be set to be larger than the minimum image plane movement coefficient $K_{min}$. As a result, in the abnormality determination process, it is possible to effectively prevent erroneous determination that an abnormality has occurred due to the fact that the current position image plane movement coefficient $K_{cur}$ is smaller than the minimum image plane movement coefficient $K_{min}$. Similarly, for example, in the example illustrated in FIG. 7(B), even in a case where the current lens position of the focus lens 33 is temporarily outside the drivable range Rf2, the current position image plane movement coefficient $K_{cur}$ can be set to be smaller than the maximum image plane movement coefficient $K_{max}$. As a result, in the abnormality determination process, it is possible to effectively prevent erroneous determination that an abnormality has occurred due to the fact that the current position image plane movement coefficient $K_{cur}$ is larger than the maximum image plane movement coefficient $K_{max}$.

In addition, in the sixth embodiment, in a case where the focus lens 33 is within the drivable range, similarly to the first embodiment, the minimum image plane movement coefficient $K_{min}$ and the maximum image plane movement coefficient $K_{max}$ corresponding to the drivable range are transmitted as the minimum image plane movement coefficient $K_{min}$ and the maximum image plane movement coefficient $K_{max}$ to the camera body 2.

Seventh Embodiment

Next, a seventh embodiment will be described. In the seventh embodiment, the camera 1 illustrated in FIG. 1 has a configuration similar to that of the above-described first embodiment except for operations described below.

In the seventh embodiment, for example, as illustrated in FIG. 14(B), in a case where the focus limit mode is changed from the "FULL mode" to the "infinity-side limit mode" and the focus lens 33 is outside the drivable range Rf3, the lens control unit 36 temporarily stops the transmission of the minimum image plane movement coefficient $K_{min}$ to the camera control unit 21 until the focus lens 33 is moved to the inside of the drivable range Rf3. In addition, in a case where the focus lens 33 is moved to the inside of the drivable range Rf3, the lens control unit 36 transmits the minimum image plane movement coefficient $K_{min}$ in the drivable range Rf3 from the lens control unit 36 to the camera control unit 21.

In addition, similarly, as illustrated in FIG. 7(B), for example, in a case where the focus limit mode is changed from "FULL mode" to "nearest side limit mode" and the focus lens 33 is outside the drivable range Rf2, the lens control unit 36 temporarily stops the transmission of the maximum image plane movement coefficient $K_{max}$ to the camera control unit 21 until the focus lens 33 is moved to the inside of the drivable range Rf2. Then, in a case where the focus lens 33 is moved to the inside of the drivable range Rf2, the lens control unit 36 transmits the maximum image plane movement coefficient $K_{max}$ in the drivable range Rf2 from the lens control unit 36 to the camera control unit 21.

In this manner, in the seventh embodiment, in a case where the focus limit mode is changed and the focus lens 33 is outside the drivable range, until the focus lens 33 is moved to the inside of the changed drivable range, the transmission to the camera control unit 21 of the minimum image plane movement coefficient $K_{min}$ and/or the maximum image plane movement coefficient $K_{max}$ is stopped. Then, in a case where the focus lens 33 is moved to the inside of the drivable range, the camera control unit 21 transmits the minimum image plane movement coefficient $K_{min}$ and/or the maximum image plane movement coefficient $K_{max}$ corresponding to the changed drivable range. Therefore, in the seventh embodiment, even in a case where the focus limit mode is changed and the focus lens 33 is outside the drivable range, since the lens control unit 36 does not transmit the minimum image plane movement coefficient $K_{min}$ and/or the maximum image plane movement coefficient $K_{max}$ corresponding to the drivable range after the change until the focus lens 33 is moved to the inside of the drivable range, it is possible to effectively prevent the current position image plane movement coefficient $K_{cur}$ from being smaller than the minimum image plane movement coefficient $K_{min}$ or to effectively prevent the current position image plane movement coefficient $K_{min}$ from being larger than the maximum image plane movement coefficient $K_{max}$. As a result, in the abnormality determination process, it is possible to effectively prevent the erroneous determination caused by the fact that the current position image plane movement coefficient $K_{cur}$ is smaller than the minimum image plane movement coefficient $K_{min}$ or the current position image plane movement coefficient $K_{cur}$ is larger than the maximum image plane movement coefficient $K_{max}$.

In addition, the above-described embodiments are described for the better understanding of the present invention and are not described for limiting the present invention. Therefore, each component disclosed in the above embodiments includes all design changes and equivalents belonging to the technical scope of the present invention. In addition, each of the above-described embodiments can be used in appropriate combination.

For example, in the above-described embodiments, exemplified is the configuration where, in a case where the current lens position of the focus lens 33 is outside the drivable range and the current position image plane movement coefficient $K_{cur}$ corresponding to the current lens position of the focus lens 33 is smaller than the minimum image plane movement coefficient $K_{min}$ corresponding to the drivable range, the current position image plane movement coefficient $K_{cur}$ corresponding to the current lens position of the focus lens 33 is transmitted as the minimum image plane movement coefficient $K_{min}$ to the camera control unit 21. However, the present invention is not limited to this configuration. In some configuration, an image plane movement coefficient smaller than the current position image plane movement coefficient $K_{cur}$ may be transmitted as the minimum image plane movement coefficient $K_{min}$ to the camera control unit 21. For example, as illustrated in FIG. 14(C), in some configuration, in a case where the current position image plane movement coefficient $K_{cur}$ corresponding to the current lens position of the focus lens 33 is "K13", "K12" which is smaller by 1 than the current position image plane movement coefficient $K_{cur}$ "K13" may be transmitted as the minimum image plane movement coefficient $K_{min}$ to the camera control unit 21. In addition, as illustrated in FIG. 14(C), in some configuration, in a case where the current position image plane movement coefficient $K_{cur}$ corresponding to the current lens position of the focus lens 33 is "K13", the smallest image plane movement coefficient "K11" among the plurality of image plane movement coefficients "K11" to "K19" obtained in the drive area (the range from the infinity-end soft limit $SL_{IP}$ to the near-end soft limit $SL_{NP}$) of the focus lens 33 may be transmitted as the minimum image plane movement coefficient to the camera control unit 21.

In addition, similarly, in the above-described embodiments, exemplified is the configuration where, in a case where the current lens position of the focus lens 33 is outside the drivable range and the current position image plane movement coefficient $K_{cur}$ corresponding to the current lens position of the focus lens 33 is larger than the maximum image plane movement coefficient $K_{max}$ corresponding to the drivable range, the current position image plane movement coefficient $K_{cur}$ corresponding to the current lens position of the focus lens 33 is transmitted as the maximum image plane movement coefficient $K_{max}$ to the camera control unit 21. However, the present invention is no not limited to this configuration. In some configuration, for example, an image plane movement coefficient larger than the current position image plane movement coefficient $K_{cur}$ may be transmitted as the maximum image plane movement coefficient $K_{max}$ to the camera control unit 21.

In addition, in the above-described embodiments, exemplified is the configuration where the three modes of the "FULL mode" in which the drivable range is not limited, the "rear-side limit mode" for limiting the drivable range to the near side, and the "infinity-side limit mode" for limiting the drivable range to the infinity side are set as the focus limit modes is exemplified. However, the focus limit mode is not limited to the above example. For example, in some configuration, a mode may be provided in which a range from the lens position of the infinity-side soft limit $SL_{IS}$ to the lens position of the near-side soft limit $SL_{NS}$ is set as a drivable range Rf4. In this case, in a case where the current position image plane movement coefficient $K_{cur}$ corresponding to the current lens position of the focus lens 33 is smaller than the minimum image plane movement coefficient $K_{min}$, the current position image plane movement coefficient $K_{cur}$ can be transmitted as the minimum image plane movement coefficient $K_{min}$ to the lens barrel 3. In a case where the current position image plane movement coefficient $K_{cur}$ corresponding to the current lens position of the focus lens 33 is larger than the maximum image plane movement coefficient $K_{max}$, the current position image plane movement coefficient $K_{cur}$ can be transmitted as the maximum image plane movement coefficient $K_{max}$ to the lens barrel 3. For example, in a case where the current lens position of the focus lens 33 is in the area "D2", the lens position on the infinity side of the drivable range Rf4 is in the area "D4", and the lens position on the nearest side thereof is in the area "D5", the lens control unit 36 determines the image plane movement coefficient "K15" of the lens position closest to the near side of the largest drivable range Rf4 among the image plane movement coefficients of the areas D2 to D5 of the lens position as the maximum image plane movement coefficient $K_{max}$ to be transmitted to the camera body 2, and lens control unit determines the smallest current image plane movement coefficient $K_{cur}$ "K12" among the image plane movement coefficients of the areas D2 to D5 of the lens position as the minimum image plane movement coefficient $K_{min}$ to be transmitted to the minimum image plane movement coefficient $K_{min}$.

In addition, in the above-described embodiments, in the step S105 of FIG. 12, the lens control unit determines whether or not the "infinity-side limit mode" is set as the focus limit mode, but it is not limited thereto. For example, step S105 in FIG. 12 may be replaced with "step S115 (not illustrated) where the lens control unit 36 determines whether the current lens position of the focus lens 33 is closer to the near side than the drivable range or closer to the infinity side than the drivable range". In this case, in a case where it is determined in step S102 of FIG. 12 that the current lens position of the focus lens 33 is outside the drivable range, the process proceeds to step S115. In step S115, the lens control unit 36 checks the focus limit mode. In the case of "FULL mode", as the information of the focus limit mode, the lens position of the infinity-end soft limit $SL_{IP}$ and the lens position of the near-end soft limit $SL_{NP}$ are read out. It is determined whether or not the current lens position of the focus lens 33 is closer to the infinity side than the lens position of the infinity-end soft limit $SL_{IP}$ (closer to the infinite side than the drivable range) and whether or not the current lens position of the focus lens is closer to the near side than the lens position of the near-end soft limit $SL_{NP}$ (closer to the near side than the drivable range). In a case where it is determined that the current lens position of the focus lens is on the infinity side, the process proceeds to step S106 in FIG. 12. In a case where it is determined that the current lens position of the focus lens is on the near side, the process proceeds to step S108 in FIG. 12.

Similarly, in the case of the "rear-side limit mode", it is determined whether or not the current lens position of the focus lens 33 is closer to the infinity side than the lens position of the infinity-end soft limit $SL_{IP}$ and whether or not the current lens position of the focus lens is closer to the near side than the lens position of the near-side soft limit $SL_{NS}$. In a case where it is determined that the current lens position of the focus lens is on the infinity side, the process proceeds to step S106 in FIG. 12. In a case where it is determined that it is on the near side, the process proceeds to step S108 in FIG. 12. Similarly, in the case of the "infinity-side limit mode", it is determined whether or not the current lens position of the focus lens 33 is closer to the infinity side than the lens position of the infinity-side soft limit $SL_{IS}$ and whether or not the current lens position of the focus lens is closer to the near side than the near-end soft limit $SL_{NP}$. In a case where it is determined that it is on the infinity side, the process proceeds to step S106 in FIG. 12. In a case where it is determined that it is on the near side, the process proceeds to step S108 in FIG. 12.

In the above-described embodiments, the description is made by using the example where, when it is determined in step S115 that the focus lens is on the infinity side, the process proceeds to step S106 in FIG. 12, and when it is determined that the focus lens is on the near side, the process proceeds to step S108 in FIG. 12. However, the present invention is not limited thereto. For example, in a case where it is determined in step S115 that the current lens position of the focus lens 33 is closer to the infinity side than the drivable range, instead of proceeding to step S106 in FIG. 12, step 116 (not illustrated) may be performed to determine the smallest image plane movement coefficient and the largest image plane movement coefficient among the image plane movement coefficients from the current lens position of the focus lens 33 to the lens position on the near side of the drivable range as the minimum image plane movement coefficient $K_{min}$ and the maximum image plane movement coefficient $K_{max}$. In addition, in a case where it is determined in step S115 that the current lens position of the focus lens 33 is closer to the rear side than the drivable range, instead of proceeding to step S108 in FIG. 12, step 118 (not illustrated) may be performed to determine the smallest image plane movement coefficient and the largest image plane movement coefficient among the image plane movement coefficients from the current lens position of the focus lens 33 to the lens position on the infinity side of the drivable range as the minimum image plane movement coefficient $K_{min}$ and the maximum image plane movement coefficient $K_{max}$. After steps 116 and 118, it is preferable that the process proceeds to step 104 in FIG. 12.

In the above-described embodiments, the description is made by using the example where the image plane movement coefficient at the lens position closest to the infinity side is the minimum value and the image plane movement coefficient at the lens position closest to the infinity side is the maximum value. However, the present invention is not limited thereto. For example, the image plane movement coefficient at the lens position closest to the infinity side may be the maximum value, and the image plane movement coefficient at the lens position closest to the near side may be the minimum value. In addition, the minimum value and the maximum value of the image plane movement coefficient may exist at positions other than the lens position on the infinity side and the lens position closest to the near side.

In the first embodiment and the like described above, the description is made by using the example where the camera body 2 receives, from the lens barrel 3, the current position image plane movement coefficient $K_{cur}$, the minimum image plane movement coefficient $K_{min}$, and the maximum image plane movement coefficient. However, the camera body 2 may receive, from the lens barrel 3, the current position image plane movement coefficient $K_{cur}$ and at least one of the minimum image plane movement coefficient $K_{min}$ and the maximum image plane movement coefficient $K_{max}$.

In the first embodiment and the like described above, the description is made by using the example where the camera body 2 receives, from the lens barrel 3, the current position image plane movement coefficient $K_{cur}$, the minimum image plane movement coefficient $K_{min}$, and the maximum image plane movement coefficient $K_{max}$. The camera body 2 may receive, from the lens barrel 3, a value approximate to the position image plane movement coefficient $K_{cur}$ and at least one of a value approximate to the minimum image plane movement coefficient $K_{min}$, and a value approximate to the maximum image plane movement coefficient $K_{max}$.

In addition, in the first embodiment and the like described above, the description is made by using the example where the camera body 2 receives, from the lens barrel 3, the current position image plane movement coefficient $K_{cur}$, the minimum image plane movement coefficient $K_{min}$, and the maximum image plane movement coefficient $K_{max}$. The camera body 2 may receive, from the lens barrel 3, the current position image plane movement coefficient $K_{cur}$ and at least one of an image plane movement coefficient equal to or smaller than the current position image plane movement coefficient $K_{cur}$ and an image plane movement coefficient equal to or larger than the current position image plane movement coefficient $K_{cur}$.

In addition, in the above-described embodiments, in a case where the focus lens 33 is inside the drivable range, the smallest image plane movement coefficient among the plurality of image plane movement coefficients corresponding to the area within the drivable range is transmitted as the minimum image plane movement coefficient $K_{min}$ to the camera body 2, but the present invention is not limited to this configuration. For example, in some configuration, an image plane movement coefficient which is further smaller than the smallest image plane movement coefficient among the plurality of image plane movement coefficients corresponding to the area within the drivable range may be transmitted as the minimum image plane movement coefficient $K_{min}$ to the camera body 2. For example, in the example illustrated in FIG. 13(B), the smallest image plane movement coefficient K14 among the image plane movement coefficients K14 to K19 corresponding to the respective areas D4 to D9 of the drivable range Rf3 is transmitted as the minimum image plane movement coefficient $K_{min}$ to the camera body 2. However, in some configuration, the image plane movement coefficient K13 which is smaller than the image plane movement coefficient K14 is transmitted as the minimum image plane movement coefficient to the camera body 2. In this case, the camera control unit 21 sets the scan speed V to be a lower speed in comparison with a case where the minimum image plane movement coefficient $K_{min}$ to the image plane movement coefficient K14, so that the in-focus position can be appropriately detected even at the lens position where the image plane movement coefficient K is the image plane movement coefficient K13. For this reason, in comparison with a case where the minimum image plane movement coefficient $K_{min}$ is the image plane movement coefficient K14, the calculation interval of the focus evaluation value is reduced, and thus, the calculation accuracy of the focus evaluation value can be increased accordingly.

In addition, in the above-described embodiments, the description is made by using the example where the position of the focus lens 33 corresponding to the minimum image plane movement coefficient $K_{min}$ is closer to the near side than the position of the focus lens 33 corresponding to the maximum image plane movement coefficient $K_{max}$, but the present invention is not limited thereto. For example, the position of the focus lens 33 corresponding to the minimum image plane movement coefficient $K_{min}$ may be closer to the infinity side than the position of the focus lens 33 corresponding to the maximum image plane movement coefficient $K_{max}$. In addition, for example, the image plane movement coefficient may become smaller, as the position of the focus lens 33 becomes closer to the near side. The image plane movement coefficient may become larger, as the position of the focus lens 33 becomes closer to the near side. In addition, the minimum value of the image plane movement coefficient or the maximum value of the image plane movement coefficient may exist at positions other than the position of the focus lens 33 closest to the near side and the position of the focus lens 33 closest to the infinity side.

For example, the image plane movement coefficient at the position corresponding to at least one of a near-side in-focus position 480, a near-side soft limit position 460, a position of a mechanical end point 440 in the near-side direction, a position between the near-side in-focus position 480 and the position of the mechanical end point 440 in the near-side direction, and the position closer to the near side than the position of the mechanical end point 440 in the near-side direction may be set as the minimum image plane movement coefficient $K_{min}$ (or the maximum image plane movement coefficient $K_{max}$). Similarly, for example, the image plane movement coefficient at the position corresponding to at least one of an infinity-side in-focus position 470, an infinity-side soft limit position 450, a position of a mechanical end point 430 in the infinity-side direction, the position between the infinity-side in-focus position 470 and the mechanical end point 430 in the infinity-side direction, and the position closer to the infinity side than the position of the mechanical end point 430 in the infinity-side direction may be set as the maximum image plane movement coefficient $K_{max}$ (or the minimum image plane movement coefficient $K_{min}$).

In addition, in a case where the value of the optical minimum image plane movement coefficient $K_{min}$ is a number having a large number of digits, for example, 102.345, a value of 100 or 105 which is a value approximate to 102.345 may be stored as the minimum image plane movement coefficient $K_{mm}$. This is because, in a case where 100 or 105 is stored in the lens memory 37, the number of digits is small in comparison with where 102.345 is stored in the lens memory 37, so that it is possible to save the storage capacity of the memory, and it is possible to suppress the capacity of transmission data when transmitting the second coefficient K2 ($K_{min}$) described later to the camera control unit 21.

Similarly, in a case where the value of the optical maximum image plane movement coefficient $K_{max}$ is a number having a large number of digits, for example, 1534.567, a value of 1500 or 1535 which is approximate to 1534.567 and has a small number of digits may be stored as the minimum image plane movement coefficient $K_{min}$.

Similarly, in a case where the value of the optical current position image plane movement coefficient $K_{cur}$ is a number having a large number of digits, for example, 533.246, a value of 530 or 533 which is approximate to 533.246 and has a small number of digits may be stored as the current position image plane movement coefficient $K_{cur}$.

In addition, the values of the current position image plane movement coefficient $K_{cur}$, the minimum image plane movement coefficient $K_{min}$, and the maximum image plane movement coefficient $K_{max}$ may be values of the optical image plane movement coefficient and may be set to a value larger or smaller than the value of the optical image plane movement coefficient in consideration of the type of the lens barrel, the driving mechanism of the focus lens, the detection mechanism of the focus lens 33, and the like.

What is claimed is:

1. An interchangeable lens capable of being attached to a camera body, the interchangeable lens comprising:
   an optical system that includes a focus adjustment lens;
   a drive unit that drives the focus adjustment lens in an optical axis direction of the optical system;
   a detection unit that detects a position of the focus adjustment lens;
   a transmission unit that transmits a first value and a second value to the camera body when the focus adjustment lens is inside a first movement range and transmits the first value and a third value to the camera body when the focus adjustment lens is outside the first movement range, wherein
   the first value is an image plane movement coefficient that varies according to a position of the focus adjustment lens and corresponds to a movement amount of an image plane with regard to a movement amount of the focus adjustment lens, and the first value is an image plane movement coefficient at the position of the focus adjustment lens detected by the detection unit,
   the second value is an image plane movement coefficient where a movement amount of an image plane with regard to a movement amount of the focus adjustment lens becomes minimum within the first movement range of the focus adjustment lens; and
   the third value is a value which changes depending on the position of the focus adjustment lens.

2. The interchangeable lens according to claim 1, wherein the third value is equal to the first value.

* * * * *